(12) United States Patent
Lyren et al.

(10) Patent No.: US 12,495,112 B2
(45) Date of Patent: *Dec. 9, 2025

(54) WED THAT DISPLAY A VIRTUAL IMAGE FOR A TELEPHONE CALL

(71) Applicants: Philip Scott Lyren, Rincon, PR (US); Glen A. Norris, Lakewood, OH (US)

(72) Inventors: Philip Scott Lyren, Rincon, PR (US); Glen A. Norris, Lakewood, OH (US)

(*) Notice: Subject to any disclaimer, the term of this patent is extended or adjusted under 35 U.S.C. 154(b) by 257 days.

This patent is subject to a terminal disclaimer.

(21) Appl. No.: 18/376,889

(22) Filed: Oct. 5, 2023

(65) Prior Publication Data

US 2024/0031474 A1    Jan. 25, 2024

Related U.S. Application Data

(63) Continuation of application No. 17/308,927, filed on May 5, 2021, now Pat. No. 11,785,134, which is a continuation of application No. 16/571,064, filed on Sep. 14, 2019, now Pat. No. 11,032,412, which is a continuation of application No. 15/406,829, filed on Jan. 16, 2017, now Pat. No. 10,999,427, which is a continuation of application No. 15/095,082, filed on Apr. 10, 2016, now Pat. No. 9,584,653.

(51) Int. Cl.
| | |
|---|---|
| H04M 1/72469 | (2021.01) |
| G06F 3/04817 | (2022.01) |
| G06F 3/04842 | (2022.01) |
| G06F 3/0486 | (2013.01) |
| G06F 3/16 | (2006.01) |
| H04S 7/00 | (2006.01) |
| H04M 1/60 | (2006.01) |
| H04N 7/14 | (2006.01) |
| H04N 7/15 | (2006.01) |

(52) U.S. Cl.
CPC .... *H04M 1/72469* (2021.01); *G06F 3/04817* (2013.01); *G06F 3/04842* (2013.01); *G06F 3/0486* (2013.01); *G06F 3/165* (2013.01); *H04S 7/302* (2013.01); *H04S 7/304* (2013.01); *H04M 1/6016* (2013.01); *H04M 2250/22* (2013.01); *H04N 7/147* (2013.01); *H04N 7/15* (2013.01); *H04S 2420/01* (2013.01)

(58) Field of Classification Search
CPC .......... H04M 1/72469; H04M 1/6016; H04M 2250/22; G06F 3/04817; G06F 3/04842; G06F 3/0486; G06F 3/165; H04S 7/302; H04S 7/304; H04S 2420/01; H04N 7/147; H04N 7/15

See application file for complete search history.

(56) References Cited

U.S. PATENT DOCUMENTS

| | | | | |
|---|---|---|---|---|
| 9,153,074 | B2* | 10/2015 | Zhou | G08B 21/06 |
| 9,191,620 | B1* | 11/2015 | Katzer | H04M 3/42042 |
| 9,225,934 | B2* | 12/2015 | Cho | G02B 27/017 |
| 2012/0127284 | A1* | 5/2012 | Bar-Zeev | G06T 19/006 |
| | | | | 348/158 |

(Continued)

*Primary Examiner* — Akelaw Teshale

(57) ABSTRACT

A wearable electronic device (WED) worn on a head of a first user captures video of an environment. The WED displays, before the first user answers a telephone call from a second user, the video of the environment that includes a virtual image of the second user in the environment where a voice of the second user will externally localize as binaural sound when the first user answers the telephone call.

20 Claims, 32 Drawing Sheets

---

Determine coordinates for a pair of head related transfer functions (HRTFs) for a person.
100

↓

Designate a sound localization point (SLP) that corresponds to the coordinates for the pair of HRTFs.
110

↓

Display the SLP at a location on a display that corresponds to the coordinates for the pair of HRTFs.
120

(56) References Cited

U.S. PATENT DOCUMENTS

| | | | |
|---|---|---|---|
| 2012/0183161 A1* | 7/2012 | Agevik | H04S 7/302 |
| | | | 381/303 |
| 2012/0207308 A1* | 8/2012 | Sung | H04S 7/304 |
| | | | 381/17 |
| 2013/0236040 A1* | 9/2013 | Crawford | H04S 7/306 |
| | | | 381/310 |
| 2014/0025287 A1* | 1/2014 | Christensen | G01C 21/20 |
| | | | 701/488 |
| 2014/0226842 A1* | 8/2014 | Shenoy | H04N 7/15 |
| | | | 381/303 |
| 2015/0100144 A1* | 4/2015 | Lee | H04W 4/70 |
| | | | 700/94 |
| 2015/0172830 A1* | 6/2015 | Liu | G02C 11/06 |
| | | | 381/313 |
| 2017/0161956 A1* | 6/2017 | Fu | G06F 3/012 |
| 2018/0349690 A1* | 12/2018 | Rhee | H04N 13/239 |

* cited by examiner

500

Three Party Communication

510

Three Party Communication

520

| Azimuth of First User | Azimuth of Second User | Azimuth of Third User |
|---|---|---|
| 0° or IHL | - 10° | + 10° |
| 0° or IHL | - 15° | + 15° |
| 0° or IHL | - 20° | + 20° |
| 0° or IHL | - 25° | + 25° |
| 0° or IHL | - 30° | + 30° |
| 0° or IHL | - 35° | + 35° |
| 0° or IHL | - 40° | + 40° |
| 0° or IHL | - 45° | + 45° |

Four Party Communication

| Azimuth of First User | Azimuth of Second User | Azimuth of Third User | Azimuth of Fourth User |
|---|---|---|---|
| - 10° | + 10° | - 30° | + 30° |
| - 15° | + 15° | - 35° | + 35° |
| - 20° | + 20° | - 40° | + 40° |
| 0° | IHL | - 15° | + 15° |
| 0° | IHL | - 20° | + 20° |
| 0° | IHL | - 25° | + 30° |
| 0° | IHL | - 30° | + 35° |

Five Party Communication

Figure 5D

WED THAT DISPLAY A VIRTUAL IMAGE FOR A TELEPHONE CALL

BACKGROUND

Three dimensional (3D) sound localization offers people a wealth of new technological avenues to not only communicate with each other but also to communicate with electronic devices, software programs, and processes.

As this technology develops, challenges will arise with regard to how sound localization integrates into the modern era. Example embodiments offer solutions to some of these challenges and assist in providing technological advancements in methods and apparatus using 3D sound localization.

BRIEF DESCRIPTION OF THE DRAWINGS

FIGS. 5A-5D are tables that provide locations for placing voices relative to a first user during an electronic communication or electronic voice exchange with three or more users in accordance with example embodiments.

SUMMARY

Figure 1:
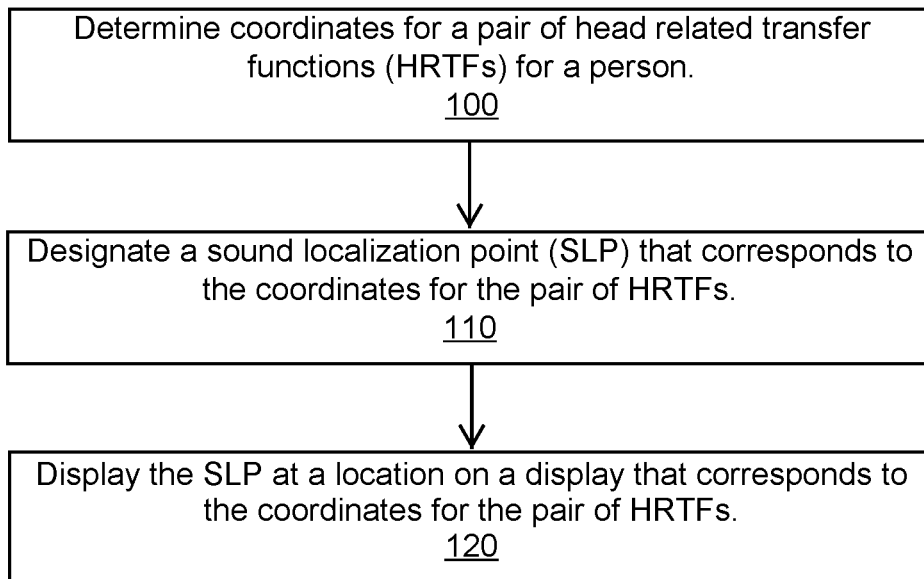
FIG. 1 is a method to display a sound localization point (SLP) at a location on a device display that corresponds with where a person will localize the sound in accordance with an example embodiment.

A user interface of an electronic device of one example embodiment includes icons that enable a user to answer a telephone call in monophonic sound or binaural sound. When the telephone call is answered in binaural sound, the electronic device convolves a voice in the call with head related transfer functions (HRTFs) of a person so the voice localizes to an external location that is away from but proximate to the person.

A user interface of another example embodiment enables communication with an electronic device or software program in binaural sound.

A user interface of another example embodiment provides management of sound localization points (SLPs).

Other example embodiments are discussed herein.

DETAILED DESCRIPTION

Example embodiments relate to methods and apparatus that provide user interfaces for 3D sound localization. These interfaces include displaying sound localization points (SLPs) that represent locations of an origin of sound that a user hears.

In an example embodiment, the display of an electronic device and/or its user interface show the SLPs with a frame-of-reference so the user can visually determine where sound will localize around the user. This frame-of-reference can include an image of the user (or an image or icon that represents the user) and an image or icon that represents one or more SLPs. A location of a SLP with respect to the image of the user shown on the display or with respect to the viewpoint of the user corresponds to a location of where sound may actually localize with respect to the user. As such, the user knows in advance a location from where sound will emanate since this location is shown on the display as a SLP. The frame-of-reference and the SLPs can be displayed to the user before binaural sound externally localizes to the user, while binaural sound is externally localizing to the user, or after binaural sound externally localized to the user.

By way of introduction, sound localization refers to a person's ability to determine a location or an origin of sound in direction and distance (though the human auditory system has limits in determining direction and distances to some sounds). Sound localization also refers to methods to use artificial or computer generated auditory cues to generate an origin of sound in a virtual 3D space. Binaural sound (or 3D sound) and some forms of stereo sound provide a listener with the ability to localize sound; though binaural sound generally provides a listener with a superior ability to localize sounds in 3D space. In many instances, a person listening to binaural sound through an electronic device (such as earphones or speakers with cross-talk cancellation) can determine a location from where the sound originates even when this location is away from the person.

Binaural sound can be manufactured or recorded. When binaural sound is recorded, two microphones are placed in or near human ears or placed in ears of a dummy head. When this binaural recording is played back (e.g., through headphones or earphones), audio cues in the recorded sound cause the listener to perceive an audio representation of the 3D space where the recording was made. Binaural sound is quite realistic, and the listener can localize sources of individual sounds with a high degree of accuracy.

Binaural sound typically delivers two types of localization cues: temporal cues and spectral cues. Temporal cues arise from an interaural time difference (ITD) due to the distance between the ears. Spectral cues arise from an interaural level difference (ILD) or interaural intensity difference (IID) due to shadowing of sound around the head.

A person hearing the spatial auditory cues can localize sound or estimate a location of a source of the sound. In some instances, a listener can externalize and localize a sound source in binaural sound to a point and experience the sound as indistinguishable from a real-world sound source occurring in his physical environment.

Although stereo sound offers some degree of sound localization, stereo sound and binaural sound are different. As explained in WIKIPEDIA, the term "binaural sound" and "stereo sound" are frequently confused as synonyms. Conventional stereo recordings do not factor in natural ear spacing or "head shadow" of the head and ears since these things happen naturally as a person listens and experiences his or her own ITDs (interaural time differences) and ILDs (interaural level differences). As a general rule, binaural sound accommodates for one or more ITDs, ILDs, natural ear spacing, head shadow, and room impulse responses. More specifically, sound signals are modified as they travel from their original source and interact with the human anatomy and surrounding environment. These modifications encode the location of the original source and can be captured as an impulse response. The impulse response for a human is called a head-related impulse response (HRIR), and it represents impulse responses from a sound source to two ears in a free-field environment (without modification due to a room environment). A HRTF is a Fourier transform of a HRIR.

Binaural sound spatialization can be reproduced to a listener using headphones or speakers, such as with dipole stereo (e.g., multiple speakers that execute crosstalk cancellation). Generally, binaural playback on earphones or a specially designed stereo system provides the listener with a sound that spatially exceeds normally recorded stereo sound since the binaural sound more accurately reproduces the natural sound a user hears when at the location where the sound was recorded. Binaural sound can convincingly reproduce the location of sound behind, ahead, above, or around the listener. Further, binaural sound can be recorded (such as recorded with two microphones placed in ears of a person or dummy head) or machine made or modified with a computer program.

A source sound can be convolved with a HRIR of a person. Convolving sound in this manner joins the original sound with impulses responses so the person hears the sound as if he or she were present at the source location when the sound was played. The HRIRs describe how to alter the sound source before the sound is provided to the ears of the listener. For example, mono sound can be convolved with a person's HRIRs or HRTFs to generate binaural sound that is individualized for the person.

Sound localization through the use of electronic devices offers people a wealth of new technological avenues to not only communicate with each other but also to communicate with electronic devices, software programs, and processes. This technology has broad applicability in augmented reality (AR), virtual reality (VR), audio augmented reality (AAR), telecommunications and communications, entertainment, tools and services for security, medicine, disabled persons, recording industries, education, natural language interfaces, and many other sectors.

As this technology develops, many challenges exist with regard to how sound localization through electronic devices integrates into the modern era. The implementation of binaural sound with electronic devices creates technical problems when used in the field of telecommunications. Some of these problems are specific to user interfaces for answering and placing telephone calls. By way of example, people in a telephone call or an electronic call may not know in advance of the call where a voice of the other person will localize. Consider a situation in which a person receives an incoming telephone call. Will a voice of the caller internally localize to the person (such as a traditional call in monaural sound) or will the voice of the caller externally localize to the person? Further, if the voice of the caller will externally localize to the person, where will the voice localize in 3D space relative to the location of the person? For example, will the voice of the caller originate to the left of the person, to the right of the person, in front of the person, or above the person? Furthermore, what if the person wants to move the voice of the caller during the telephone call (such as moving the voice from one external sound localization point (SLP) to another external SLP)? Additionally, what if the person wants to manage how or where voices of callers are received? For example, how does the person manage multiple callers that are simultaneously localizing to external points or areas around the person? How does the person set or change user preferences for SLPs that are external points or areas around the person? How does a person know which external SLP is associated with which voice or which caller?

These questions show but a few examples of the technical problems that example embodiments address in the field of telecommunications and other technical fields concerned with sound localization. Example embodiments offer solutions to many of these challenges and assist in providing technological advancements in methods and apparatus using electronic devices and sound localization.

Many other technical problems in telecommunications and the other fields exist, and example embodiments solve these problems as well. For example, even if a person obtains one or more head related transfer functions (HRTFs), an electronic device (such as a smartphone of the person) would not know where sound convolved with the HRTFs will actually localize with respect to the person. Further, the electronic device could not display this location to the person without determining a correlation between image locations on the display and the actual localization point of the sound per the HRTFs. Further yet, if a person selected one or more SLPs shown through a user interface (UI) or graphical user interface (GUI) of an electronic device, this electronic device could not localize sound to this location without determining a correlation between the selected SLPs through the UI and the actual HRTFs that when convolved will render the sound to the correct, selected locations. These situations provide a few examples of the technical problems in telecommunications with binaural sound.

Example embodiments provide user interfaces that solve many of these problems and other problems associated with binaural sound in telecommunications and other fields that can use binaural or 3D sound.

FIG. 1 is a method to display a sound localization point (SLP) at a location that corresponds with where a person will localize the sound.

Block 100 states determine coordinates for a pair of head related transfer functions (HRTFs) for a person.

A HRTF is a function of frequency (f) and three spatial variables, by way of example (r, θ, φ) in a spherical coordinate system. Here, r is the radial distance from a recording point where the sound is recorded or a distance from a listening point where the sound is heard to an origination or generation point of the sound; θ (theta) is the azimuth angle between a forward-facing user at the recording or listening point and the direction of the origination or generation point of the sound relative to the user; and φ (phi) is the polar angle, elevation, or elevation angle between a forward-facing user at the recording or listening point and the direction of the origination or generation point of the sound relative to the user. By way of example, the value of (r) can be a distance (such as a numeric value) from an origin of sound to a recording point (e.g., when the sound is recorded with microphones) or a distance from a SLP to a listener's head (e.g., when the sound is generated with a computer program or otherwise provided to a listener).

When the distance (r) is greater than or equal to about one meter (1 m) as measured from the capture point (e.g., the head of the person) to the sound source, the sound attenuates inversely with the distance. One meter or thereabout defines a practical boundary between near field and far field distances and corresponding HRTFs. A "near field" distance is one measured at about one meter or less; whereas a "far field" distance is one measured at about one meter or more. Example embodiments can be implemented with near field and far field distances.

The coordinates can be calculated or estimated from an interaural time difference (ITD) of the sound between two ears. ITD is related to the azimuth angle according to, for example, the Woodworth model that provides a frequency independent ray tracing methodology. The model assumes a rigid, spherical head and a sound source at an azimuth angle. The time delay varies according to the azimuth angle since sound takes longer to travel to the far ear. The ITD for a sound source located on a right side of a head of a person is given according to two formulas:

$$ITD=(a/c)[\theta+\sin(\theta)] \text{ for situations in which } 0 \le \theta \le \pi/2;$$
and $$ITD=(a/c)[\pi-\theta+\sin(\theta)] \text{ for situations in which } \pi/2 \le \theta \le \pi,$$

where θ is the azimuth in radians ($0 \le \theta \le \pi$), a is the radius of the head, and c is the speed of sound. The first formula provides the approximation when the origin of the sound is in front of the head, and the second formula provides the approximation when the origin of the sound is in the back of the head (i.e., the azimuth angle measured in degrees is greater than 90°).

The coordinates (r, θ, φ) can also be calculated from a measurement of an orientation of and a distance to the face of the person when the HRTFs are generated. These calculations are described in patent application having Ser. No. 15/049,071 entitled "Capturing Audio Impulse Responses of a Person with a Smartphone" and being incorporated herein by reference.

The coordinates can also be calculated or extracted from one or more HRTF data files, for example by parsing known HRTF file formats, and/or HRTF file information. For example, HRTF data is stored as a set of angles that are provided in a file or header of a file (or in another predetermined or known location of a file or computer readable medium). This data can include one or more of time domain impulse responses (FIR filter coefficients), filter feedback coefficients, and an ITD value. This information can also be referred to as "a" and "b" coefficients. By way of example, these coefficients can be stored or ordered according to lowest azimuth to highest azimuth for different elevation angles. The HRTF file can also include other information, such as the sampling rate, the number of elevation angles, the number of HRTFs stored, ITDs, a list of the elevation and azimuth angles, a unique identification for the HRTF pair, and other information. This data can be arranged according to one or more standard or proprietary file formats, such as AES69 or a panorama file format, and extracted from the file.

The coordinates and other HRTF information can thus be calculated or extracted from the HRTF data files. A unique set of HRTF information (including r, θ, φ) can be determined for each unique HRTF.

The coordinates and other HRTF information can also be stored in and retrieved from memory, such as storing the information in a look-up table. This information can be quickly retrieved to enable real-time processing and convolving sound using HRTFs.

Block 110 states designate a sound localization point (SLP) that corresponds to the coordinates for the pair of HRTFs.

The SLP represents a location where the person will perceive an origin of the sound. For an external localization, the SLP is away from the person (e.g., the SLP is away from but proximate to the person or away from but not proximate to the person). The SLP can also be located inside the head of the person.

A location of the SLP corresponds to the coordinates of one or more pairs of HRTFs. For example, the coordinates of or within the SLP zone match or approximate the coordinates of a HRTF. Consider an example in which the coordinates for a pair of HRTFs are $(r, \theta, \phi)$ and are provided as (1.2 meters, 35°, 10°). A corresponding SLP zone for the person thus contains $(r, \theta, \phi)$, provided as (1.2 meters, 35°, 10°). In other words, the person will localize the sound as occurring 1.2 meters from his or her face at an azimuth angle of 35° and at an elevation angle of 10° taken with respect to a forward looking direction of the person.

Block 120 states display the SLP at a location on a display that corresponds to the coordinates for the pair of HRTFs.

An electronic device displays the SLP on the display or with the user interface at a location that matches or corresponds to the coordinate location for the corresponding pair of HRTFs. A person is thus able to see on the display the location where the sound will localize around him. For example, the display shows a reference point for the listener (such as a picture of the listener or an image that represents the listener or a head of the listener) and simultaneously shows the point of the origin of the sound or the SLP. Proximate physical or virtual objects and boundaries with known spatial coordinates relative to the user can also be shown as reference points on the UI relative to the illustration of the SLP and user. The representation of the SLP is positioned on the display at a location or coordinates that correspond to, approximate, or match with the external sound localization point that is associated with and derived from the HRTFs or otherwise acquired. The items to be illustrated on the UI at the display (SLPs, the user, other objects) can have known three-dimensional spatial coordinates relative to the user.

Consider an example in which the positions on the display for the representations of the items are calculated by transforming their three-dimensional coordinates to two-dimensional (or three-dimensional) coordinates in the coordinate scheme used by the device display. The display locations for the items that are passed to the device for display are first transformed from their three-dimensional coordinates to the two-dimensional coordinates in the geometry, plane, style of representation, and viewpoint used by an example embodiment (for example, a third person two-point exaggerated perspective with a viewpoint behind and above the head of the user).

Consider an example in which the coordinates for a pair of HRTFs are $(r, \theta, \phi)$ and are provided as (1.2 meters, 35°, 10°), and the coordinates for a person are (0, 0, 0). A corresponding SLP for the person thus contains $(r, \theta, \phi)$, provided as (1.2 meters, 35°, 10°). The display of the electronic device shows a head of a person and a SLP with a visual representation, and a distance between them is scaled to fit the device display. The person can view the display, see the illustrated SLP, and thus see where the sound will localize with respect to the person for this SLP. When this SLP is selected, the corresponding HRTFs are retrieved, and sound is convolved with these HRTFs. The person is thus able to see on a display where the sound will localize before hearing the sound or before the sound is even convolved with the corresponding HRTFs. Furthermore, the display can include one or more objects or images that represent actual objects around the person so the person can readily perceive a frame-of-reference or determine a location for where the sound will externally localize.

In an example embodiment, coordinates of SLPs and reference objects in the user's physical space can be transformed to or mapped to corresponding coordinates displayed by a UI according to one or more of the type of UI (such as a 2D screen or a 3D stereoscopic view), the style of visual representation used by the UI (such as a perspective, orthographic, or isometric projection), the viewpoint or camera point used by the UI, and the size and dimensions of the device display screen or UI. For example, a set of coordinates of three dimensions in the user's physical environment that need to be represented to a user via a smartphone screen can be translated to a set of coordinates in two dimensions and scaled for different screen sizes.

Consider an example in which a user commands a user interface to show a set of SLPs on a 2D display of a HPED that has access to a table or database of 3D SLP coordinates (and other coordinates for the user and reference objects). The HPED also has access to the type of view and viewpoint of the UI (such as a virtual camera placed for a top-down view of an isometric projection) and to the known modality and dimensions of a screen size and user interface size. The HPED transforms the 3D coordinates to 2D coordinates in a view consistent with or constrained by the viewpoint or the camera point and the geometry style, such as a perspective view. The HPED then renders icons or images or indicia for the items at the 2D coordinates of the respective items, and then passes the resulting 2D image or model to the device display system according to the method used by the device display system.

For example, a viewpoint and geometry style of a UI can be selected to match a geometry style of a software application (such as a 3D or VR game) actively running on the electronic device. Further, the viewpoint can be a dynamic moving viewpoint or camera position and orientation such as provided by a head tracking system, or matching the viewpoint in a computer game. Employing this option to match a UI style and viewpoint with another application can allow the user to see SLP representations and other items with a consistent view or perspective between applications or as a view overlaid or augmenting the interface of the other application.

Consider an example in which a localization point for a pair of HRTFs is determined as having a coordinate location of (X, Y, Z), in the physical space of a person relative to (0, 0, 0) representing a location inside the head of the person. The points (X, Y, Z) and (0, 0, 0) are transformed to two corresponding points (A, B) and (C, D) respectively that can be displayed simultaneously and in a perspective view within the bounds of a flat rectangular electronic display. An electronic display of the device displays an icon or image that represents the head of the person at screen coordinate (C, D) and displays an icon or image that represents a SLP at or containing (X, Y, Z) at screen coordinate (A, B). The visual representation displayed in perspective on the screen now communicates to the person the location where the voice of the caller will actually localize before the telephone call even occurs. A user can then select the SLP displayed on his screen at (A, B) with an understanding that he will experience the localization of the voice of the caller at (X, Y, Z), and an understanding of the location of point (X, Y, Z) in his space, proximate to but away from his face.

Consider an example in which the user interface style of representation is flat and without spatial representation with one or more SLPs shown as buttons or zones with labels indicating their position with respect to the user such as "front left," "far left," "right," "front," "back," "over", or "below". For example, the SLPs do not have to be exact points but can be areas or zones where sound can localize for the user. When the user selects a SLP, zone, or area, HRTFs are selected to localize sound as close as possible to the selected SLP, zone, or area so the user perceives sound to localize to his or her selection. If a pair of HRTFs is not available for the selected location, then they can be interpolated from known HRTFs, estimated, or obtained in another manner.

Figure 2:
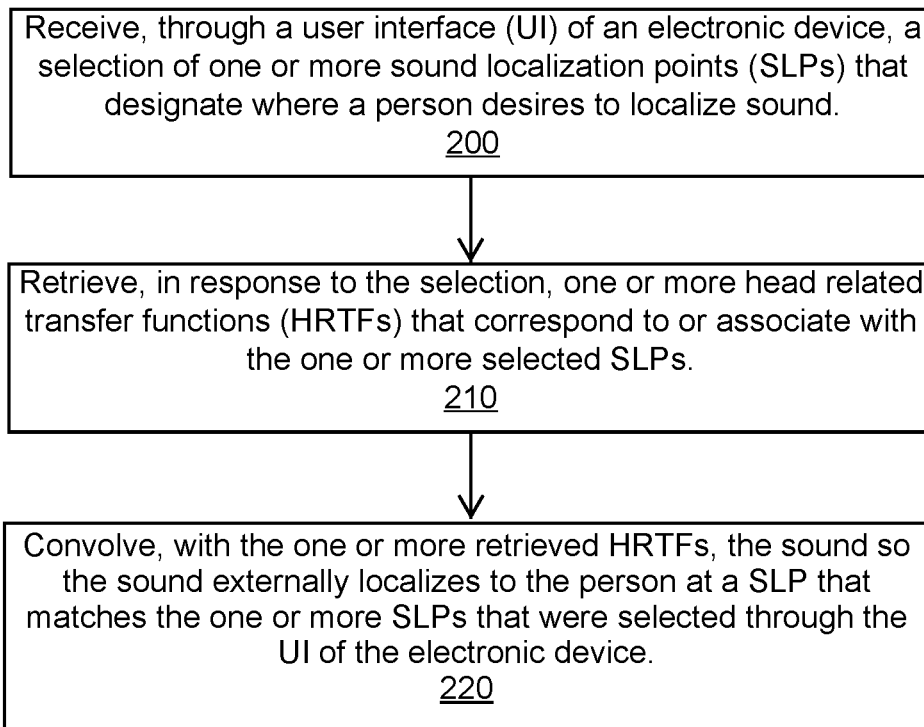
FIG. 2 is a method to localize sound to a person to an external location that matches a location selected through a user interface of an electronic device in accordance with an example embodiment.

FIG. 2 is a method to localize sound to a person to an external location that matches a location selected through a user interface of an electronic device.

Block 200 states receive, through a user interface (UI) of an electronic device, a selection of one or more sound localization points (SLPs) that designate where a person desires to localize sound.

A person or a user can select one or more SLPs that provide a location where sound will localize to the person. As one example, the person selects a location for where to externally localize sound through interaction with a UI or a display of an electronic device, such as a smartphone, a head mounted display, or an optical head mounted display. As another example, a computer program or process, such as an intelligent user agent or an intelligent personal assistant, selects one or more SLPs where sound will localize to the person.

Consider an example in which a smartphone displays an image of a person and a plurality of SLPs around the image of the person. These SLPs represent locations where binaural sound will actually localize around the person.

Block 210 states retrieve, in response to the selection, one or more head related transfer functions (HRTFs) that correspond to or associate with the one or more selected SLPs.

When a SLP is selected, then a corresponding HRTF for the selected SLP is retrieved. If a SLP does not have a HRTF, then one can be computed, calculated or captured for the SLP (such as interpolating a HRTF between two or more known neighboring HRTFs in order to correlate a HRTF for the selected SLP).

Consider an example in which a user interface displays two SLPs. The room in front of the face of the user is illustrated in the user interface, and the interface is divided vertically at 0° azimuth into a left side and a right side representing two wide areas or zones in front of the user to the left and right of his face respectively. These two zones are two SLPs, and each SLP contains hundreds of pairs of HRTFs that are stored on or available to the smartphone of the user. When the user receives a call, he is prompted with the user interface to select a SLP to localize the incoming voice for the call. When the user selects the left SLP or zone on the interface, a HRTF pair is selected from the set of HRTFs that are included in the left SLP shown on the user interface. There are many HRTFs included in the left SLP and a determination is made regarding which HRTF pair is selected. The determination can be made using one or more of a variety of methods discussed herein.

Consider an example method where each pixel or point of the display that displays the interface maps to an input coordinate on the smartphone that can be activated by a user, for example by a touch. Each point of the interface that a user can touch maps to or corresponds to a HRTF pair. In this way, a user that selects the left SLP in the example by touching the left SLP also simultaneously selects a HRTF corresponding to the point of the touch or the point or pixel of the display that maps to the point of touch.

Consider another example in which a SLP contains multiple HRTFs with similar distance and azimuth coordinates but with varying elevation coordinates. An intelligent user agent (IUA) or computer program can designate that the HRTF selected when a user designates the SLP is the HRTF nearest to a zero elevation but not less than 10° elevation from any HRTF assigned to a current sound source. In this way, successive selection of a same SLP for multiple voices or sounds can result in the user experiencing externalized sound sources that are progressively "stacked" at a similar azimuth.

Consider an example in which a SLP includes many HRTFs of varying distances (r) but with a single azimuth θ of 20° and a single elevation φ of 0°. An example embodiment executes a designation rule that automatically selects a closest HRTF to the user that is unused by a current process.

Consider another example in which a SLP includes multiple HRTFs, such as including both near field and far field HRTFs. An example embodiment selects a HRTF pair with priority to far field HRTFs over near field HRTFs.

Consider another example in which an electronic device uses a room scanner or other device to determine the placement of objects in a room and automatically selects a HRTF from a chosen SLP. The HRTF is automatically selected according to a preference for a HRTF that has a position coincident with, mapping to, or corresponding with the position that is on or near an object, in deference to a HRTF that is not proximate to an object. Further, the selection can target HRTFs at a certain object or type of object.

Consider another example in which the HRTF can automatically be selected that is the one most recently used within the SLP, least recently used, most commonly used, most commonly used under circumstances similar to those at the time of the SLP selection, etc.

Consider an example in which each SLP is provided with a unique number or unique identity that corresponds with a unique pair of HRTFs (i.e., a left HRTF for the left ear and a right HRTF for the right ear). When a SLP on a display is selected, its identity is determined and its corresponding HRTF is retrieved from memory, such as a look-up table.

Block 220 states convolve, with the one or more retrieved HRTFs, the sound so the sound externally localizes to the person at a SLP that matches the one or more SLPs that were selected through the UI of the electronic device.

An electronic device convolves the sound with the retrieved HRTFs so the sound localizes to the location that was selected via the user interface or via the user if no UI was used. An origin of the sound localizes to the person at a location that matches or corresponds to the location selected per the user interface.

Consider an example in which Alice wants electronic calls from Bob to localize at a specific external location that she designates. Her smartphone displays an image of a head that represents Alice and an area around the image that represents her current location. Alice places her finger on the display of the smartphone at a location that is thirty-degrees (30°) azimuth and zero-degrees (0°) elevation from a forward-looking direction of the image on the display. The smartphone retrieves Alice's HRTFs for this location and assigns this location to Bob in Alice's sound user-preferences. Later, when Alice receives an electronic call from Bob on her smartphone, the voice of Bob localizes three feet from her face at thirty-degrees (30°) azimuth and zero-degrees (0°) elevation. This SLP of Bob's voice corresponds to the location that Alice selected on her smartphone.

Consider an example in which Alice wears a head mounted display (HMD) and headphones that provide a virtual world of an office environment that includes an image of a virtual Bob. Alice provides a voice command to the HMD to open a conversation with Bob. The HMD determines a location of the virtual Bob in the virtual world with respect to Alice's point of view in the virtual world and determines that virtual Bob is located at $(r, \theta, \phi)$ provided as (1.2 meters, −20°, 10°) relative to Alice. The HMD retrieves Alice's HRTFs that correspond to this location and places the conversation request to Bob. When Bob responds, his voice appears to originate from virtual Bob who is located at (1.2 meters, −20°, 10°). Thereafter, when Alice's head moves, a head tracking system communicates these movements to a sound localization system (SLS). The SLS, in turn, retrieves HRTFs for positions that compensate for her head movement and convolves the sound using the HRTFs so the position of origin of the sound of Bob's voice is adjusted in order to compensate for the movement of Alice's head. Alice continues to hear the voice of Bob originate from the position of virtual Bob.

Figure 3:
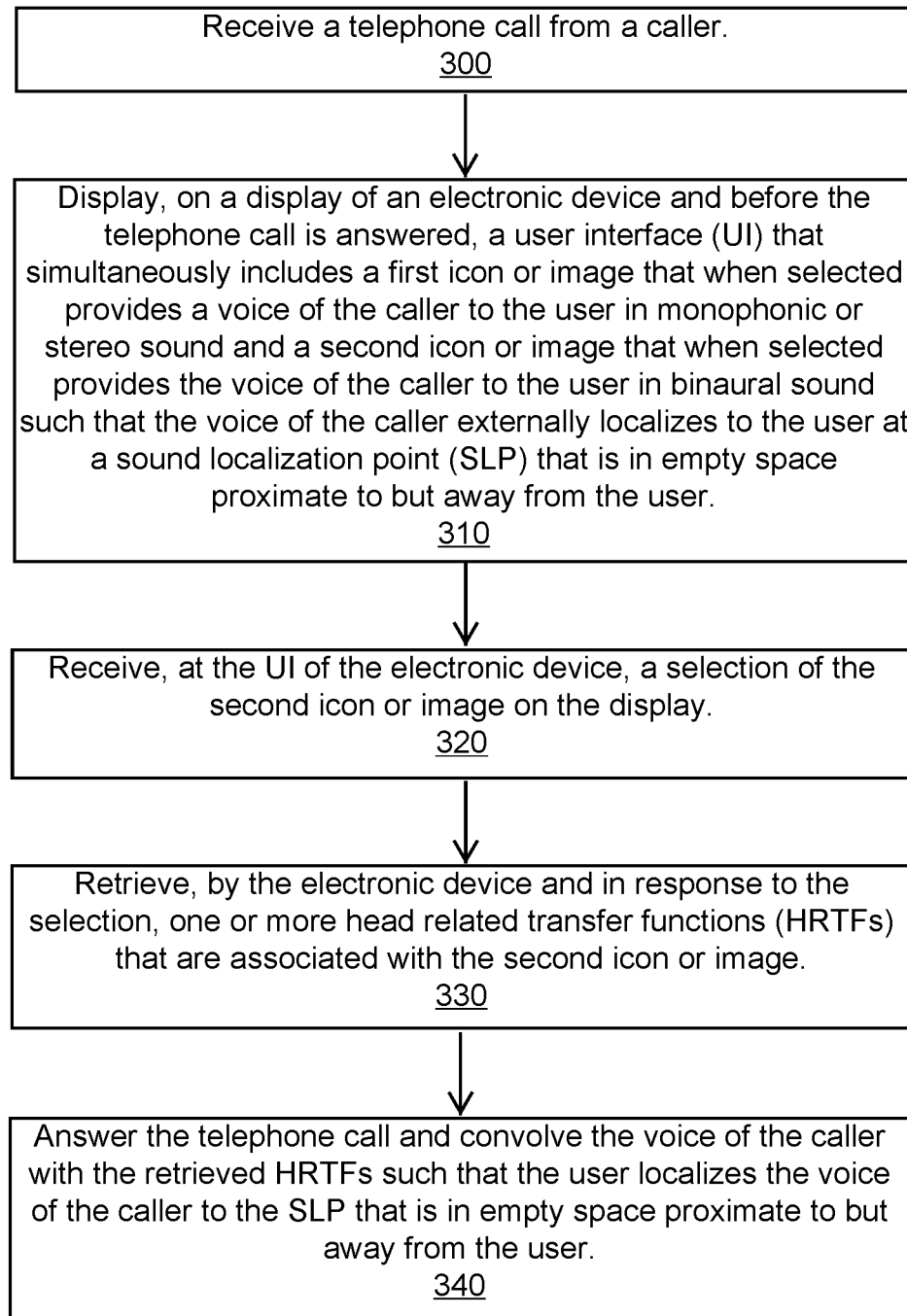
FIG. 3 is a method executed by an electronic device that provides a user interface (UI) for a user to select a sound localization point (SLP) for a voice of a caller to answer a telephone call and convolve the voice in accordance with an example embodiment.

FIG. 3 is a method executed by an electronic device that provides a user interface (UI) for a user to select a sound localization point (SLP) for a voice of a caller to answer a telephone call. The example embodiment is described with reference to a user receiving a telephone call from a caller, but is also applicable to the user placing a telephone call to another person or another user.

Block 300 states receive a telephone call from a caller. An electronic device receives a telephone call from a caller that is a person or a user.

Block 310 states display, on a display of an electronic device and before the telephone call is answered, a user interface (UI) that simultaneously includes a first icon or image that when selected provides a voice of the caller to the user in monophonic sound or stereo sound and a second icon or image that when selected provides the voice of the caller to the user in binaural sound such that the voice of the caller externally localizes to the user at a sound localization point (SLP) that is in empty space proximate to but away from the user.

The icons or images can display on, in, or through the electronic device. For example, they can display on a display of a smartphone or be viewable with a head mounted display (HMD) or an optical head mounted display (OHMD).

For example, the electronic device provides a person answering the telephone call with at least two options. One option is to answer the telephone call so the voice of the caller localizes inside the head of the person. Another option is to answer the telephone call so the voice of the caller localizes outside the head of the person to a location near the person.

Block 320 states receive, at the UI of the electronic device, a selection of the second icon or image on the display.

For example, a user provides a command to select the icon or image, such as speaking a voice command, flicking an object on or near the display, moving a finger across or thru the display, tapping a display or location, moving a cursor, performing a drag-and-drop operation, using a hand or body gesture, operating a control on the headphones or a cord attached to them, or using another action to perform the selection.

Block 330 states retrieve, by the electronic device and in response to the selection, one or more head related transfer functions (HRTFs) that are associated with the second icon or image. For example, the HRTFs are retrieved from memory, calculated or computed, or captured in real-time.

Block 340 states answer the telephone call and convolve the voice of the caller with the retrieved HRTFs such that the user localizes the voice of the caller to the SLP that is in empty space proximate to but away from the user.

When the telephone call is answered, the voice of the caller localizes to a location that corresponds to the selected SLP that is in empty space proximate to but away from the user. Alternatively, the SLP can be located at or on a physical object (such as localizing the sound to originate from an object near the user). As another example, the SLP can be away from the person, such as localizing in the distance with respect to the person.

Consider an example in which Alice receives a telephone call on her smartphone from Bob. While her smartphone rings, vibrates, or otherwise announces the incoming call, a display on the smartphone shows two options for localizing the call. As a first option, Alice can select to receive the call in monaural sound or stereo sound so the voice of the caller localizes inside her head. As a second option, Alice can select to receive the call in binaural sound so the voice of the caller localizes outside her head. Alice speaks the word "binaural" and this word commands her smartphone to accept the incoming call so Bob's voice convolves to a SLP that is away from but proximate to Alice's face.

Consider the example above in which Alice receives the telephone call on her smartphone from Bob. Instead of providing a voice command, Alice touches the display of her smartphone in order to command her smartphone to answer the call so Bob's voice convolves to the SLP that she selected on her smartphone.

Figure 4:
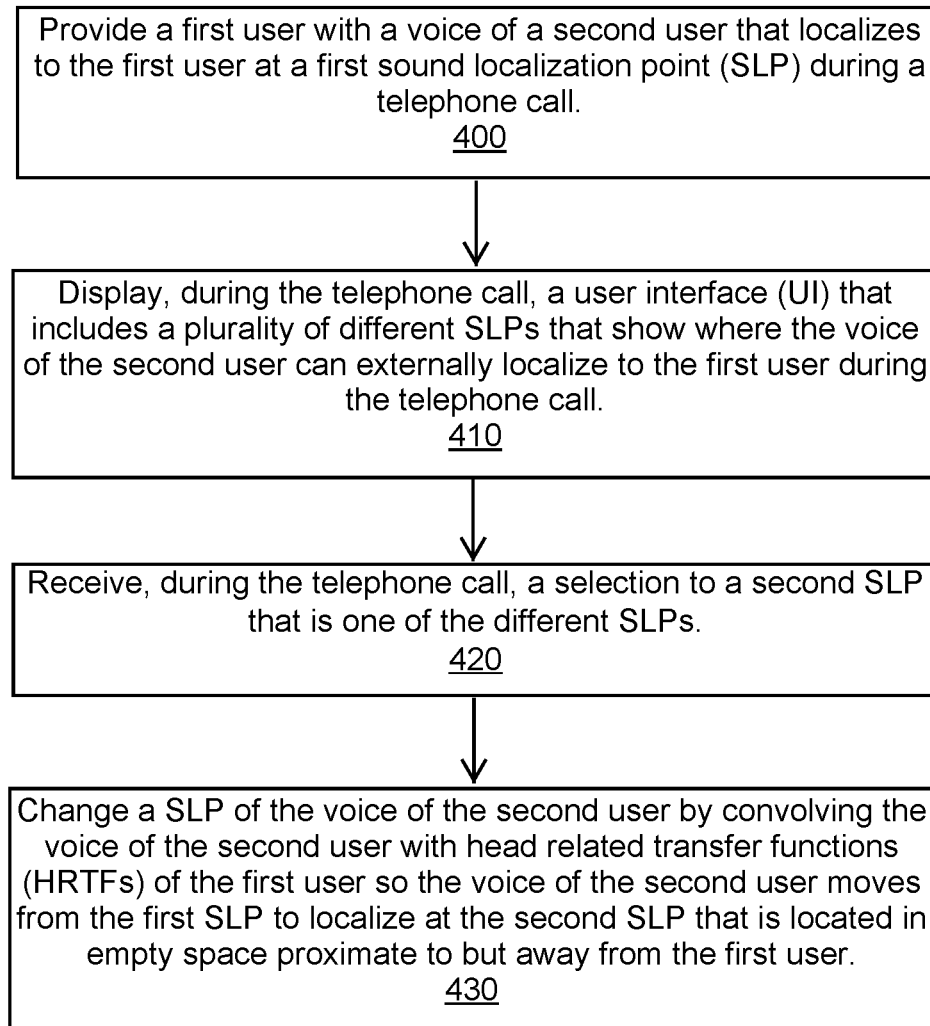
FIG. 4 is a method executed by an electronic device that provides a UI for a first user to change a SLP of a voice of a second user during a telephone call between the first and second users in accordance with an example embodiment.

FIG. 4 is a method executed by an electronic device that provides a user interface (UI) for a first user to change a sound localization point (SLP) of a voice of a second user during a telephone call between the first and second users.

Block 400 states provide a first user with a voice of a second user that localizes to the first user at a first sound localization point (SLP) during a telephone call.

The first SLP can be a location external to the first user, such as a location that is proximate to but away from the first user and provided via binaural sound. Alternatively, the first SLP can be a location that is internal to the first user, such as being inside the head of a person and provided via mono sound or stereo sound.

Block 410 states display, during the telephone call, a user interface (UI) that includes a plurality of different SLPs that show where the voice of the second user can externally localize to the first user during the telephone call.

A display shows the first user one or more different locations where the voice of the second user can localize to the first user. These locations or SLPs include points or areas on the user, near the user, away from the user, and/or inside the head of the user. For example, sound can externally localize to a person when the sound is provided to the person through earphones, headphones, or speakers with cross-talk cancellation, or the sound can internally localize to a person such as within the head and toward his left, within his head and centered, or within his head and toward the right.

Block 420 states receive, during the telephone call, a selection to a second SLP that is one of the different SLPs.

A person or another user (such as a process or machine) provides a selection to change the location where the sound localizes to the first user. For example, a person listening to the voice of another party on a telephone call provides this selection to the electronic device through the UI. As another example, an intelligent user agent (IUA) or an intelligent personal assistant (IPA) provides a command or an instruction to the electronic device to change the sound localization point where the person localizes the voice of the other party.

Block 430 states change a SLP of the voice of the second user by convolving the voice of the second user with head related transfer functions (HRTFs) of the first user so the voice of the second user moves from the first SLP to localize at the second SLP that is located in empty space proximate to but away from the first user.

In an example embodiment, each SLP that externally localizes sound to a user includes or corresponds with a left HRTF and a right HRTF for the listener. This pair or set of HRTFs provides the processor (such as a digital signal processor, DSP) with information to convolve the sound so the sound appears to originate from the external SLP. A voice of a person can be moved during the telephone call from one SLP to another SLP by changing the pair of HRTFs used to convolve the sound.

Consider an example in which Alice wears earphones that communicate with her smartphone. She talks to Bob over a telephone call, and Bob's voice localizes to an empty chair located in front of Alice. During the telephone call, Charlie enters and sits in the chair. An intelligent personal assistant named Hal, switches the telephone call to mono sound so Bob's voice moves from localizing on the chair to localizing inside Alice's head. Hal announces the move to Alice through her earphones and also provides a visual indication of the move on the display of Alice's smartphone. This visual indication shows images of the chair and Alice and the SLP moving from the chair to inside Alice's head.

Consider another example in which Alice wears earphones while talking to Bob on an electronic call with her smartphone. Bob's voice externally localizes to a SLP that is in front of Alice and three feet from her face at zero elevation. During the call, she taps the display of her smartphone which then shows an image of a head that represents Alice and an image for a SLP that represents where Bob's voice is currently localizing to Alice. She puts her finger on the display at the SLP and drags it to a new location that is four feet from her face at one foot elevation from her line of sight. Bob's voice immediately moves so Alice hears his voice localizing at the new SLP that she designated on the display of her smartphone.

The electronic device can display multiple different SLPs that show where the sound can be moved, before answering the telephone call, during the telephone call, or after the telephone call (such as a user changing sound preferences for where voices or sounds in a telephone call localize). These SLPs can be individually displayed or shown. By way of example, the SLPs can be displayed as a grid, a matrix, a plane, a sphere, a line, an arc, a circle, a hem i-sphere, or another shape or configuration in two dimensions (2D) or three dimensions (3D). Alternatively, an area on a display or in space can represent multiple SLPs. For example, an electronic device displays an area that includes many SLPs. For instance, a smartphone displays an image of a person and an area around the image. A user can select any location in this area to designate it as a SLP.

Consider an example in which a smartphone displays an icon or image that represents an active SLP (e.g., a location where sound is currently localizing or where sound will localize). A person drags or otherwise moves the icon to a new empty location or an unoccupied location on the display. This new location represents a new or another SLP. The smartphone retrieves or creates HRTFs that correspond with this new SLP.

Consider an example in which Alice wears a head mounted display (HMD) with earphones so she can externally localize binaural sound. While playing a 3D game, Alice receives a telephone call from Bob whose voice externally localizes to Alice at a SLP. The coordinates of the SLP can be mapped or transformed to coordinates in the UI or display of the game's 3D rendered environment. An image of Bob is shown at the coordinates in the game interface. So Alice sees an image of Bob at a location that matches the localization of the voice of Bob. During the telephone call, Alice interacts with a UI of the HMD to change the location in the 3D game where the voice of Bob localizes. She assigns a new SLP for Bob's voice. From Alice's point-of-view, the voice of Bob localizes to a new location in the 3D game.

Example embodiments include a user interface that can simultaneously manage multiple different users or characters during a person's telephone call. For example, the user interface shows one or more of an image that represents the person, an image that represents each of the other persons or users in the telephone call, an image that represents other sounds or voices (such as an image that represents an IUA or an IPA), an image or an indication that represents who or what character or virtual image is currently producing sound (such as highlighting, animating, or using color to indicate a user or character producing sound), images to represent objects (such as objects or boundaries proximate to the person), and one or more images to represent SLPs (so a person can visualize current, available, or possible sound localization points).

Consider an example in which Alice talks to Bob on her electronic device during a call and a voice of Bob externally localizes to Alice. During this call, Alice receives an incoming call from another person, Charlie, who requests to join the call. The smartphone knows the SLP and/or HRTF being used to convolve the voice of Bob and their coordinates. So the smartphone knows where the voice of Bob is currently localizing to Alice, and determines and selects a localization point appropriate for the voice of Charlie based on this information, Alice's user preferences, and other information. The smartphone displays to Alice her location, the location of Bob (the SLP assigned to Bob's voice), and the location of Charlie (the SLP selected for Charlie's voice).

The electronic device can make intelligent decisions or recommendations for where to place voices or sound during telephone calls. Consider an example in which this decision is based on or includes a spatial arrangement of SLPs. An intelligent personal assistant ("Hal") for Alice knows she will have a teleconference with Bob and Charlie. Bob calls first, and his voice localizes to a left side of Alice's face at (1.0 m, −30°, 0°). Charlie then calls, and Hal places the voice of Charlie on a right side of Alice's face at (1.0 m, +30°, 0°). In this way, Bob's voice localizes to Alice's left side, and Charlie's voice localizes to Alice's right side so the voices are symmetrically distributed around the face of Alice. Hal displays images of Alice, Bob, and Charlie and their positions relative to each other on her electronic device so she can visually see her audible perception of the spatial relationship between the parties and their voices.

Binaural sound can greatly increase the realism of a conversation and therefore the amount and efficiency of information transmitted. At the same time, binaural sound can in some instances cause a problem. As one example, when multiple voices without visible references externalize to a person, then the locations of the voices can become confusing. Additionally, the person may have difficulty in discerning between the voices of different people if the voices are too close together. Further yet, the person may want the voices spaced in ordered natural positions that emulate or approximate where the voices would consecutively appear if the person were talking to the participants in a face-to-face situation. Example embodiments solve these problems and others.

One example embodiment evenly splits or distributes SLPs when multiple users are communicating during an electronic communication or electronic voice exchange, such as a telephone call or voice exchange with multiple computer programs or processes. For example, an even distribution of parties more closely emulates or approximates an even or natural distribution seen when people stand or sit together talking (e.g., as opposed to being bunched together relative to any single participant). The distance between SLPs for multiple users can be provided as a symmetrical pattern, symmetrical distribution, or logical organization around a head or around a perimeter of the listener (as opposed to a random and arbitrary distribution). An even distribution of voices or sounds can also improve communication with one or more intelligent personal assistants, one or more people, and/or one or more software programs. A logical or organized distribution of the SLPs around the person help the person to remember where the SLPs are located and also provide a more natural acoustic landscape for the listener.

Consider an example in which Alice is engaged in a telephone call with Bob. Hal (Alice's intelligent personal assistant) and Charlie (Alice's friend) want to join the call. Where should the voices of Charlie and Hal be located? Where should the voice of Bob be moved, if at all? Also, where should the voices be moved if one of the users leaves the call or another user (David) also joins the call?

Alice may not know the answers to these questions or may be too busy or occupied to answer them because during face-to-face conversations a listener does not need to answer these questions as the participants arrange themselves naturally or organically as they join a conversation. For this reason SLP locations can be automatically determined without troubling the user. Alternatively, Alice can designate SLP positions but she may want assistance in answering these questions to help in determining her options for placement of the SLPs. Example embodiments (including user interfaces disclosed herein) assist in solving these problems and others.

FIGS. 5A-5D show tables that provide locations for placing voices or sounds during an electronic communication such as an electronic voice exchange with three or more users. The tables can be provided to a person and/or a computer program to assist in determining placement of sounds of multiple users simultaneously engaged in an electronic communication or voice exchange. The tables and/or information in them also assist in determining where to position voices when a user is added to or removed from an electronic communication, and to inform the person of the placement logic.

The tables and information in FIGS. 5A-5D are for an elevational angle of zero degrees (0°). These tables can also be applicable for different elevational angles, such as a series of tables for +10° elevational, −10° elevational, +20° elevational, −20° elevational, etc. These tables are omitted for brevity but can be envisioned to one of ordinary skill in the art upon reading this disclosure. Further, the tables are for far-field distances, about one meter or greater, and azimuth angles are provided from a point-of-view of a forward-looking direction or forward line-of-sight of the user (i.e., the listener of sound from the SLPs with the line-of-sight being a forward-looking direction of the face of the listener that extends along a straight line from an end of the nose of the listener). Further, the information is presented in tables for illustration and can be stored and displayed in other formats, for other increments, for complex non-symmetric spacing, and for spacing schemes that vary by elevation, user, situation, or other criteria. The tables are not limited to static values or dimensions and may be complex relational table sets with dynamic values that vary over time according to many variables. The designations in FIGS. 5A-5D "first", "second", "third", "fourth" and "fifth" users are column names for the purpose of example illustration. The designations can refer to the order of a user's arrival on a call but rows and columns can be selected according to other criteria. The values stored in the tables can be updated such as replacing an angular value for the position of a first or second user with a new value corresponding with a new SLP location preferred by the user.

Figure 5A:
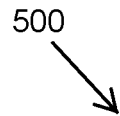

FIG. 5A shows a table 500 for three users in an electronic communication (labeled as "Three Party Communication"). The table shows azimuth placement locations for SLPs and distances between them for voices of two of the users (a first user and a second user) with respect to a third user (the third user being the listener). The first column (Azimuth of First User) shows azimuth angles for placement of the SLP for the voice of the first user, and the second column (Azimuth of Second User) shows azimuth angles for placement of the SLP for the voice of the second user. The third column (Spacing between Users) shows differences or spaces between the SLPs of the first and second user as perceived by the third user.

Consider an example per table 500 when a first SLP of a first user is placed at an azimuth angle of +30°, a second SLP of a second user is placed at an azimuth angle of −30°, corresponding to a spacing of 60° between the voices. If the voices were placed in a conference call or multi-party call, then the voice of the first user localizes to (1.0 m, +30°, 0°) and the voice of the second user localizes to (1.0 m, −30°, 0°).

Figure 5B:
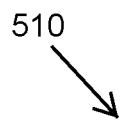

FIG. 5B shows a table 510 for three users on an electronic communication (labeled as "Three Party Communication"). The table shows azimuth placement locations for SLPs and distances between them for voices of two of the users (a first user and a second user) with respect to a third user (the listener). The first column (Azimuth of First User) shows azimuth angles for placement of the SLP for the voice of the first user, and the second column (Azimuth of Second User) shows azimuth angles for placement of the SLP for the voice of the second user. The third column (Spacing between Users) shows an angular difference in degrees.

As shown in the first column of table 510, an azimuth angle of zero degrees (0°) represents a location that is directly in front of the user. For example, if the distance from the face of the user is set to a far-field value (e.g., 1.2 meters) and the elevation angle is set to zero degrees (0°), then the location of the SLP is (1.2 m, 0°, 0°).

The first column of table 510 also shows that the location of the SLP for the first user can be located inside the head (IHL) of the listener. In such an instance, the listener localizes the sound to originate inside his or her head. The first column thus shows possibilities for two different locations of the SLP of the first user: azimuth angle of zero degrees (0°) and IHL.

The second column of table 510 shows azimuth angles for placement of SLPs for the second user. A plus or minus symbol (±) indicates either plus or minus and thus shows possibilities for two different locations of the SLP. So a value of ±15° signifies the location of +15° or the location of −15°.

The first column of table 510 (showing alternatives 0° and IHL) and the second column of table 510 (showing an alternative of plus or minus, ±) provide a way to condense information in the tables for the purpose of this illustration only. The first row in table 510 actually provides four different possibilities for SLP placement as follows:
(1) first SLP of first user at 0° and second SLP of second user at +15°;
(2) first SLP of first user at 0° and second SLP of second user at −15°;
(3) first SLP of first user at IHL and second SLP of second user at +15°;
(4) first SLP of first user at IHL and second SLP of second user at −15°.

FIG. 5C shows a table 520 for four users of an electronic communication (labeled as "Four Party Communication"). The table shows azimuth placement locations for SLPs for voices of three of the users (a first user, a second user, and a third user) with respect to a fourth user (the listener). The first column (Azimuth of First User) shows azimuth angles for placement of the SLP for the voice of the first user; the second column (Azimuth of Second User) shows azimuth angles for placement of the SLP for the voice of the second user; and the third column (Azimuth of Third User) shows azimuth angles for placement of the SLP for the voice of the third user.

Consider an example that utilizes table 520 for SLP placement. Alice communicates with her intelligent personal assistant (named Hal) and localizes a voice of Hal inside her head (i.e., at IHL). During this time, Alice receives a telephone call from Bob. Hal (whose voice localizes in Alice's head) places the voice of Bob at (1.2 m, +30°, 0°). Shortly thereafter while still talking to Bob, Charlie calls Alice. Hal places the voice of Charlie at (1.2 m, −30°, 0°). This scenario represents an example of Hal consulting table 520 and retrieving value −30° from row 5. In this situation, Alice can talk to three different users (Hal, Bob, and Charlie) and be able to readily distinguish the locations of their voices spaced around her.

FIG. 5D shows a table 530 for five users in an electronic communication (labeled as "Five Party Communication"). The table shows azimuth placement locations for SLPs and distances between them for voices of four of the users (a first user, a second user, a third user, and a fourth user) with respect to a fifth user (the fifth user being the listener of sound from the SLPs). The first column (Azimuth of First User) shows azimuth angles for placement of the SLP for the voice of the first user; the second column (Azimuth of Second User) shows azimuth angles for placement of the SLP for the voice of the second user; the third column (Azimuth of Third User) shows azimuth angles for placement of the SLP for the voice of the third user; and the fourth column (Azimuth of Fourth User) shows azimuth angles for placement of the SLP for the voice of the fourth user.

The information in the rows and columns of the tables can also include information about HRTFs to enable the computer system or electronic device to quickly retrieve data to convolve sound. Consider an example in which Alice interacts with a user interface through her smartphone and selects her preferred SLP for her intelligent personal assistant (Hal). Her smartphone displays a picture with a head that represents Alice and prompts Alice to select where she wants to hear the voice of Hal. Alice places her finger on the display at a location to the right side of her head. This location on the display corresponds to the point in her physical environment at (1.2 m, +30°, 0°). The smartphone retrieves Alice's left and right HRTF that correspond for this location as stored in a lookup table. Later, Bob telephones Alice while she is talking to Hal, whose voice localizes to (1.2 m, +30°, 0°). Alice's sound user preferences indicate that she prefers table 500 for SLP placement. When Bob calls, the smartphone consults the lookup table and determines that the voice of Bob should be placed at (1.2 m, −30°, 0°). The lookup table for this location also includes the HRTF file for convolving sound to this location. When Alice answers the call, Bob's voice is immediately convolved by the HRTF and hence originates at (1.2 m, −30°, 0°) to Alice.

The information in the tables in FIGS. 5A-5D can be displayed with an electronic device so a user can see the SLPs and information associated with them (such as whether a SLP is occupied with a voice, whether a SLP is free or available to accept a voice for localization, coordinates or location information of the SLP (such as one or more of r, θ, and φ), information contained in the tables, a name of a person or user assigned to a SLP or a name of a person or user localized to a SLP, common or recent uses of a SLP, user preferences for a SLP, and other information discussed herein). Furthermore, a user can issue commands to the electronic device to manage the SLPs and sounds originating therefrom, such as a command or instruction to move voices or sound from one of the SLPs to another SLP, to pause sound at a SLP, to resume sound at a SLP, to stop sound at a SLP, etc.

Consider an example in which a person wears or has an electronic device (such as a HMD or a smartphone) that executes head tracking while voices and sounds emanate from multiple different SLPs in a 3D VR environment. As these SLPs move, a digital signal processor (DSP) needs to execute many instructions in order to convolve the sounds in real-time so the sounds continue to emanate from the objects or SLPs as they move in the VR environment and/or with respect to the person's moving head. To assist in meeting this processing demand and provide real-time synchronization between moving virtual objects and sound emanating from them, the DSP retrieves SLP and HRTF information from tables or a database and further coordinates with information on object location from the video controller.

Example embodiments include user interfaces that assist in managing SLPs. These SLPs are located in empty space away from but proximate to the user (such as being near-field or far-field SLPs). Alternatively, one or more of SLPs can be on or at an object. For instance, a SLP occurs where an object is located such that sound appears to the listener to emanate or originate from the object. Further yet, SLPs can be located such that sound appears to emanate from or originate from inside the head of the user.

Example embodiments include displays and interfaces that are applicable to a variety of electronic devices, such as smartphones, laptop computers, desktop computers, tablet computers, electronic glasses, optical head mounted displays, head mounted displays, and other wearable and handheld portable electronic devices. Further, some of these figures show user interfaces (UIs) on a two-dimensional (2D) display or with 2D images, icons, and figures, but example embodiments can also be provided on a three dimensional (3D) display or with 3D images, 3D icons, 3D views, 3D figures, etc.

These figures also show icons, images, or buttons that can be selected or activated with one or more different commands. Examples of commands include, but are not limited to, a voice command, a drag-n-drop operation, a touch action (such as touching a display or surface), a slide action (such as sliding a finger, pen, or stylus, on a display or surface), a tap action (such as tapping a finger on a display or surface), a body gesture (such as motion or movement of a hand or finger or other part of a human body), eye movement or eye gaze (such as a command based on eye tracking, eye movement, or eye gaze), a process or software command (such as a command from an intelligent user agent or intelligent personal assistant), and other types of commands or instructions that can be provided to a user interface or an electronic device.

Figure 6:
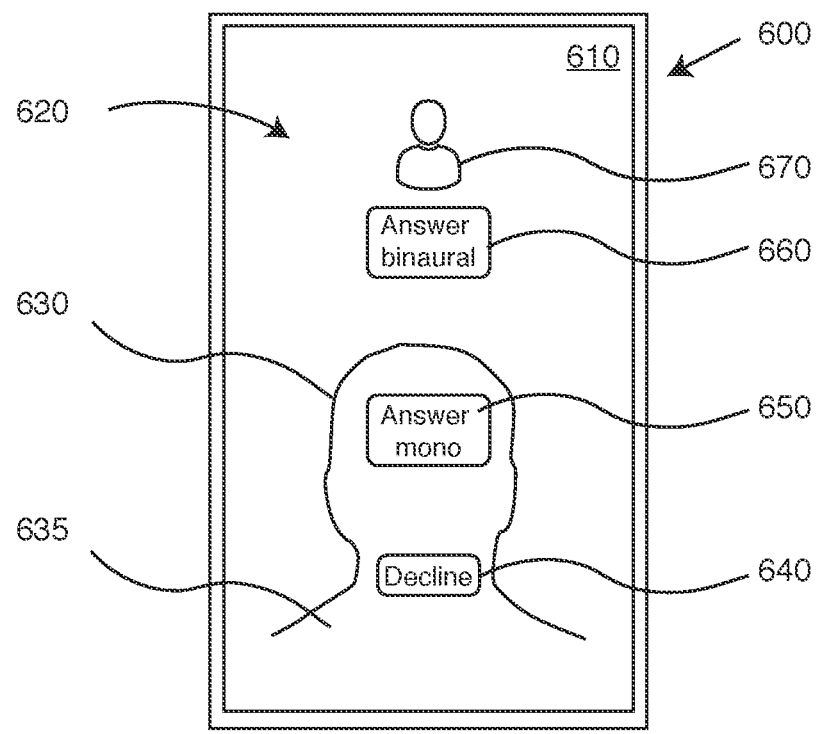
FIG. 6 is an electronic device with a UI in accordance with an example embodiment.

FIG. 6 shows an electronic device 600 with a display 610 that displays a user interface 620 for answering an incoming telephone call. The user interface 620 includes an image of a back of a head 630 of a user or a person 635, a decline to answer button 640 (shown as "Decline"), an answer in mono button 650 (shown as "Answer mono"), an answer in binaural button 660 (shown as "Answer binaural"), and an image that represents a caller or an image of a caller 670.

The user interface 620 provides a user with an option to answer the incoming telephone call in mono sound via button 650 or answer the incoming telephone call in binaural sound via button 660. The user also has the option to decline the incoming telephone call via button 640.

In some instances, answering telephone calls in binaural sound can present a problem since a user may not be accustomed to listening to binaural sound or accustomed to answering telephone calls such that voices externally localize to him. Example embodiments provide various solutions to these problems.

As one example solution, the user interface 620 provides words to indicate the type of sound experience the user may select when answering the telephone call. For instance, button 650 states "Answer mono" to indicate with words that if selected the caller's voice will be rendered in monaural sound (this button could also include words to indicate answering the call in stereo sound). Button 660 states "Answer binaural" to indicate with words that the call will be answered in binaural sound such that the voice of the caller will externally localize to the user.

As another example solution, the user interface 620 provides a frame-of-reference or a location of the buttons 650 and 660 that indicate where the voice of the caller will localize to the user. For example, button 650 is located inside the head 630 of the person 635. This depiction provides the user with a visual indication with images that selection of button 650 will localize the voice of the caller inside the head of the user since the button 650 is located inside the head 630 of the person 635. As another example, button 660 is located outside of the head 630 of the person 635. This depiction provides the user with a visual indication with images that selection of button 660 will localize the voice of the caller outside the head of the user since the button 660 is located outside the head 630 of the person 635.

As yet another example solution, the buttons 650 and 660 can be provided with a certain color such that the color indicates to the user where the voice of the caller will localize. For example, button 650 is colored green, and this color symbolizes or represents that the call will localize internally or inside the head of the user. By contrast, button 660 is provided with a different color, such as blue. The color blue or sky blue symbolizes or represents that the call will localize externally or outside the head of the user. Over a short amount of time, users will be able to quickly associate a color with a location where the sound of the caller will localize. These colors or images can also be flashed, animated, turned on/off, or provided with another visible light sequence to signify a difference between a call that localizes internally and a call that localizes externally.

As yet another example solution, the location and/or size of button 660 and image 670 with respect to the head 630 of the person 635 provides more precise information as to where the voice of the caller will externally localize with respect to the user. In other words, the user interface 620 not only shows that a call will externally localize but the user interface shows to where the voice of the caller will localize with respect to the user (i.e., the user interface shows a location of the SLP for where the listener or person answering the call will hear the voice of the caller). This location can include one or more of (r, θ, ϕ).

Consider the example in which the back of the head 630 of the person 635 represents the user (i.e., the person answering the telephone call) and the button 660 and/or the image 670 of the caller represents where the voice of the caller will localize with respect to the user. FIG. 6 interpreted in perspective shows that the voice of the caller will localize directly in front of the user (i.e., 0° azimuth) since the button 660 and/or image 670 are located directly in front of the head 630 of the person 635. The image 670 is smaller than the head 630 due to a representation in perspective in order to indicate a distance between the head 630 of the person 635 and the button 660 and/or the image 670. This distance represents an approximate distance (r) for how far away the voice of the caller will localize to the user. For instance, a distance between the head 630 and the image 670 implied on the user interface 620 can represent a far-field distance, a near-field distance, or a more precise distance between the user and the SLP. Further, unless otherwise provided on the user interface 620, a default value for elevation can be set to 0°. As such, the user interface 620 communicates the user distance (r) between the user and the voice of the caller, azimuth angle (θ) for where the voice of the caller will localize with respect to the user, and an elevation angle (ϕ) for where the voice of the caller will localize with respect to the user.

As yet another example solution, one or more sounds are provided to indicate to the user whether the voice of the caller will localize internally to the user or will localize externally to the user. One or more of these sounds are provided to the user before, during, or after the incoming call. For example, a location of the sound of the ring indicator for an incoming call on the electronic device indicates where the voice of the caller will localize. For instance, a SLP for the ringtone provides the user the location of the voice of the incoming caller. If the ringtone occurs inside the head of the user wearing headphones (such as a traditional mono ringtone), then the user knows that the voice of the caller will localize at a SLP inside the head of the user. On the other hand, if the ringtone occurs outside the head of the user (such as a binaural ringtone that localizes to a point or area external to the listener), then the user knows the voice of the caller will localize at the SLP where the user hears the ringtone. Thus, the SLP of the ringtone designates the location where the voice of the caller will originate.

Consider an example in which a 3D sound (i.e., a sound that localizes to one or more points that are external to the listener) plays on, over, or with the incoming call notification. For instance, when Bob calls Alice, her smartphone vibrates to notify Alice that she is receiving an incoming call. At the same time, a binaural externalized "swish" sound passes through or around her head one or more times to indicate that Bob is requesting a binaural call or that her smartphone will receive and play the call in binaural sound by default if answered, so that the voice of Bob will externally localize to Alice.

Example embodiments are not limited to these solutions or the layout provided in FIG. 6. Additional solutions to these problems and others involving binaural sound are provided in other example embodiments.

Figure 7:
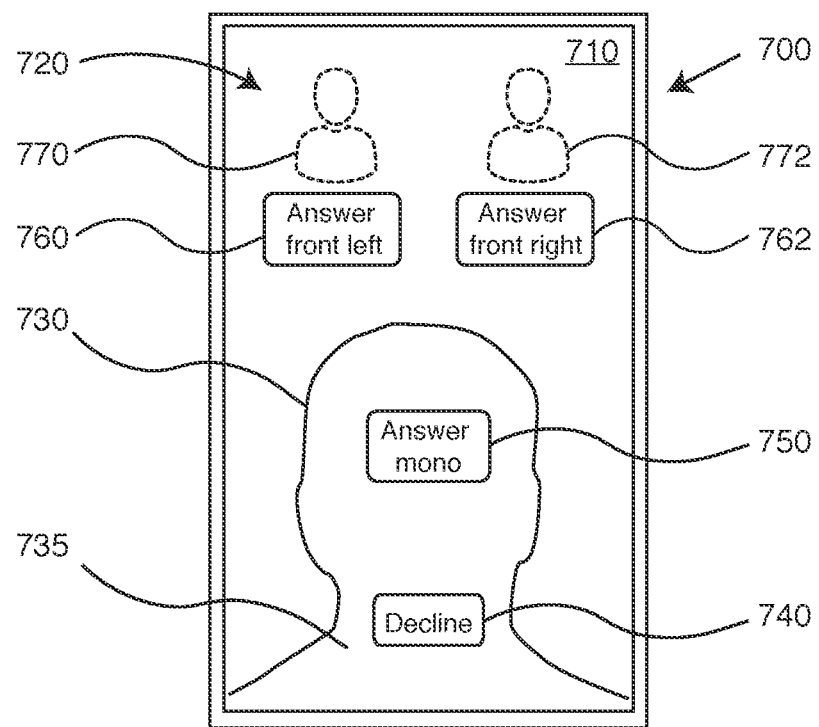
FIG. 7 is an electronic device with a UI in accordance with an example embodiment.

FIG. 7 shows an electronic device 700 with a display 710 that displays a user interface 720 for answering an incoming telephone call. The user interface 720 includes an image of a back of a head 730 of a person 735, a decline to answer button 740 (shown as "Decline"), an answer in mono button 750 (shown as "Answer mono"), a first answer in binaural button 760 (shown as "Answer front left") with a first image of a caller 770, and a second answer in binaural button 762 (shown as "Answer front right") with a second image of the caller 772.

The user interface 720 provides a user with an option to answer the incoming telephone call in mono sound via button 750 or answer the incoming telephone call in binaural sound at one of two different SLPs via buttons 760 and 762. The user also has the option to decline the incoming telephone call via button 740.

If the user selects to answer the telephone call with button 760, then a voice of the caller will externally localize to the location shown on the display 710. More specifically, the voice of the caller will localize to a SLP that is located in front of and to the left of the user as shown by the location of the caller 770 with respect to the head 730 of the person 735. If the user selects to answer the telephone call with button 762, then a voice of the caller will externally localize to the location shown on the display 710. More specifically, the voice of the caller will localize to a SLP that is located in front of and to the right of the user as shown by the location of the caller 772 with respect to the head 730 of the person 735.

FIG. 7 shows that the user can select between three different SLPs for where to internally or externally localize the voice of the incoming caller. One SLP is located inside a head of the user (answering the telephone call with button 750); one SLP is located outside and to the left of the head of the user (answering the telephone call with button 760); and one SLP is located outside and to the right of the head of the user (answering the telephone call with button 762).

Figure 8A:
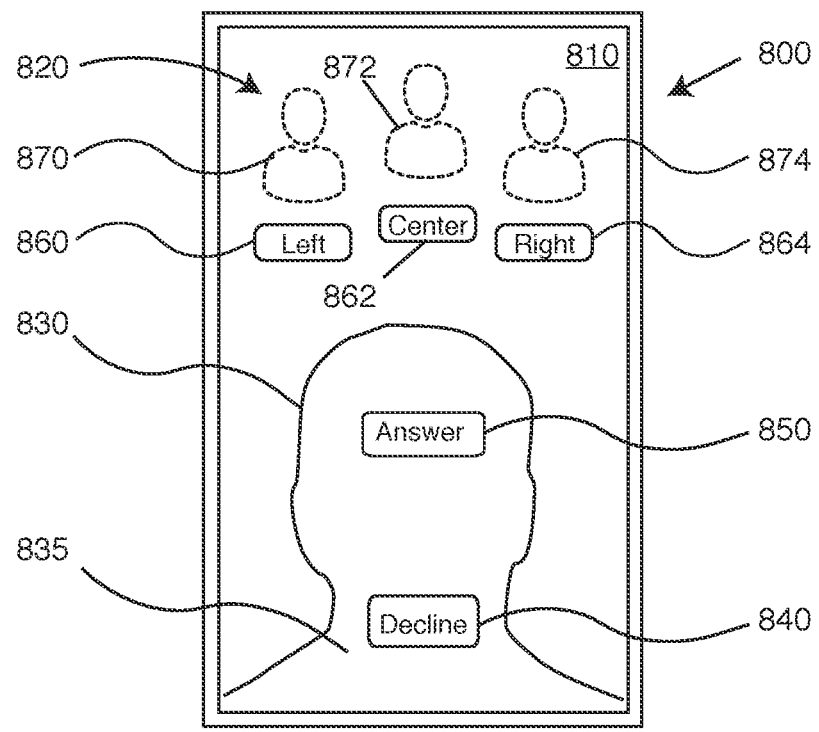
FIGS. 8A and 8B are an electronic device with a UI in accordance with an example embodiment.

FIG. 8A shows an electronic device 800 with a display 810 that displays a user interface 820 for answering an incoming telephone call. The user interface 820 includes an image of a back of a head 830 of a person 835, a decline to answer button 840 (shown as "Decline"), an answer inside the head button 850 (shown as "Answer"), a first answer in binaural button 860 (shown as "Left") with a first image of a caller 870, a second answer in binaural button 862 (shown as "Center") with a second image of the caller 872, and a third answer in binaural button 864 (shown as "Right") with a third image of the caller 874.

The user interface 820 provides a user with an option to answer the incoming telephone call so the voice of the caller localizes inside a head of the user via button 850 or answer the incoming telephone call in binaural sound at one of three different locations via buttons 860, 862, and 864. The user also has the option to decline the incoming telephone call via button 840.

Buttons 860, 862, and 864 communicate to the user before the call is answered where the voice of the caller will localize with respect to the user. These buttons on this type of user interface can also show where the voice of another party will localize if the user is placing an outbound call to another party.

If the user selects to answer the telephone call with button 860, the voice of the caller will localize to a SLP that is located in front of and to the left of the user as shown by the location of the caller 870 with respect to the head 830 of the person 835. If the user selects to answer the telephone call with button 862, the voice of the caller will localize to a SLP that is located directly in front of the user as shown by the location of the caller 872 with respect to the head 830 of the person 835. If the user selects to answer the telephone call with button 864, the voice of the caller will localize to a SLP that is located in front of and to the right of the user as shown by the location of the caller 874 with respect to the head 830 of the person 835.

User interfaces of example embodiments can be used to receive or answer telephone calls, participate in or monitor telephone calls, originate, start or place telephone calls, manage SLPs, communicate with IPAs and IUAs, communicate or interact with 3D VR software programs, etc. By way of example, managing SLPs includes, but is not limited to, pausing sound localization, stopping sound localization, resuming sound localization, moving a SLP, adding a SLP, removing a SLP, modifying a SLP, changing or providing a preference with regard to a SLP, and performing other methods discussed herein.

Figure 8B:
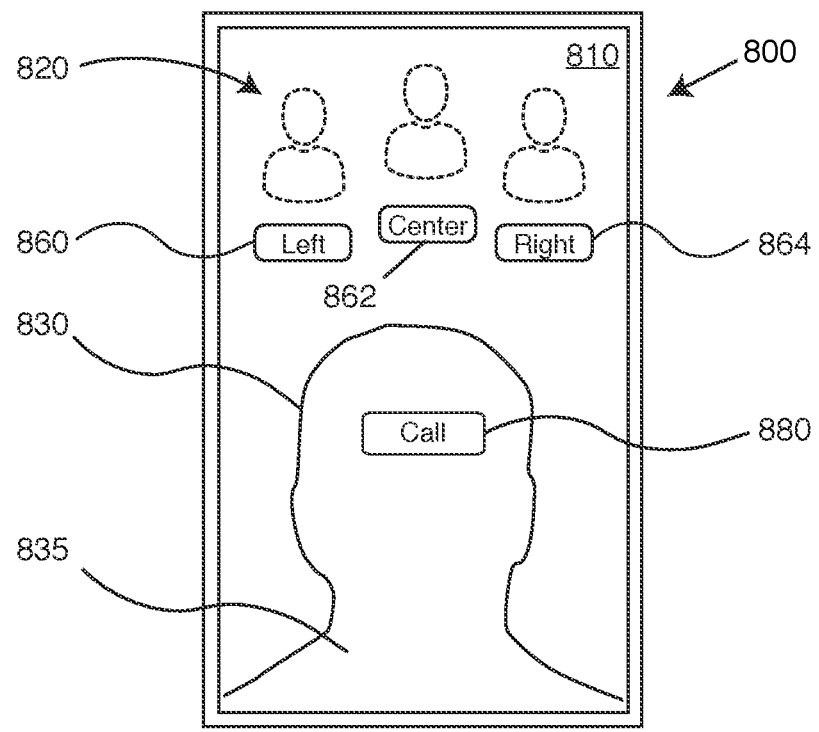

By way of example, FIG. 8B shows user interface 820 of FIG. 8A that is altered or modified so a user can place a telephone call from the electronic device. Specifically, the decline to answer button 840 (shown in FIG. 8A) is removed, and the answer button 850 (shown in FIG. 8A) is replaced with a call button 880. When placing a call to a second user, the first user and call originator can select to localize the voice of a second user to one of four SLPs: inside the head of the first user (shown with call button 880), button 860 (corresponding to a left SLP located proximate to but away from and left from the first user), button 862 (corresponding to a center SLP located proximate to but away from and center-aligned with the first user), and button 864 (corresponding to a right SLP located proximate to but away from and right of the first user).

Figure 9A:
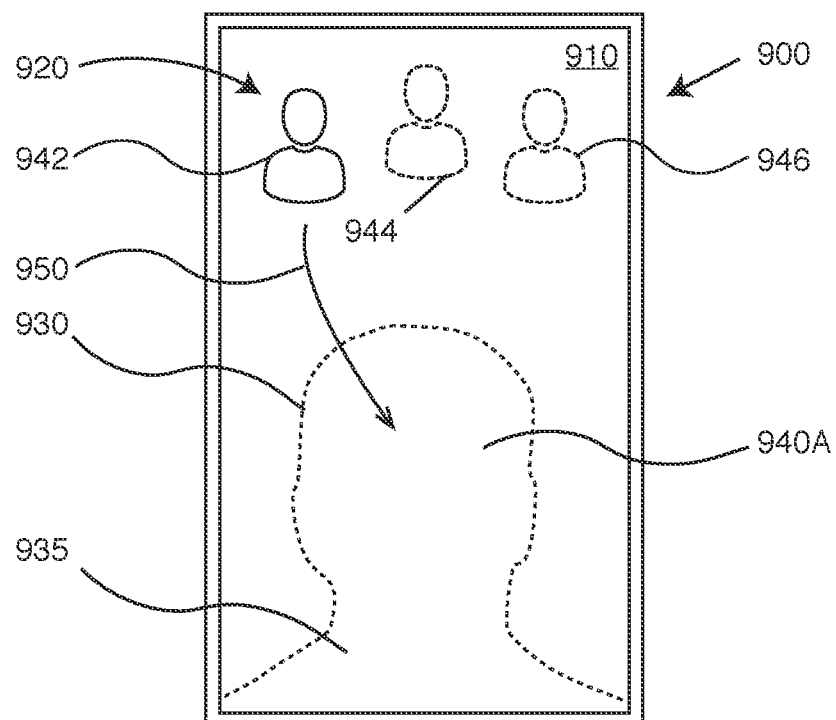
FIGS. 9A and 9B are an electronic device with a UI in accordance with an example embodiment.
Figure 9B:
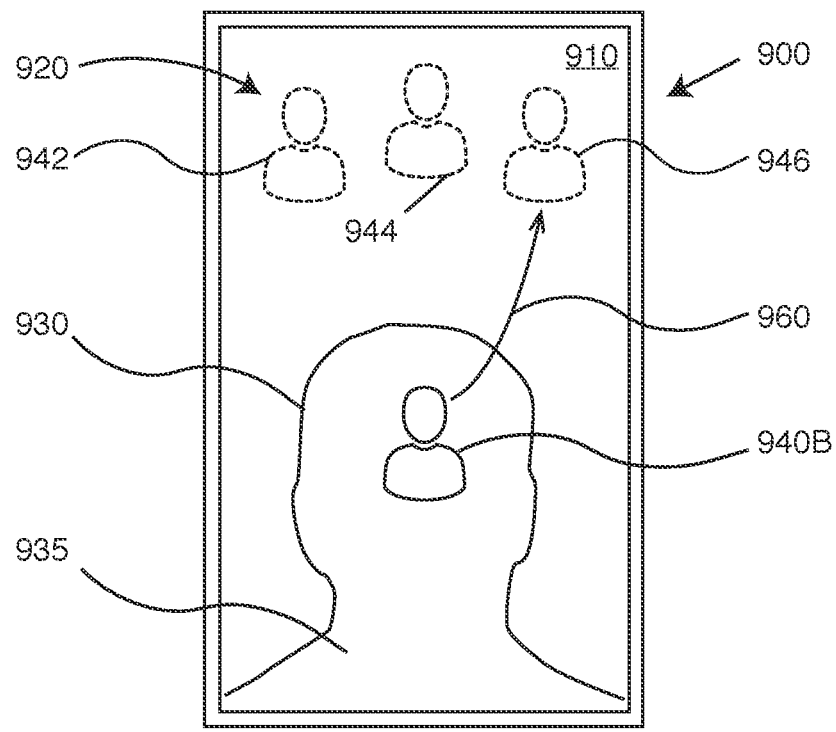

As noted, the user interfaces can also be used to perform managerial functions with respect to binaural sound. For example, a user can create, select, delete, modify, enable/disable, or move SLPs before, during, or after a telephone call, a voice exchange, execution of a software application (such as a 3D game application), etc. FIGS. 9A and 9B show examples of a user interface to move a SLP.

FIGS. 9A and 9B show an electronic device 900 with a display 910 that displays a user interface 920 to move a SLP. The user interface 920 includes an image of a back of a head 930 of a person 935 and four different SLPs: SLPs 940A and 940B located inside the head 930, SLP 942 located at a person to the left of the head 930, SLP 944 located at a person centered relative to the head 930 or directly in front of the head 930, and SLP 946 located at a person to the right of the head 930.

FIG. 9A shows SLP 942 as a person having a solid line (as opposed to SLPs 944 and 946 with dashed lines). By way of example the solid line distinguishes the left SLP 942 as the current or selected SLP. During a telephone call, this selection provides the user with a visual indication that SLP 942 is the selected SLP where the voice of the other person is localizing. In this figure, line 950 indicates that the user is providing a command to switch, move, or change the voice of the person from localizing at SLP 942 to localizing at SLP

940A (i.e., to localizing inside the head of the person). For example, the user provides a voice command or drag-and-drop operation to move the location of the voice during the telephone call or execution of another software program from SLP 942 to SLP 940A. Thereafter, the voice of the remote party will change from externally localizing to internally localizing to the user.

FIG. 9B shows the voice of the remote party now moved to inside the head 930 of the person. SLP 940B has a solid line (as opposed to SLPs 942, 944, and 946 with dashed lines) to indicate SLP 940B is the current or selected SLP. During a telephone call, for example, this indication (which can also include color and/or animation) visually distinguishes SLP 940B as the selected SLP where the voice of the other person is localizing (i.e., localizing inside the head of the user). The user is thus able to quickly discern which SLP is active and where sound is localizing.

In FIG. 9B, line 960 indicates that the user is providing a command to switch, move, or change the voice of a user from localizing at SLP 940B to localizing at SLP 946 (i.e., to localizing to a location outside from and to the right of the listener). For example, the user provides a gesture command or flicking operation to move the location of the voice during the telephone call from SLP 940B to SLP 946. Thereafter, the voice of the remote party to the telephone call will externally localize to the user.

Although FIGS. 9A and 9B are described with examples of moving a SLP during a telephone call, the user interface can also be used to manage SLPs for other software applications. For example, the user moves SLPs to set user preferences. For example, the user selects or activates one or more SLPs to designate a preference for an origin of a voice for an intelligent personal assistant. Alternatively, the user moves the voice of the IPA via one of these user interfaces while talking to the IPA.

Figure 10:
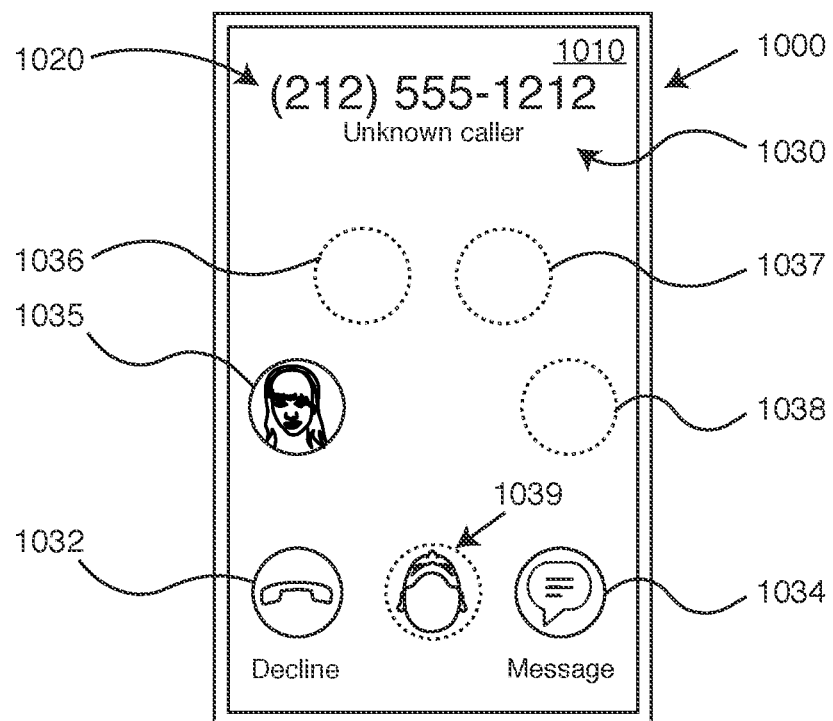
FIG. 10 is an electronic device with a UI in accordance with an example embodiment.

FIG. 10 shows an electronic device 1000 with a display 1010 that displays a user interface 1020 for telephone call. The user interface 1020 includes an identification of an incoming call 1030 (shown as a telephone number (212) 555-1212 from an unknown caller), a decline button 1032, a message button 1034, and five SLPs 1035-1039. SLP 1035 is occupied with a picture of a party already present to the telephone call. This information signifies that the user is already talking to another person whose voice is localizing to SLP 1035. The incoming call (from an unknown caller) can localize to one of four different SLPs 1036-1039. Each of these SLPs are open or available to receive a caller. For example, the user taps or touches one of the SLPs 1036-1039 to accept the incoming call and to localize the voice of the caller to the selected SLP.

SLP 1039 represents the location of the user, and SLPs 1035-1038 are sound localization points that are located away from but proximate to the user. If the user selects SLP 1039, then the incoming call will localize inside the head of the user. This fact is visually shown with an image of a circle around a head. If the user selects SLP 1036, then the voice of the caller will localize to a location that is in front of and to the left of the face of the caller. If the user selects SLP 1037, then the voice of the caller will localize to a location that is in front of and to the right of the face of the caller. If the user selects SLP 1038, then the voice of the caller will localize to a location that is in front of and to the far right of the face of the caller.

Another example embodiment allows the user to select SLP 1035 for the incoming call, and this selection would result in convolving the voice of the new caller to the same position as the voice of the party already present. Alternatively, the voice of the party already present can be automatically moved to a vacant or available SLP 1036-1039.

The user interface of example embodiments can show a relative position of where the voice of the caller will localize to the user, and this relative position can include distance, azimuth, and/or elevation. For example, interface 1020 shows SLP 1036 has an azimuth angle of about negative fifteen to negative twenty-five degrees (−15° to)−25° from the face of the head shown at SLP 1039 that represents the user. SLP 1035 (where a voice of a caller is already localizing) has an azimuth angle of about negative forty-five degrees)(−45° from the face of the head shown at SLP 1039. Likewise, SLP 1037 has an azimuth angle of about fifteen to twenty-five degrees (+15° to +25°), and SLP 1038 has an azimuth angle of about forty-five degrees (+45°). Thus, a user can view the user interface 1020 and get an easy and quick indication of where a voice will localize or where a voice is already localizing.

The user interface can assist users in determining where to localize a voice of a person for an incoming call. For example, users can see sound localization points around them and be provided with a recommendation of where to localize a voice for a telephone call or for another software application.

Figure 11:
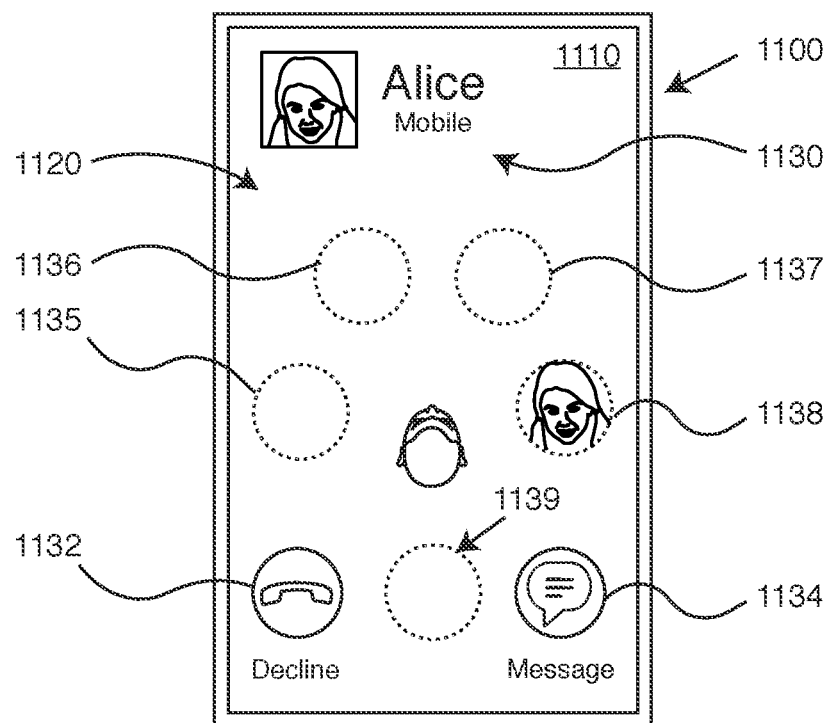
FIG. 11 is an electronic device with a UI in accordance with an example embodiment.

FIG. 11 shows an electronic device 1100 with a display 1110 that displays a user interface 1120 for a telephone call with a recommendation for localizing sound. The user interface 1120 includes an identification of an incoming call 1130 (shown as a telephone call from Alice with her picture), a decline button 1132, a message button 1134, and five SLPs 1135-1139.

If the user selects one of these five SLPs 1135-1139 (e.g., with a touch or voice command), then the incoming call will be accepted, and Alice's voice will localize to the selected SLP. The electronic device, however, provides the user with a recommendation for one of the SLPs as SLP 1138. The user interface 1120 visually distinguishes this recommendation with a picture of Alice already located at the SLP 1138 before the incoming call is answered. The user can accept this recommendation and select SLP 1138. Alternatively, the user can ignore this recommendation and select another SLP or decline the call.

FIG. 11 shows displaying a picture of the incoming caller at the recommended SLP to signify a recommended SLP. Other methods can be used as well to indicate this recommendation, such as animating or blinking a SLP, using color to distinguish a SLP, highlighting a SLP, using sound or voice to distinguish a SLP, using text to distinguish a SLP, or using another indicative method to provide a user with a recommendation for where to place a voice of a party to a telephone call.

A user interface of example embodiments can include visual or audio cues to assist a user in determining a sound localization point for telephone calls and other software applications. By way of example, a visual cue or reference can include an image of an object or a person that provides a frame-of-reference so a person can see or visualize where sound will localize.

Figure 12:
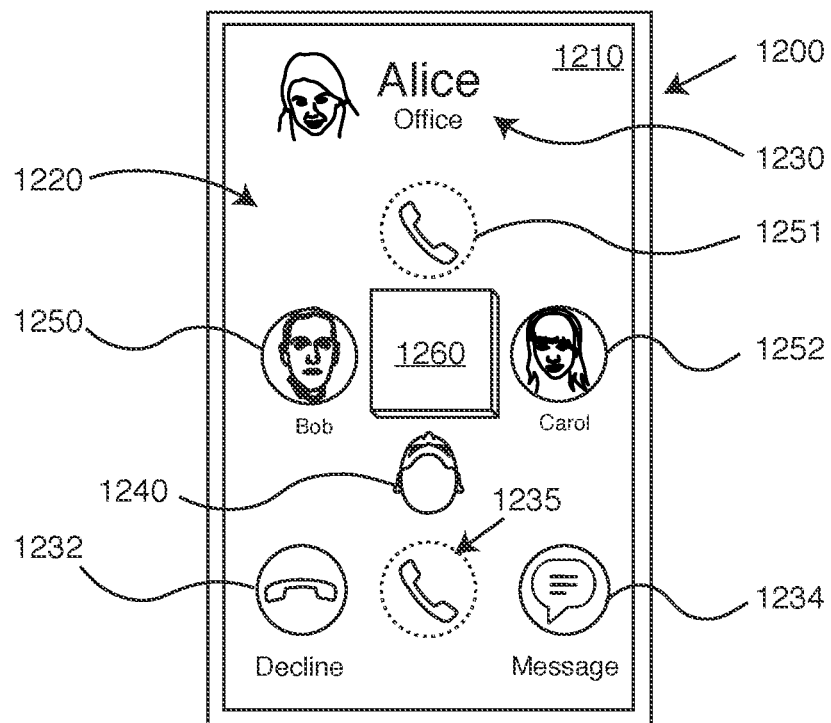
FIG. 12 is an electronic device with a UI in accordance with an example embodiment.

FIG. 12 shows an electronic device 1200 with a display 1210 that displays a user interface 1220 for a telephone call with a visual reference to assist a user in localizing binaural sound. The user interface 1220 includes an identification of an incoming call 1230 (shown as a telephone call from Alice with her picture), a decline button 1232, a message button 1234, an answer button 1235, an image of a head 1240 that represents the user, and three SLPs 1250-1252 around a visual reference 1260 (shown by way of example as a table or a box with four sides).

In an example embodiment, a user can readily discern from the user interface 1220 the different sound localization points, their locations with respect to the user and each other, and their availability. For example, SLP 1250 (which is to the left of the user) is already occupied by or designated to a user Bob. SLP 1252 (which is to the right of the user) is already occupied by or designated to a user labeled Carol. If the user decides to accept the incoming call, he or she can localize Alice's voice at SLP 1251 (directly in front of the user) or at SLP 1235 (inside the head of the user). The user could also rearrange SLP assignments and localize the incoming call to Bob or Carol's location or choose another location.

The visual reference 1260 provides the user a convenient way to spatialize sound or visualize the position(s) where voices will or are localizing relative to the user and each other. This type of visual assistance can be particularly helpful when the user will hear more than one voice or multiple sounds at different SLPs.

Figure 13:
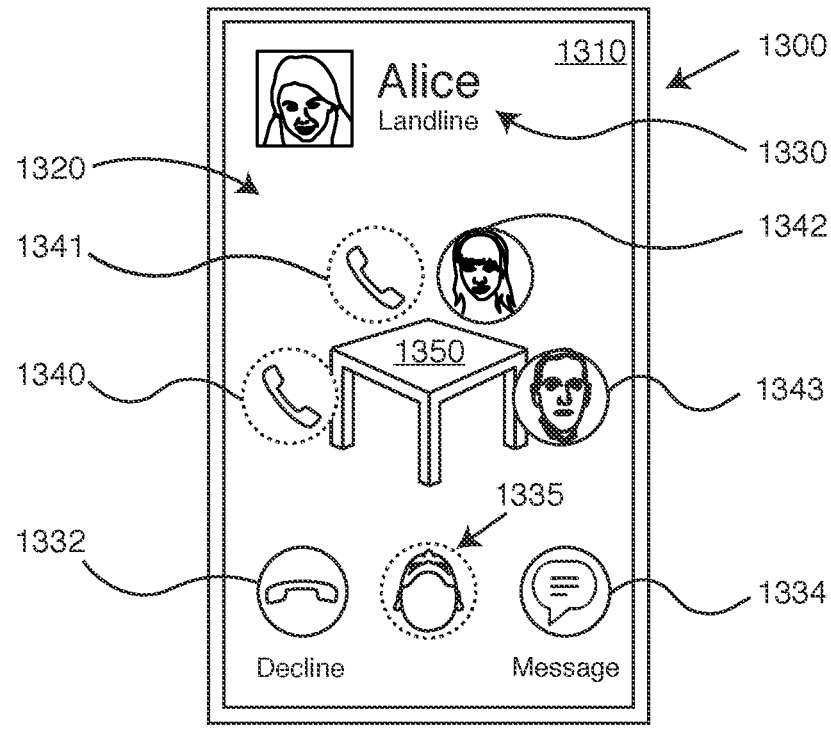
FIG. 13 is an electronic device with a UI in accordance with an example embodiment.

FIG. 13 shows another example of a visual reference that assists users in localizing voices for telephone calls and other software applications. Display 1310 of an electronic device 1300 displays a user interface 1320 that includes an identification of an incoming call 1330 (shown as a telephone call from Alice with her picture), a decline button 1332, a message button 1334, an answer button 1335 that includes an image of a head that represents the user, and four SLPs 1340-1343 around a visual reference 1350 (shown by way of example as a table with four sides). The visual reference 1350 shows a square in two-point perspective (rendered as a diamond shape). Alternatively, the visual reference can be a triangle, circle, or other polygon shown top-down or in any type of perspective.

The user can select one of three empty or available SLPs (1335, 1340, or 1341) to localize the incoming call from Alice. Alternatively, the user can move a voice localizing to SLP 1342 or 1343 and place the voice of Alice at one of these SLPs.

After the user answers or accepts the incoming telephone call from Alice, a picture of Alice appears at the location on the user interface where her voice localizes to the user. Placing an image with the SLP on the user interface or display assists the user in remembering or knowing which person or user is localizing to which location. Instead of or in addition to a picture, the SLP can include other indicia to indicate the person or user at the location. Such indicia include, but are not limited to, text (such as a name or nickname of the person, for example from an address book accessible by the electronic device of the user, or supplied by the remote party), a number (such as a phone number of the person), an icon (such as an image associated with the person or the sound), or an image that distinguishes one user from another user.

Sound can also be used to distinguish SLPs. For example, each SLP makes or has a unique identifying sound that enables the user to distinguish one SLP from another SLP. For example, sounds localized at different SLPs can be adjusted to have different audio "watermarks" or properties such as timbre, echo, attenuation, or spectral characteristics. Other examples of watermarks are background or foreground sounds such as hums, chimes, ticks or sound phrases that occur at different intervals, or incorporating audio tags that differ such as fade-ins or fade-outs, or incorporating, prepending, or appending distinguishing sounds.

Visual references can be used to place and manage telephone calls with binaural sound as well. Consider an example in which Alice's user interface presents a table with four empty SLPs around the table (such as a table shown in FIG. 13). Alice interacts with the user interface to set priorities or preferences for each of the SLPs. For example, she moves a picture of Bob to one SLP, and this instructs the establishment of a preference to localize Bob to this position during telephone calls with Bob.

Figure 14:
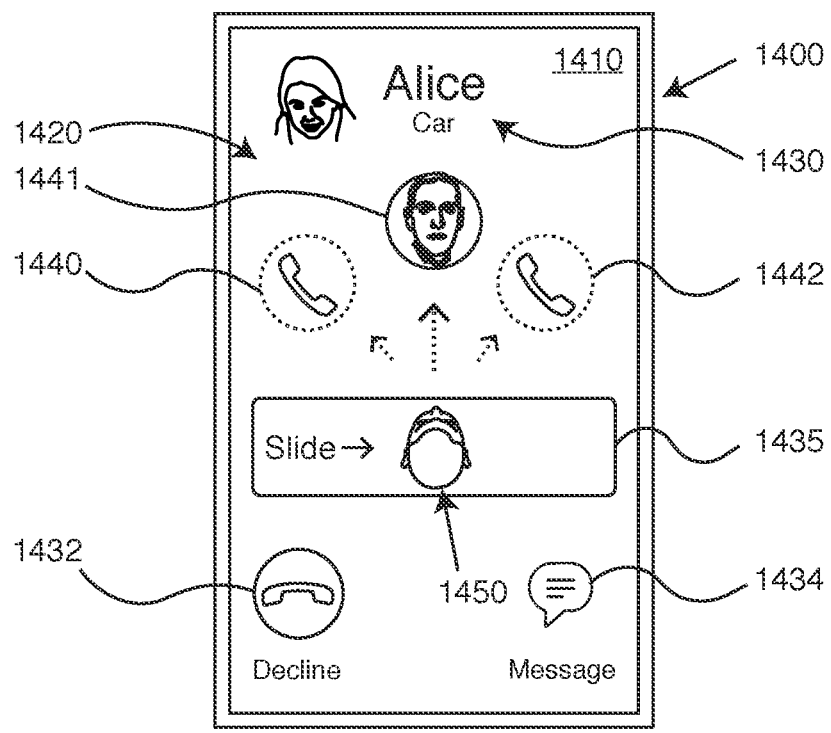
FIG. 14 is an electronic device with a UI in accordance with an example embodiment.

The user interface provides an interface through which users can move, manage, or manipulate SLPs before, during, or after an electronic call. Further, as noted, different types of commands can be used through the user interface. FIG. 14 shows an example of sliding and/or dragging-and-dropping calls or properties between or to selected SLPs.

FIG. 14 shows an electronic device 1400 with a display 1410 that displays a user interface 1420 that includes an identification of an incoming call 1430 (shown as a telephone call from Alice with her picture), a decline button 1432, a message button 1434, a slide-to-answer control 1435, and three SLPs 1440-1442.

The slide-to-answer control includes an image of a head 1450 on the control that provides a frame-of-reference for the SLPs 1440-1442 that are located proximate to but away from the head 1450. When the user performs a slide gesture across the slide-to-answer control 1435, then the incoming telephone call is answered and sound localizes inside the head of the user. Alternatively, the user could tap the head 1450 to answer the call with this type of localization.

Alternatively, the incoming telephone call can be answered to externally localize to the user at one of the three SLPs 1440-1442 (though SLP 1441 is shown to be occupied with another user). When the user performs a slide action on the display starting from the head 1450 to one of the available SLPs 1440 or 1442, then the incoming telephone call is answered convolving sound to localize at the selected external SLP. Alternatively, the user could tap SLP 1440 or SLP 1442 to answer the call at that location.

Figure 15:
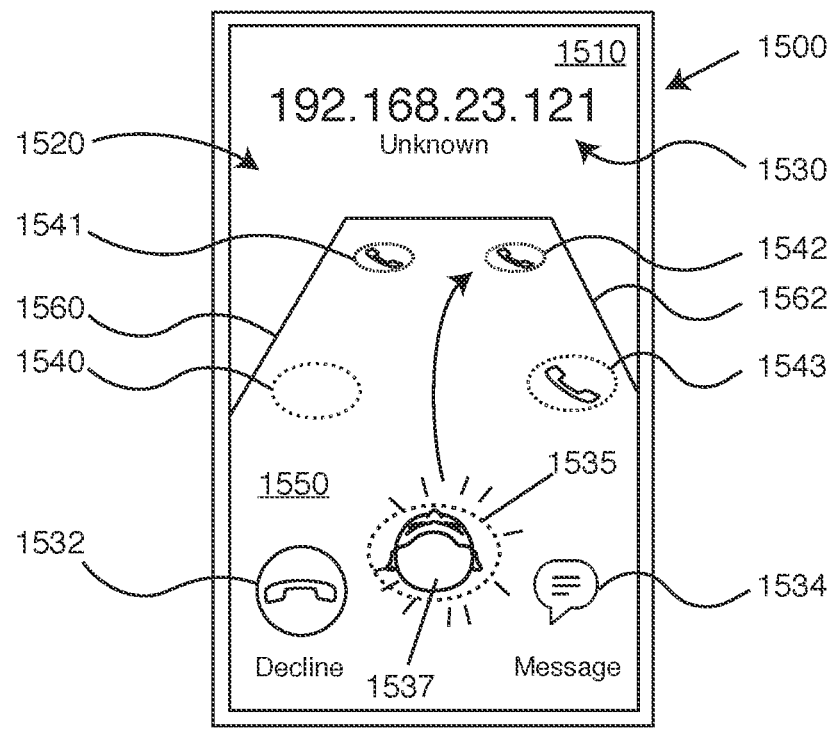
FIG. 15 is an electronic device with a UI in accordance with an example embodiment.

FIG. 15 shows an electronic device 1500 with a display 1510 that displays a user interface 1520 that uses one-point linear perspective to show a distance from a user to one or more SLPs for a telephone call. The user interface 1520 includes an identification of an incoming call 1530 (shown as a VoIP call from an unknown caller), a decline button 1532, a message button 1534, an answer button 1535 that includes an image of a head 1537 in perspective that represents the user, and four SLPs 1540-1543 around a visual reference 1550. The user can answer the call with various commands discussed herein (such as tapping the head 1537, sliding or dragging the head 1537 to one of the SLPs 1540-1543, providing a voice command, etc.).

The visual reference 1550 uses linear perspective with parallel lines 1560 and 1562 seen to converge to a horizon to give the user an illusion of depth and distance for the location of the SLPs 1540-1543. The SLPs 1541 and 1542 are farther away from the head 1537 (which represents the user) and hence are smaller in size than the SLPs 1540 and 1543 that are closer to the head 1537 of the user. The user is thus able to see from the user interface a difference in distances and/or locations where convolved sound will occur around the user when an SLP is selected for a sound source.

A distance and/or location of SLPs with respect to a user can also be shown using one or a combination of static or full motion types of 2D, 2.5D, or 3D representations such as orthographic projections (such as plan and/or elevation views), isometric, axonometric, or oblique projections, perspectives such as zero, one, two, three, four-point linear perspectives, or curvilinear, overhead, reverse, or aerial perspectives. For example the location and size of images, buttons, or icons can be rendered according to a one-point perspective, an isometric projection, an overhead plan view, or a military, cabinet, cavalier, or other projection. With aerial perspective, as a distance between the SLP or object and the user increases, a contrast between the SLP or object and its background decreases. The colors of the SLPs or objects can be altered to be less saturated and/or shift toward a background color. Depth or distance may be shown by modifying the tone, hue, and/or distinctiveness of objects (including SLPs) as receding from the picture plane. Example embodiments further reduce a distinctiveness of colors displayed on the user interface and contrasts of light and dark to display depth or distance to or from an object.

Figure 16:
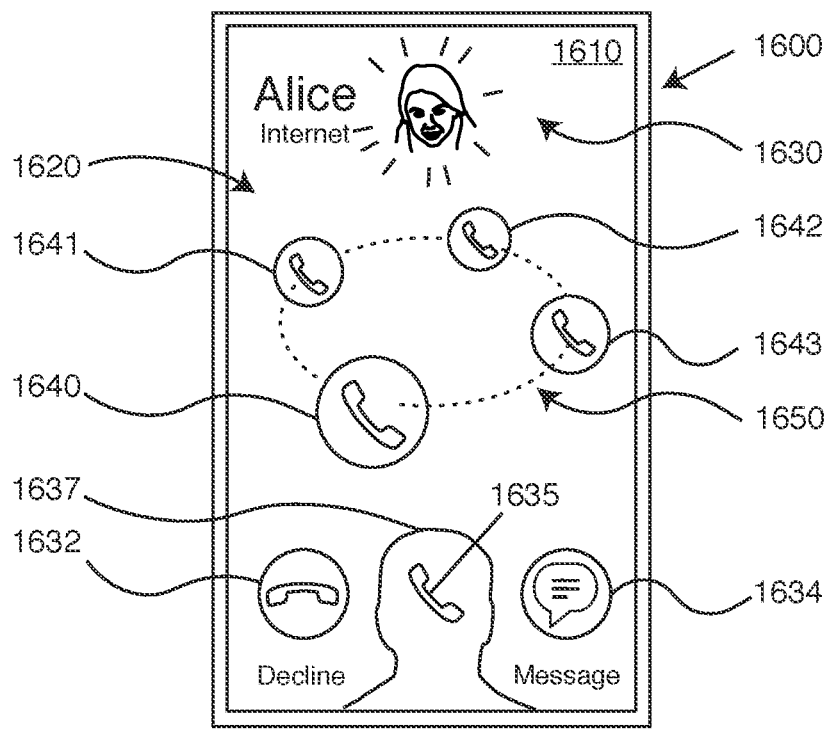
FIG. 16 is an electronic device with a UI in accordance with an example embodiment.

FIG. 16 shows an electronic device 1600 with a display 1610 that displays a user interface 1620 that uses aerial perspective to show a distance from a user to one or more SLPs for a telephone call. The user interface 1620 includes an identification of an incoming call 1630 (shown as a telephone call from Alice), a decline button 1632, a message button 1634, an answer button 1635 located inside a head 1637 that represents the back of the head of the user, and four SLPs 1640-1643 around a visual reference 1650 (shown as a circle or an oval). The user can answer the call with various commands discussed herein (such as tapping the head 1637, sliding or dragging the head 1637 to one of the SLPs 1640-1643, tapping or touching one of the SLPs, pointing to one of the SLPs, hovering a finger over one of the SLPs, providing a voice command, etc.).

The visual reference 1650 uses aerial perspective to provide depth or distance from the head 1637 to the location of the SLPs 1640-1643. The SLPs 1641 and 1642 are farther away from the head 1637 (which represents the user) and hence are smaller in size than the SLPs 1640 and 1643 that are closer to the head 1637 of the user. Further, the tone or hue or contrasts of light and dark with regard to the SLPs or background colors on the display of the user interface are modified to imply depth or distance to the SLPs. The user is thus able to see from the user interface a difference in distances and/or locations for where SLPs will occur around the user when sound localizes to these SLPs.

Figure 17:
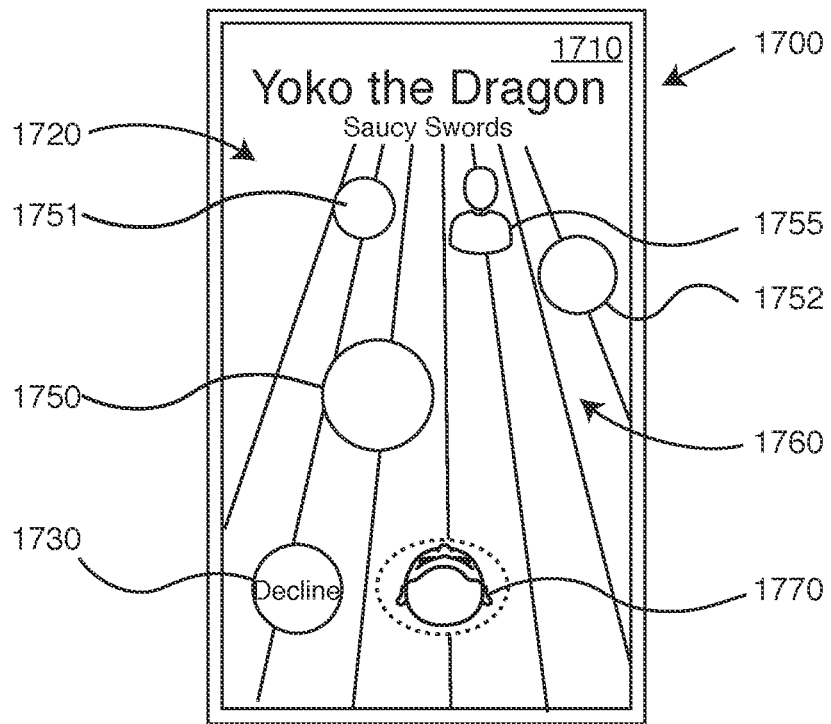
FIG. 17 is an electronic device with a UI in accordance with an example embodiment.

User interfaces with example embodiments are not limited to telephone calls but apply to voices and sounds in other software applications as well. For example, FIG. 17 shows an electronic device 1700 with a display 1710 that displays a user interface 1720 that enables a user to select a SLP for a voice in a software computer game. While playing a computer game (called Saucy Swords), a voice in the game from a character (named Yoko the Dragon) speaks or makes a sound to the user or another character. An operating system (OS) of the electronic device executing the game presents the user interface 1720 to the user on his or her electronic device (such as a smartphone). The user interface 1720 queries the user as to where to localize the voice of the character Yoko the Dragon. In other words, the user is being asked: Where do you want the voice of Yoko the Dragon to localize? If the user takes no action or selects the decline button 1730, then the voice of the dragon will continue to play as the unmodified sound provided by the game such as localizing inside the head of the user (e.g., continue to be provided in mono sound or stereo sound). Alternatively, the user can select one or more SLPs from the set of SLPs active and displayed on the user interface 1720 for localizing the voice of Yoko the Dragon. The user interface 1720 displays three available SLPs 1750-1752 to localize the voice. SLP 1755 is not available since it is currently being used and, as such, is shown with an image of a person. The image of the person signifies to the user that the SLP is occupied or not available for the voice of Yoko the Dragon.

The user interface 1720 also includes a plurality of lines 1760 that provide linear perspective so the user can visually discern distance, location, and/or depth from the user to the SLP being selected. The user is represented on the user interface with an image of a head of a person 1770 (which can be an actual image of the user to assist the user in seeing a point-of-view or reference frame for where sounds will localize with respect to himself).

Figure 18:
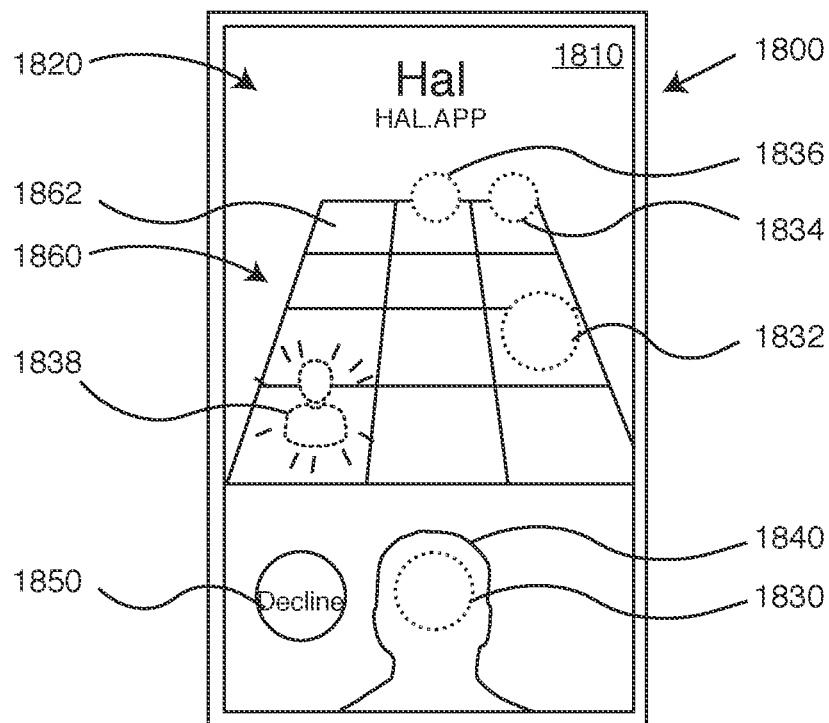
FIG. 18 is an electronic device with a UI in accordance with an example embodiment.

User interfaces of example embodiments can also assist in placing or managing SLPs for voices of intelligent user agents (IUAs) or intelligent personal assistants (IPAs). FIG. 18 shows an electronic device 1800 with a display 1810 that displays a user interface 1820 that enables a user to select a SLP for an IPA named Hal (shown at the top of the user interface). A voice of Hal can localize to one of four different SLPs including SLP 1830 (shown inside a head of person 1840), SLP 1832 (shown toward the person's right), SLP 1834 (shown toward the person's right but farther away than SLP 1832), SLP 1836 (shown directly in front of the person), or SLP 1838 (shown to a left of a face of the person). SLP 1838 is shown flashing (dashed lines emanating from the person) and as an image of a person. This flashing designation signifies to the user that SLP 1838 is a recommendation for a sound localization point for the voice of Hal. The user can accept this recommended SLP (such as tapping SLP 1838 or providing the selection as another command) or decline the recommendation (such as tapping the decline button 1850 or tapping or selecting another one of the SLPs).

Consider an example in which Alice buys a smartphone that executes a version of the Android or other Operating System (OS) that supports binaural sound rendering. When Alice asks her IPA Hal a question for the first time, the IPA application or the OS determines that a SLP has not yet been designated for Hal or the Hal software application and prompts Alice to make a SLP designation for Hal using the user interface 1820 provided in FIG. 18. A default SLP location such as SLP 1838 can be designated by the OS, the application providing the sound such as Hal, an IPA or IUA, a caller, or the user. Alice taps the display of her smartphone at the location of SLP 1838 to indicate that she accepts this SLP location for the voice of Hal. Thereafter the selected SLP can be used by default for the voice of Hal when the Hal application outputs sound such as the voice of Hal.

Sound localization points are not limited to points but can be areas or zones. Further, SLPs are not limited to a particular size or shape. For example, FIG. 18 shows SLPs 1832, 1834, and 1836 as circles, shows SLP 1838 as an image of a person, and shows SLP 1830 as a circle in a person 1840. FIG. 18 also shows a 2D grid 1860 in 3D space that includes a plurality of areas 1862 (shown as boxes or cubes on a 3D display). The user can select an entire box or zone, an area in a box or other 2D or 3D shape, or a point, vertex, or edge in a box or polyhedron to be a SLP. Once the SLP is selected, one or more HRTFs are retrieved so sound localizes to the selected location.

Figure 19:
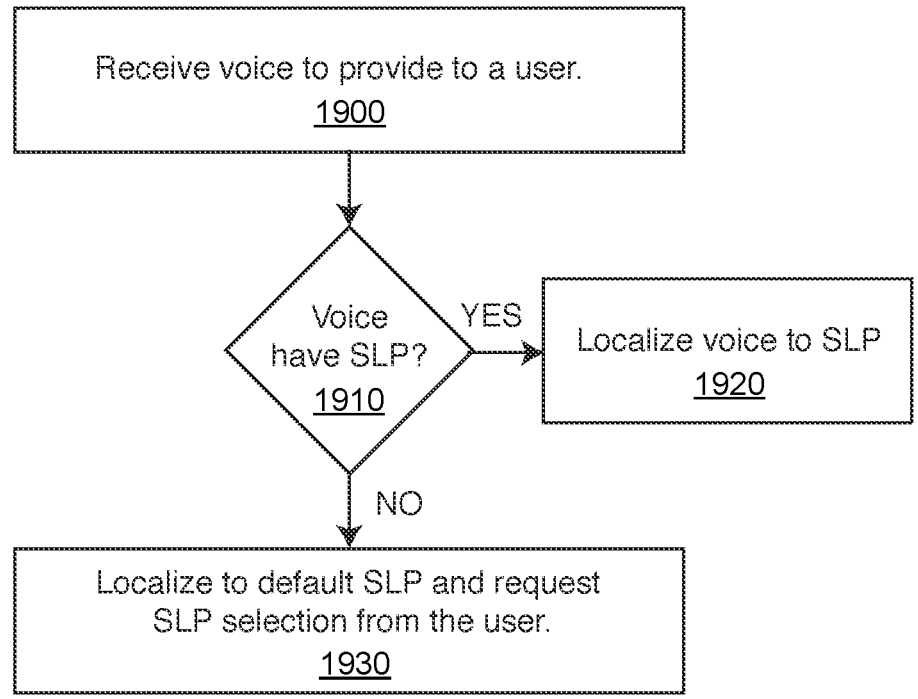
FIG. 19 is a method to provide a user with a request to select a SLP for a voice in accordance with an example embodiment.

FIG. 19 is a method to provide a user with a request to select a SLP for a voice.

Block 1900 states receive a voice to provide to a user.

The voice can originate from various sources or software applications including, but not limited to, a telephone call, streaming audio, audio archive (such as a recorded radio show, podcast, or recorded music), a soundtrack of a video or movie, a software application (such as a game, IPA, etc.), a program executing on another electronic device (such as a virtual reality or augmented reality program that executes on or with a head mounted display), voices or sound stored in memory (such as a voice recording or voice message), or voices or sounds from another source.

Block 1910 makes a determination as to whether the voice or sound has a sound localization point (SLP) already associated with the voice. If the answer to this determination is "yes" then flow proceeds to block 1920 and the voice is localized to the SLP. If the answer to this determination is "no" then flow proceeds to block 1930.

Block 1930 states localize to default SLP and request SLP selection from the user.

When a voice is already associated with a SLP, then the voice is convolved or localized to the SLP. For example, the voice is convolved with the HRTFs corresponding to the SLP or the sound is provided to the user in mono sound or stereo sound. When a voice is not associated with a SLP, then the voice is localized to a default position, such as inside the head of the user or to a default SLP with a set of HRTFs for the user. The user is then requested to select a SLP for the voice because the user may want to select a SLP other than a default SLP. An example embodiment presents the user with a user interface to assist the user in making this selection (such as one or more of the user interfaces disclosed herein).

Consider an example in which the sound localization system (SLS) detects a sound stream designated to output for the user to hear that has not been assigned a SLP. The system provides the sound stream to the user in or at a default or predetermined localization point so as not to delay output to the user. For instance, sound from the sound stream is provided to the user to localize inside the head of the user. The system also prompts the user to select an external SLP for the sound stream, such as displaying a user interface to the user so the user can select a desired SLP.

Figure 20:
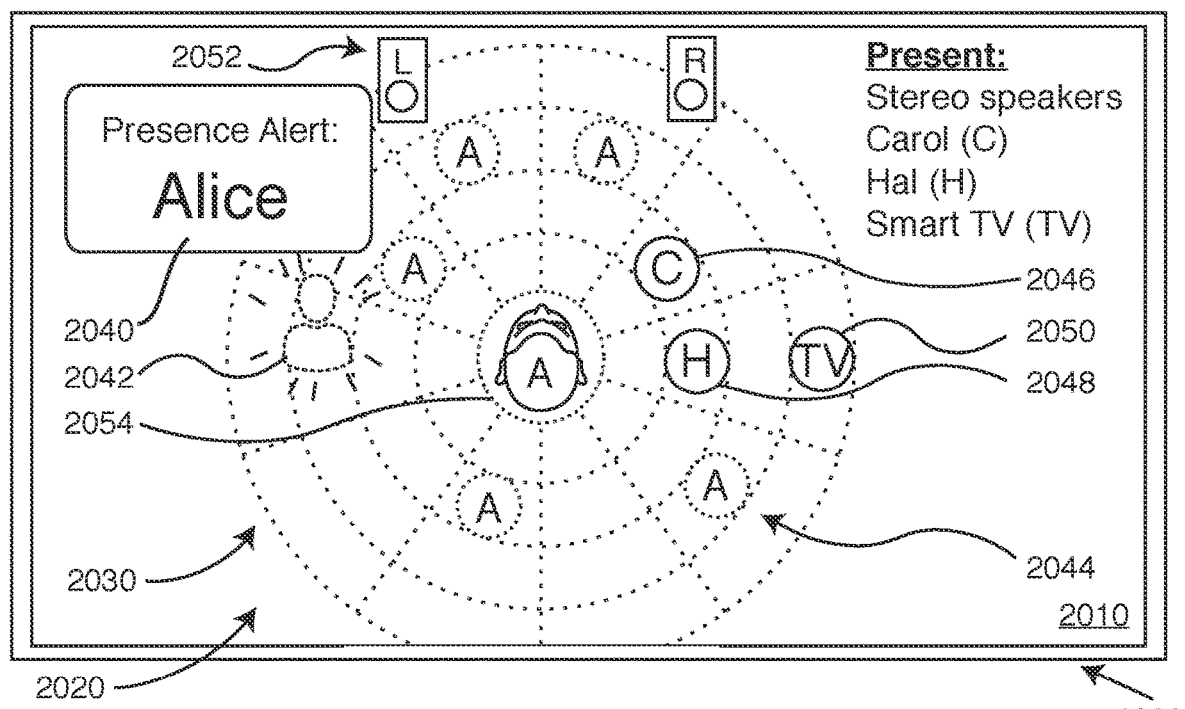
FIG. 20 is an electronic device with a UI in accordance with an example embodiment.

FIG. 20 shows an electronic device 2000 with a display 2010 that displays a user interface 2020 that enables a user to make a selection for a SLP for a voice or other type of sound. The user interface 2020 includes a polar grid or polar coordinate system 2030, a source or identification of the voice 2040 (showing a user named Alice), a SLP 2042 that is recommended as the SLP for the voice, a plurality of SLPs 2044 that are available or unoccupied to receive the voice (these SLPs labeled with an "A" for available), a SLP 2046 already assigned to Carol, a SLP 2048 already assigned to Hal, and a SLP 2050 already assigned to a television. The user interface 2020 also shows a location of two speakers 2052 that are proximate to the user at approximately ±30° azimuth and a SLP 2054 in a center of the polar grid 2030. SLP 2054 provides an image or representation of the user, and the SLPs around the image provide the user with a frame-of-reference for the location of the SLPs (i.e., where sound(s) will appear to originate).

If the user takes no action or selects the recommended localization point, then sound of the voice of Alice will localize to SLP 2042. Alternatively, the user can provide a command to select one or more of the other SLPs.

Consider an example in which Alice uses her computer to call Bob's smartphone. Bob has not previously provided a preferred localization point for Alice's voice. Bob's smartphone convolves Alice's voice with a pair of HRTFs so her voice localizes to Bob at SLP 2042, which is a preferred location of telephone calls for Bob based on a history of his calling and/or his preferences. During the telephone call while Bob and Alice are talking, his smartphone then displays user interface 2020 so Bob can confirm the SLP for Alice's voice or change it.

Example embodiments include recommendations and/or predictions for localizing sound to a SLP for a user. Recommendations and predictions can assist a user in making decisions on where to localize sound and make informed decisions for choosing a sound localization point for localizing sound.

Figure 21:
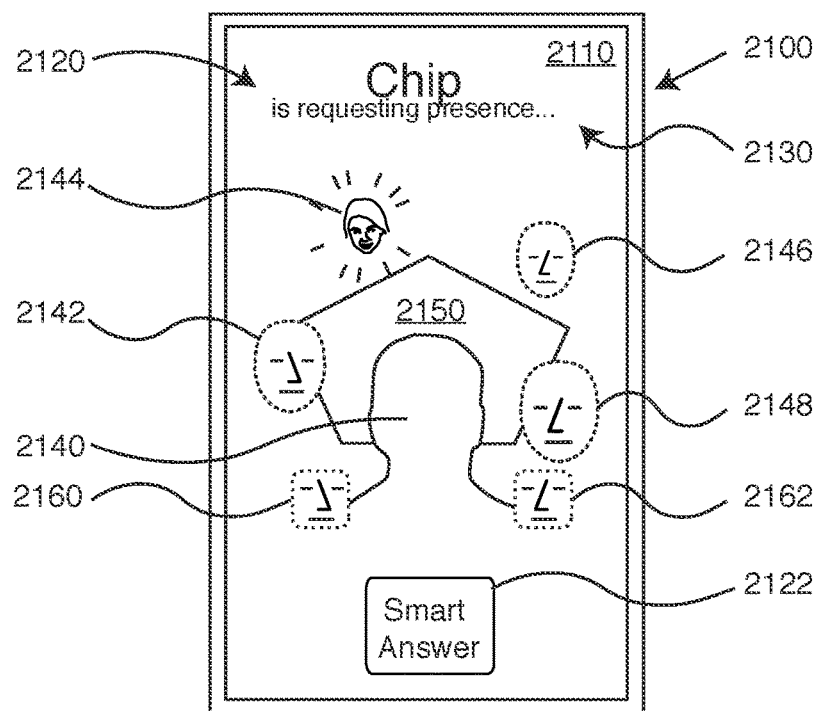
FIG. 21 is an electronic device with a UI in accordance with an example embodiment.

FIG. 21 shows an electronic device 2100 with a display 2110 that displays a user interface 2120 that provides a recommendation on a location of a SLP for a user. A button 2122 (shown as Smart Answer) indicates to the user a mode of operation in which the electronic device and/or a software program provides the user with recommendations on binaural sound and SLPs. An incoming request for voice communication 2130 (shown as Chip) is requesting presence or localization with the user. For example, Chip is a caller on a telephone call, a voice of an intelligent personal assistant, a voice in a software game, a singing voice or music in a music file, etc. In the smart answer mode, the electronic device automatically places the voice of the incoming request (i.e., Chip) in a SLP and provides this SLP as a recommendation to the user. The user interface 2120 shows an image 2140 that represents the back of the head of the user with four SLPs 2142, 2144, 2146, and 2148 surrounding the image 2140 as shown. Two more SLPs 2160 and 2162 are shown at the shoulders of the user or directly to the left and right of the head of a user or at +90° and −90° azimuth from the face of the user. A visual cue or object 2150 (shown as a pentagon) provides the user with a visual indication of the location of the SLPs and possible locations for placing the sound with respect to the user.

Since the electronic device is operating in smart answer mode, the user is provided with a recommended location for the voice of Chip at SLP 2144. This SLP is visually different than the other displayed SLPs so the user can quickly visually determine the recommended location for the SLP and distinguish it from the other, non-recommended SLPs being displayed. By way of example, the SLP 2144 is provided as a blinking icon of a face that the user recognizes as Chip or that the user recognizes as a recommendation.

The user can provide a command to accept the recommendation of the SLP for Chip or take no action to accept the recommendation. Alternatively, the user can provide a command to reject the recommendation and provide a different SLP for the voice of Chip or decline to accept the incoming request from Chip. For example, the user can also set a preference for a particular sound source such as Chip, or for a particular SLP to "auto-answer" in order to allow an incoming call to trigger its own acceptance and connection to the user. If a SLP, or caller, or source at a SLP that has been designated as auto-answer calls or provides a sound to the user, the user can hear the sound or voice suddenly externalized in his or her space with or without warning.

Consider an example in which Alice and Bob are friends. Bob instructs his intelligent personal assistant (whose name is Chip) to contact Alice and request some information from her. Chip calls Alice's smartphone, and Alice is prompted with a request to accept Chip's call and localize Chip's voice at SLP 2144. Alice taps the Smart Answer button 2122 displayed on her phone to accept Chip's call and localize Chip's voice at the recommended SLP.

Example embodiments include a user interface that simultaneously displays or provides multiple SLPs in a 2D or 3D view. This interface assists users in visualizing where the SLPs are located and where the voices will appear to originate to the user. Further, the interface provides a convenient way for users to manage SLPs, such as assign frequently received sound sources to the SLPs, select SLPs for a telephone call or other voice applications, delete SLPs, add SLPs, set preferences for certain SLPs, move SLPs, pause localization to a SLP, set SLPs as auto-answer SLPs, or take another action discussed herein.

Figure 22:
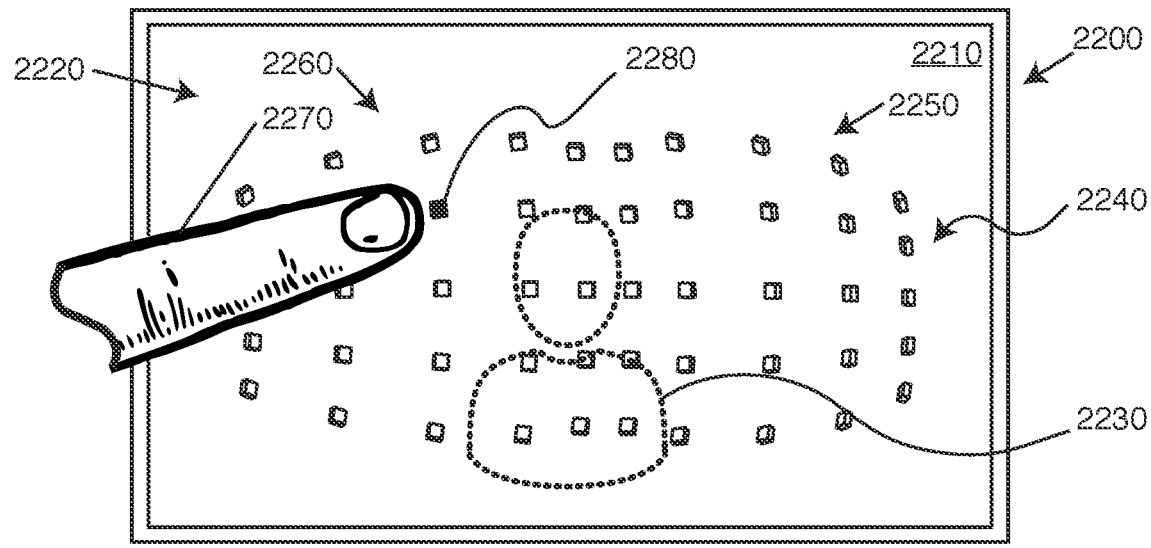
FIG. 22 is an electronic device with a UI in accordance with an example embodiment.

FIG. 22 shows an electronic device 2200 with a display 2210 that displays a user interface 2220 that includes an image of a user 2230 surrounded by a plurality of SLPs 2240. By way of example, the SLPs form a curved dome or two partial spheres or spherical zones that wrap or extend fully or partially around the user. A first partial sphere 2250 is on a right side of the user 2230, and a second partial sphere 2260 is on a left side of the user 2230. The SLPs 2240 are arranged on the partial spheres and form patterns at locations external to but proximate to the user 2230. These SLPs represent actual locations where a person will hear an origin of the sound when it is convolved with the HRTFs associated with the respective SLP.

By way of illustration, a finger 2270 of the user is shown pointing to, tapping on, or interacting with the display 2210 in order to select a particular SLP 2280. This SLP is darkened to distinguish it as being the selected SLP.

Figure 23:
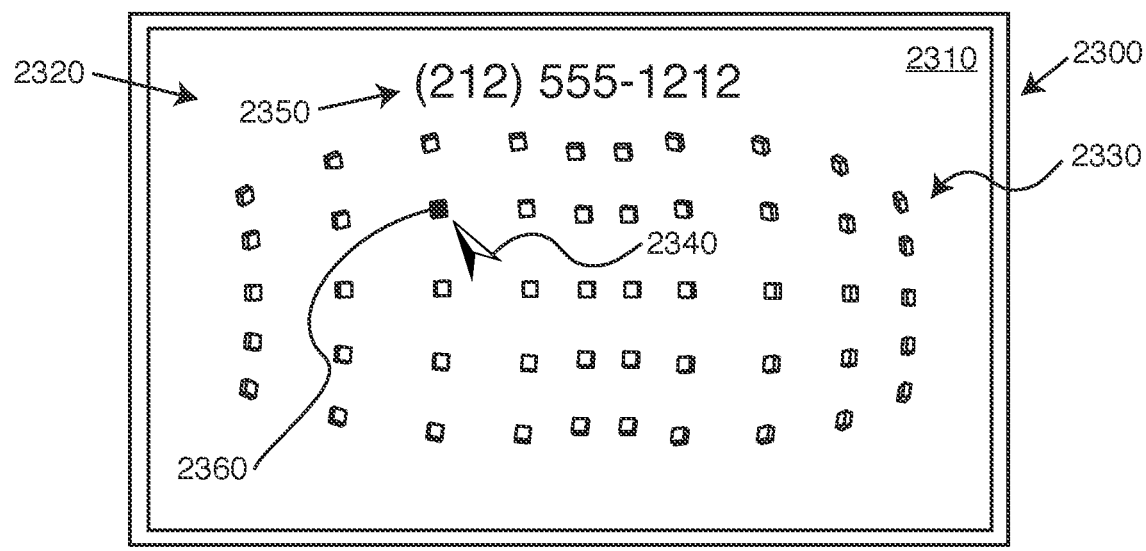
FIG. 23 is an electronic device with a UI in accordance with an example embodiment.

FIG. 23 shows an electronic device 2300 with a display 2310 that displays a user interface 2320 that includes a plurality of SLPs 2330 for a user. In this example embodiment, the display provides the UI without the head of the user. A frame-of-reference for a SLP position can be communicated in other ways. For example, a UI displays a first-person view of the SLPs or view from a point-of-view of a person. The user is interacting with the user interface via a cursor or pointer 2340 in order to manage SLP selection for another user identified with a phone number 2350 (shown as (212) 555-1212). The cursor 2340 is shown selecting SLP 2360.

Consider an example in which Alice wants to designate a location for voices that call from telephone number (212) 555-1212. In her user preferences, she selects an option for sound localization configuration and receives the user interface 2320. She moves the cursor 2340 with voice commands and selects SLP 2360. Thereafter, when she receives a telephone call from (212) 555-1212, the voice of the caller localizes to Alice at SLP 2360.

Sound localization points cannot be seen without assistance of an electronic device when the SLPs are points or areas in empty space. Example embodiments provide user interfaces to assist users in seeing and managing these SLPs.

Figure 24:
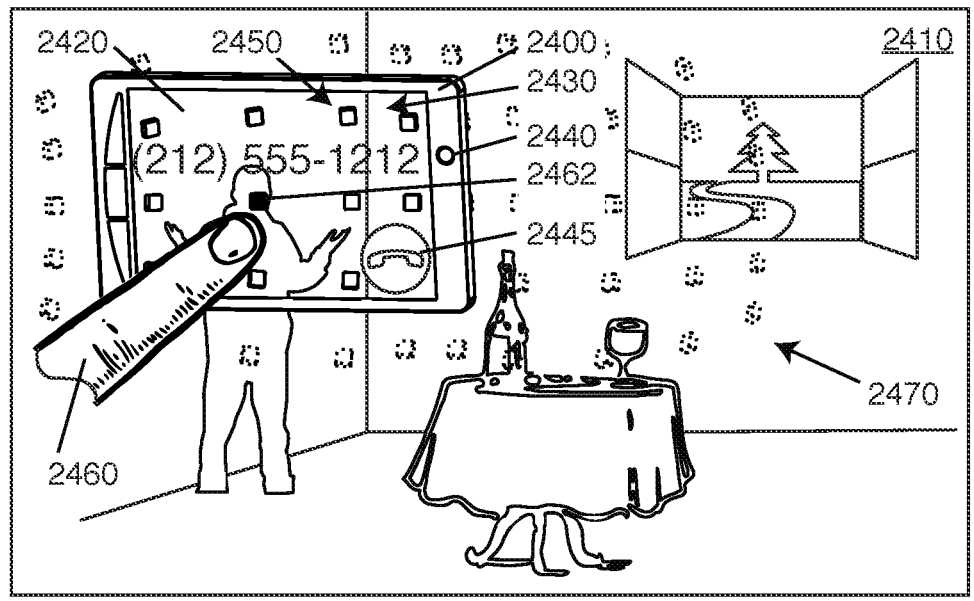
FIG. 24 is a room with an electronic device with a UI in accordance with an example embodiment.

FIG. 24 shows an electronic device 2400 (such as a smartphone) that displays SLPs that exist in a room 2410. A display 2420 of the electronic device 2400 includes a user interface 2430 that shows the electronic device receiving an incoming telephone call from a phone number (212) 555-1212. A camera 2440 captures video of the room 2410 and displays this video on the display 2420. The user interface 2430 also includes a button 2445 to answer the incoming telephone call and a plurality of SLPs 2450 that are positioned away from but proximate to the user. A finger 2460 of the user interacts with the user interface to select a SLP 2462 shown on the display. This SLP 2462 represents or shows a location where a voice of the caller will localize to or originate when the caller talks to the user.

Figure 25:
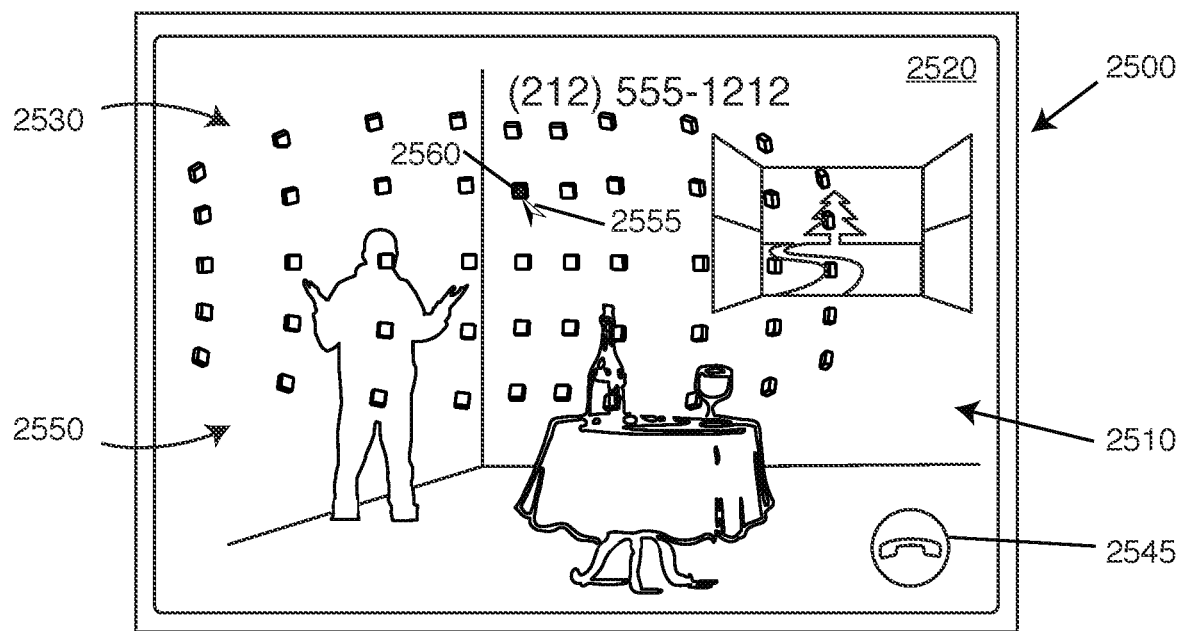
FIG. 25 is an electronic device with a UI in accordance with an example embodiment.

FIG. 25 shows an electronic device 2500 (such as an optical head mounted display or 3D viewer that accepts a smartphone) that displays SLPs that exist in a room 2510. A display 2520 of the electronic device 2500 includes a user interface 2530 that shows the electronic device receiving an incoming telephone call from a phone number (212) 555-1212. The user interface 2530 also shows a button 2545 to answer the incoming telephone call and a plurality of SLPs 2550 that are positioned away from but proximate to the user. The user interacts with the user interface 2530 to move a cursor or pointer 2555 and select a SLP 2560 for a localization point to receive a voice of the caller. This SLP 2560 represents or shows a location where a voice of the caller will localize to or originate from when the caller talks to the user.

The room 2410 in FIG. 24 includes SLPs 2470, and room 2510 in FIG. 25 includes SLPs 2550. These SLPs are not visible to a person without assistance from an electronic device. These SLPs exist as locations in the room to where sound can localize for the user. The user can see a location of these SLPs with the assistance of the electronic device since this electronic device displays these SLPs (or a portion of them) on the display. The electronic device thus functions as a SLP viewer for the user since it displays SLPs that are not otherwise visible to the user. For example, as the user pans or moves the electronic device around the room, the camera captures images or video of the room, presents this video or images on the display, and overlays or provides the SLPs on the video or images, augmenting the user's perception of the room. In this manner, the user can see in real-time where the SLPs are located around him.

Figure 26:
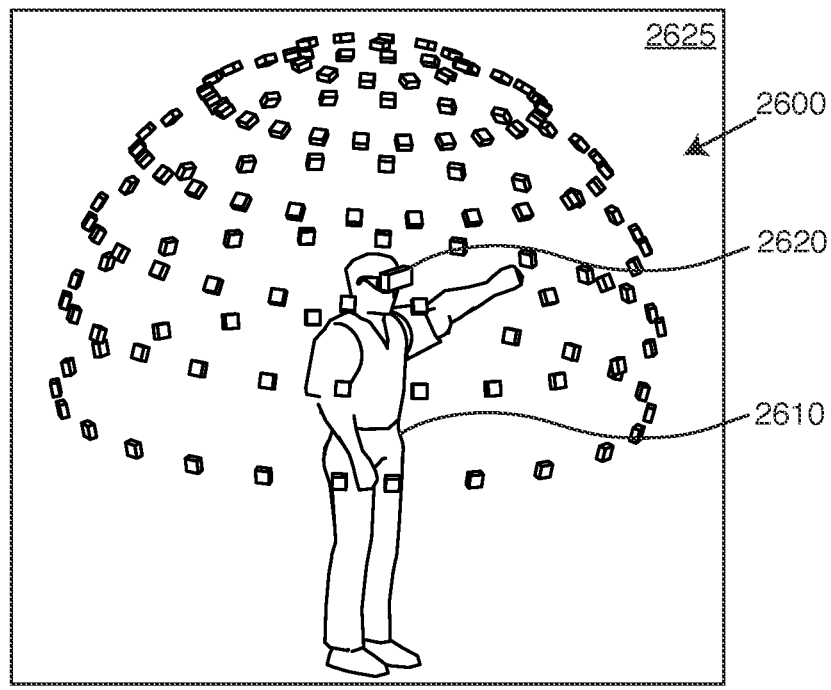
FIG. 26 shows SLPs around a person wearing an electronic device in accordance with an example embodiment.

FIG. 26 shows a plurality of SLPs 2600 surrounding a user 2610 wearing an electronic device 2620 (such as an OHMD, HMD, 3D viewer, or other wearable device) and standing in a room 2625. The SLPs 2600 form a dome or hemi-sphere around the user. The electronic device 2620 provides a user interface through which the user can select, manage, and control the SLPs that are visible through the electronic device.

Figure 27:
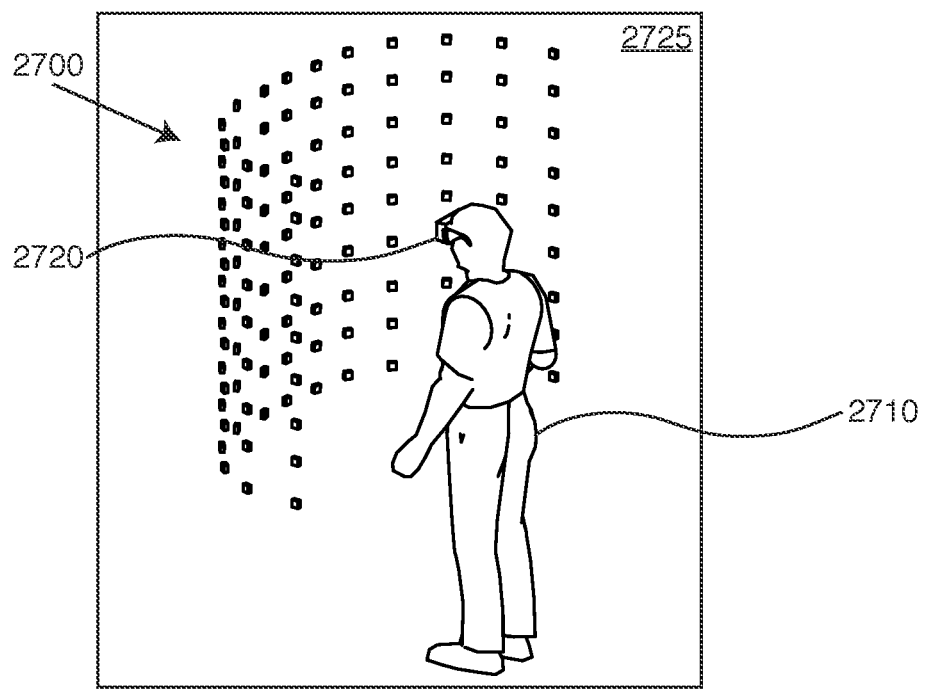
FIG. 27 shows SLPs around a person wearing an electronic device in accordance with an example embodiment.

FIG. 27 shows a plurality of SLPs 2700 surrounding a user 2710 wearing an electronic device 2720 (such as an OHMD, HMD, 3D viewer, or other wearable device) and standing in a room 2725. The SLPs 2700 form a curved plane or partial cylinder around the user. The electronic device 2720 provides a user interface through which the user can select, manage, and control the SLPs that are visible through the electronic device.

Figures 28A, 28B:
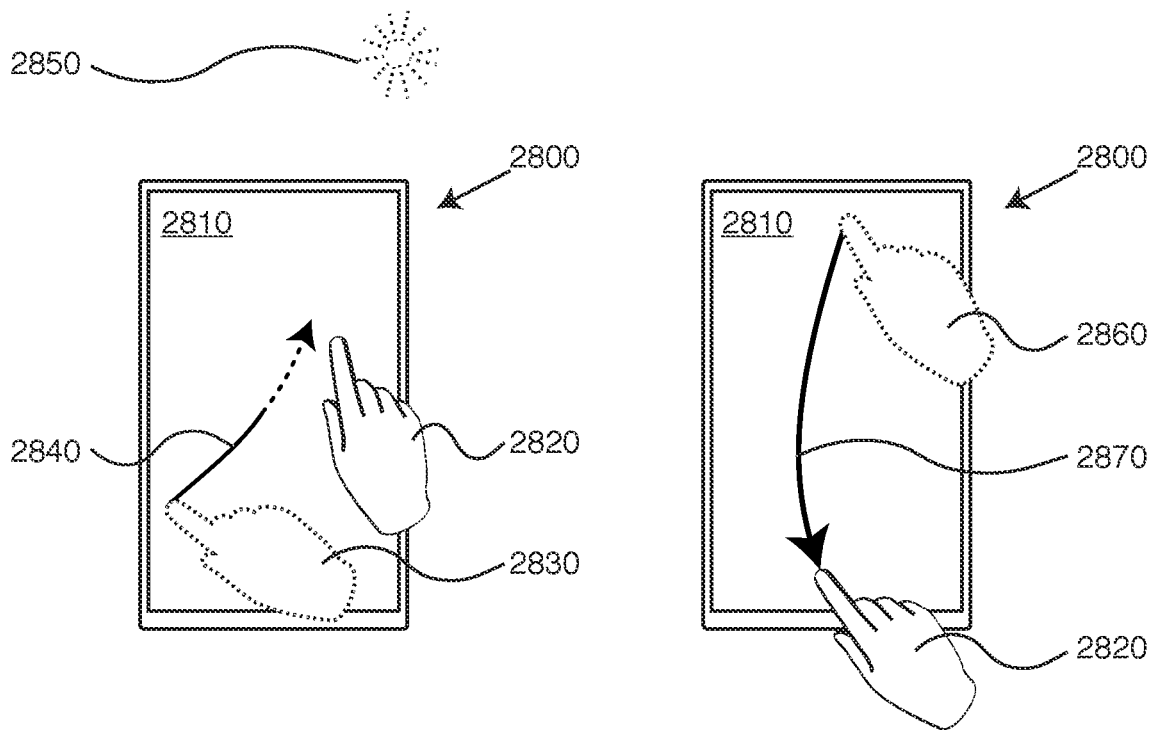
FIGS. 28A-28B show a user interacting with a UI of an electronic device in accordance with an example embodiment.

As noted, users can select or control a SLP with different commands that include a flick command, flick movement, or flick gesture. FIG. 28A shows an electronic device 2800 with a display 2810 over which a hand 2820 of a user is performing a flick movement. The hand of the user flicks or moves from a first location 2830 (shown as a hand with dashed lines) to a second location. Arrow or line 2840 shows movement of the hand of the user moving or flicking toward a SLP 2850 that is away from but proximate to the user and device. This flicking gesture selects this SLP. The gesture can also flick or launch a SLP to move a SLP to a location near the user. The greater or faster the flick movement, the greater distance the SLP is established away from the user.

Consider an example in which the user receives a telephone call and flicks his hand across the display of his smartphone as shown in FIG. 28A. A direction of this flick selects SLP 2850, and a speed of the flicking motion determines how far away or a distance (r) for the SLP. The flick also answers the telephone call. So, action of the flick simultaneously answers the incoming telephone call and selects a SLP for where a voice of the caller will originate to the user.

Users can use flick movements to perform other actions as well. FIG. 28B shows the hand 2820 of the user flicking or moving downwardly across the display from a first location 2860 (shown as a hand with dashed lines) to a second location. Arrow or line 2870 shows movement of the hand of the user moving or flicking. This action or movement provides a command to the electronic device. For example, this command changes all external SLPs to localize within the head of the user. As another example, this command instructs the electronic device to display a user interface of an example embodiment or display available SLPs proximate to the user.

The user interface facilitates the user to select, manage, and control SLPs and their properties and information associated with them. This includes managing user preferences and binaural sound settings and configurations.

Figure 29:
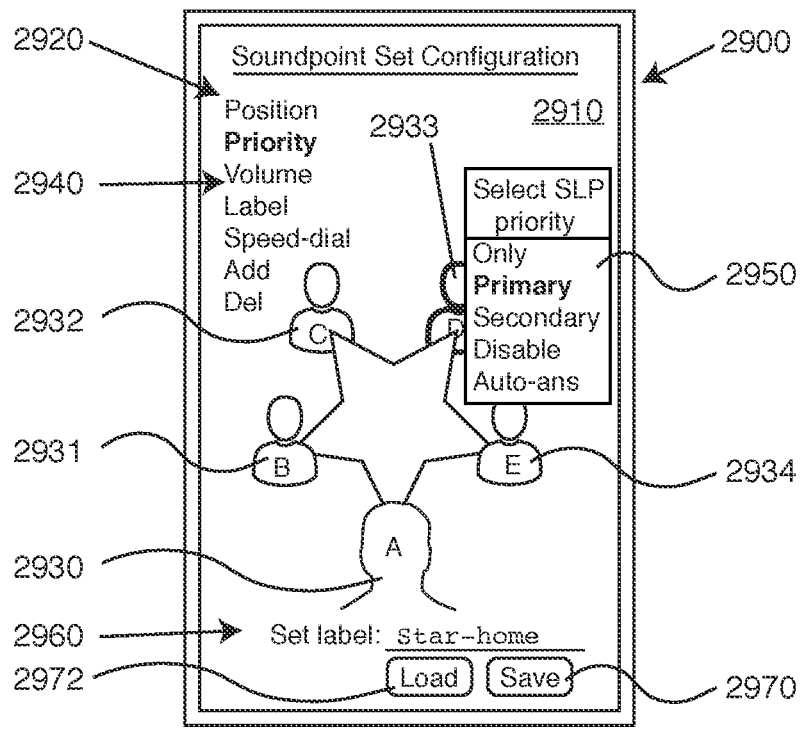
FIG. 29 is an electronic device with a UI in accordance with an example embodiment.

FIG. 29 shows an electronic device 2900 with a display 2910 displaying a user interface 2920 to manage SLPs and set preferences for them. A user may have hundreds of SLPs defined and stored but only a small subset are necessary for use in any particular location or circumstance, so SLPs can be organized into collections or sets with any number of members. The sets can be named or labeled. For example the display 2910 shows a screenshot of a user managing configuration settings for a set of five SLPs 2930-2934 and the user has labeled or named the set "Star-home" 2960. SLPs can be added to or removed from a set. When the user activates the "Save" button or icon 2970 he commits the changes made to the set. By way of example, the user can create a new, identical, or modified set by replacing the name "Star-home" and designating a new name or label for the new set and activating the "Save" button or icon 2970 to store the new set with the new label. A different set of SLPs with a different label can be modified by specifying the name or label of the different set and activating the "Load" button or icon 2972. A SLP set can be triggered and loaded or activated for use at a particular time, location, or circumstance by the user, by an IPA, or automatically triggered by different types of events. As an example, a user may prefer only one configuration of six SLPs positioned around his head. This user may have a set that has SLPs corresponding to positions identical or similar to the positions of SLPs of another set, but the SLPs may have different properties such as different default associations for voices of callers or sounds. As another example, a user may only converse with four people, but prefers different spatial configurations of the SLPs in his office, home, or car. A SLP set of a user with such preference may contain four SLPs having identical properties with SLPs of another four-member set including default associations for other parties and sound sources, but the positions of one or more SLPs may be different.

Management options 2940 for any member of a set include (by way of example and as shown on the display) changing, altering, managing, and/or selecting a position of a SLP, a priority of a SLP, a volume of sound emanating from a SLP, a label of a SLP, a speed-dial option for a SLP, and an auto-answer designation for a SLP. Options are also shown to add a new SLP to the set and delete a SLP from the set.

The "Priority" option and the SLP 2933 are darkened or highlighted to visually indicate that these are currently being managed. As shown, the user has selected to manage a priority for SLP 2933 (shown as an image of a person with a label or identification "D"). The user interface includes a SLP priority box menu or selection 2950 that provides different levels of priority for the selected SLP. By way of example, these priorities include, but are not limited to, setting the SLP to one of "only" (indicating this will be the only SLP used when the set currently being configured (Star-home) is active), "primary" (indicating this will be the primary, default, or first choice of a SLP when the set currently being configured (Star-home) is active), "secondary" (indicating this will be the secondary or second choice of a SLP when the set currently being configured (Star-home) is active), "disable" (indicating the SLP is not available when the set currently being configured (Star-home) is active), and "Auto-ans" (for "auto-answer" indicating an incoming call will be connected without approval from the user and localized to this SLP when the set currently being configured (Star-home) is active). A property of a SLP can be changed locally so that the change applies only to the instance of the SLP contained in the set being configured. In addition, a SLP property can be changed globally so that the property modification applies to all instances of the SLP without respect to any sets that contain the SLP.

FIGS. 30A-30F show an example electronic device 3000 with a display 3010 displaying a user interface 3020 to manage SLPs and/or the sound sources then associated with them during or for an electronic communication. The figures illustrate various example ways of changing the disposition of an electronic call including using buttons that can have a global effect on many or all current calls, zones upon which an individual sound source may be dropped from a dragging operation, and by selection from a menu. By way of example, an electronic communication includes, but is not limited to, a telephone call, a voice exchange between a person and an IPA or IUA, interaction or voice exchange between a person and a software application, an interaction or voice exchange from, to, or within a virtual reality (VR) environment or an augmented reality (AR) environment, etc.

Figure 30A:
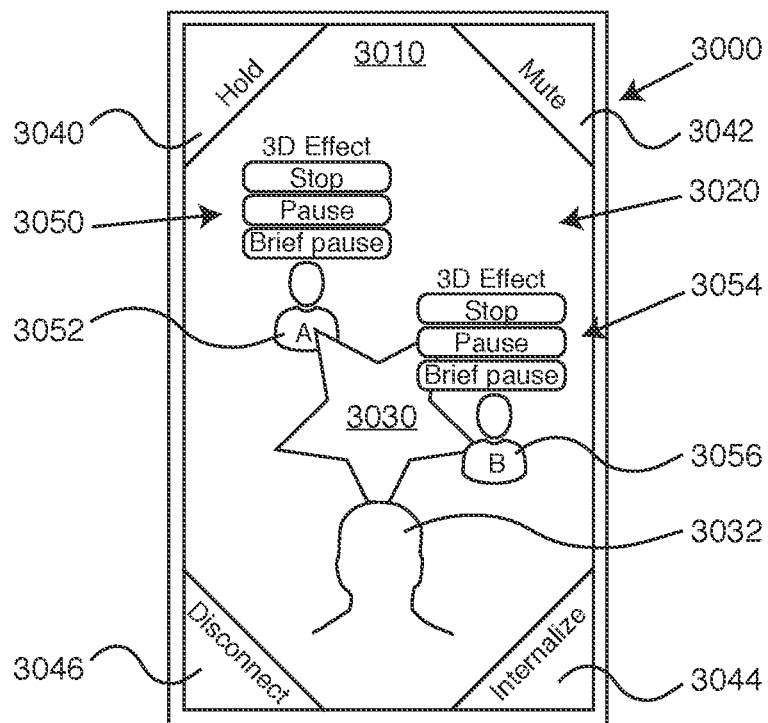
FIGS. 30A-30F are an electronic device with a UI in accordance with an example embodiment.

As shown in FIG. 30A (some numbers being omitted from FIGS. 30B-30E for ease of illustration), the user interface 3020 includes a visual reference 3030 (shaped as a star) with SLPs positioned at points on the star. The stars are shown in plan view in FIGS. 30A and 30B and perspective views in FIGS. 30C, 30D, 30E, and 30F to illustrate that a user can change styles and geometries of interface views on the display. An image of a user or person 3032 (which is also an internalized SLP for the user) is positioned at one of the points of the star and represents a location of the user. The user interface further includes buttons and/or drag-and-drop destination zones for placing a party on hold 3040, for muting 3042 a voice of a caller, for changing the localization to internal 3044 (so a voice is switched to mono sound, stereo sound, or convolved to a point inside a head of the user), and for disconnecting 3046 or terminating a voice or sound at a SLP, that are located in four corners of the user interface.

The zones 3040, 3042, 3044, and 3046 can have various shapes and can be placed at various locations in the UI, including along the edges of the UI (rather than at the corners) or other places. There may be fewer than or more than four zones and the actions or complex operations triggered to affect a SLP or caller acted upon with respect to a zone may go beyond changing a call disposition, such as invoking other programs or a chain of multiple operations.

FIG. 30A shows menu or SLP management options 3050 for SLP 3052 and menu or SLP management options 3054 for SLP 3056. These SLP management options include "stop" (for stopping sound localization to the selected SLP), "pause" (for pausing sound localization to the selected SLP), and "brief pause" (for briefly pausing, by way of example for a few seconds, sound localization to the selected SLP). For example, a user can also use an extended selection of an active SLP during a connection such as holding down a SLP icon to temporarily internalize the localization for the duration of the selection, and then release the selection to resume sound externalization of the sound at the SLP. An extended selection action can also trigger a brief change in the call disposition such as hold, mute, briefly externalize, etc., or other changes in characteristics of a SLP, its sound, or caller including actions or processes that can be triggered by a zone as discussed herein.

Figure 30B:
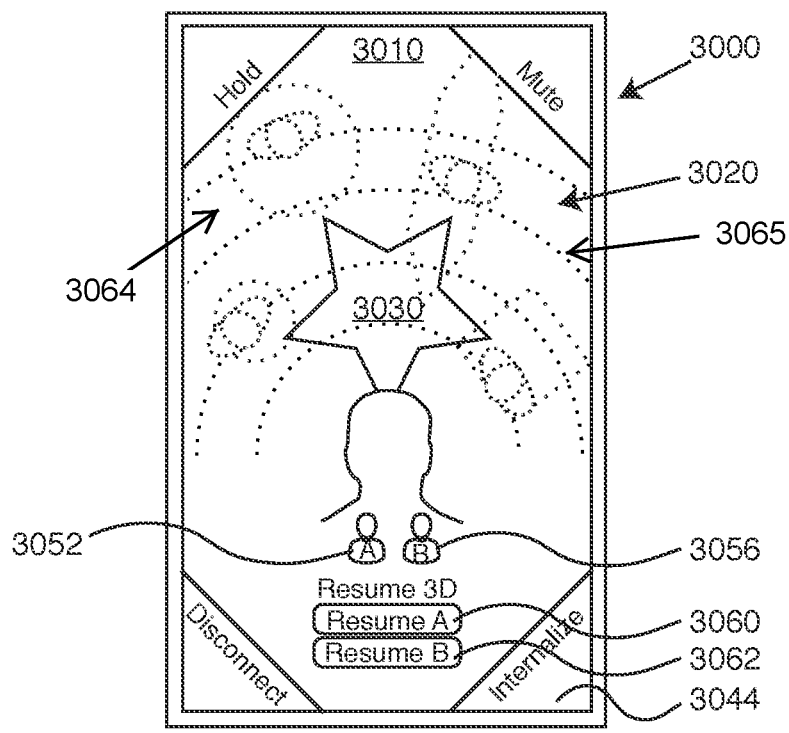

FIG. 30B shows the user has selected button 3044, and this action has internalized all of the voices for the current or active SLPs. In particular, voices for SLPs 3052 and 3056 are now internalized to the user as indicated by the positions of the associated icons. Activation or selection of button 3060 (shown as Resume A) will resume the voice of SLP 3052 to its previous sound localization point shown in FIG. 30A. Likewise, activation or selection of button 3062 (shown as Resume B) will resume the voice of SLP 3056 to its previous sound localization point shown in FIG. 30A. The display shows a plurality of SLPs 3064 (shown with dashed lines) to signify that these SLPs are unoccupied, not currently being used, and/or available to the user. Dashed lines 3065 (shown as arcs) provide a distance from the user to where sound will localize at the SLPs.

Figure 30C:
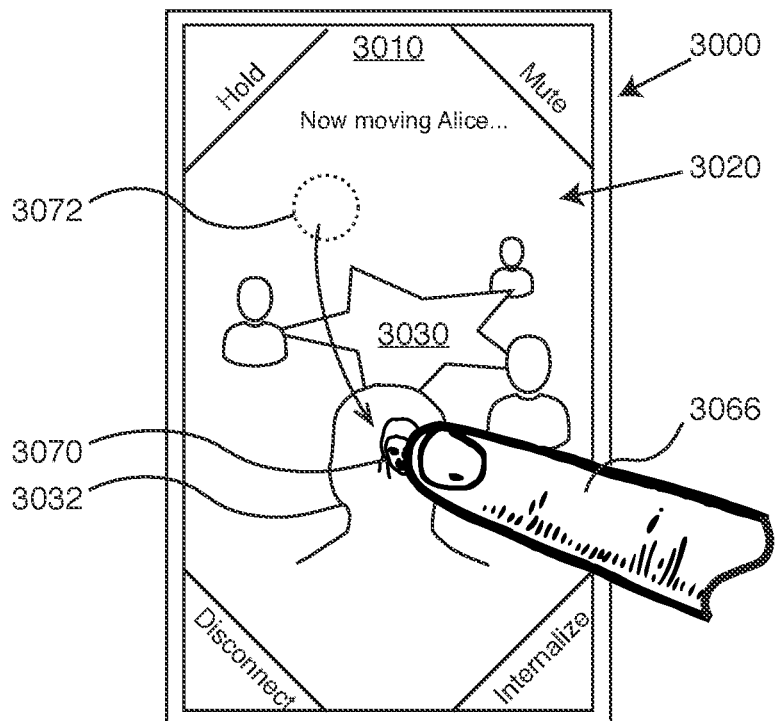

FIG. 30C shows a finger 3066 of the user moving (with a drag-and-drop operation) a SLP 3070 (named Alice to signify the label of the SLP or the name of the sound source) from a first position 3072 (shown with dashed lines) to a second position, the image of the user 3032. This action will change the voice of Alice from localizing at the point shown on the star (i.e., an external localization point that is proximate to but away from the user) to inside the head of the user (i.e., internal localization).

Figure 30D:
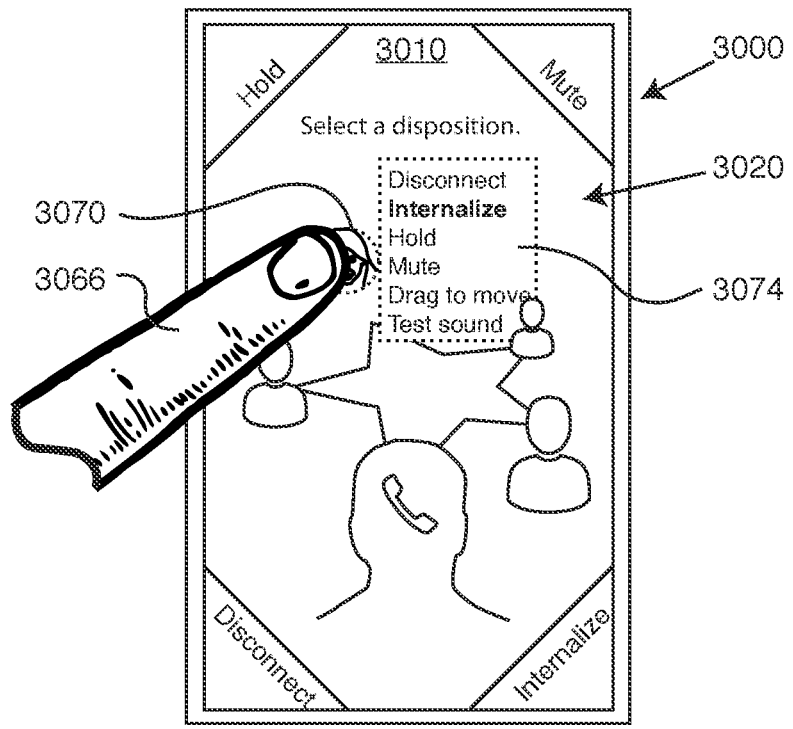

FIG. 30D shows the finger 3066 of the user managing the SLP 3070 (named Alice) with a menu selection. Activating the SLP 3070 icon or image or control for example by long-pressing reveals or pops-up a menu 3074 to manage the SLP or disposition of the connected party. The menu 3074 includes options "disconnect" (for disconnecting or terminating the voice of Alice), "internalize" (for moving the voice of Alice to internalize to the user), "hold" (for placing the transmission or voice of Alice on hold), "mute" (for muting the voice of Alice to the user), and "drag to move" (for indicating a subsequent drag-and-drop operation to perform on the SLP of Alice). The option "test sound" convolves a test sound to a location associated with the SLP to allow the user to experience localization from the SLP and confirm the location and/or other properties of the SLP.

Figure 30E:
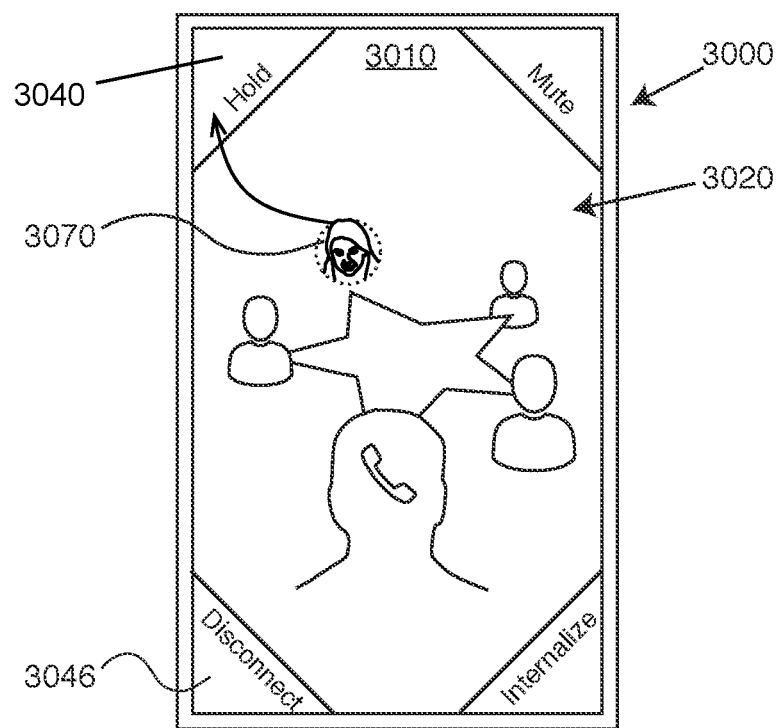
Figure 30F:
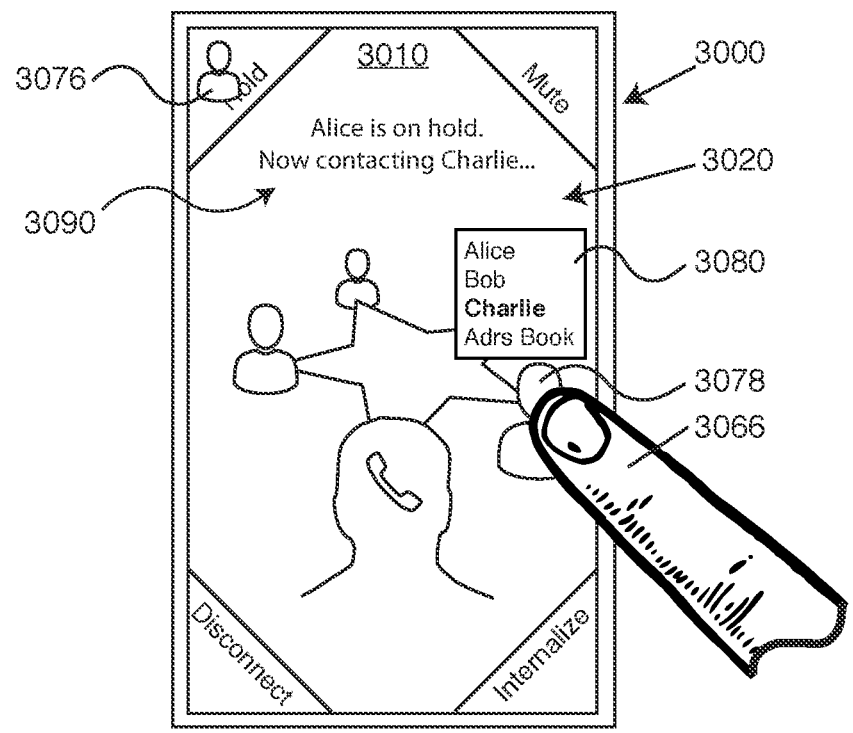

FIG. 30E shows the SLP 3070 moving (in response to a command from the user) to the Hold button or zone 3040. This action will place Alice's call on hold and silence her voice to the user. A drop zone such as the Hold corner zone 3040 can be used to indicate if and how many callers' dispositions match the state associated with the zone. For example, FIG. 30F shows the interface immediately after Alice was put on hold. A figure or icon is present in the Hold zone that indicates to the user that a party is on Hold at the moment.

FIGS. 30B, 30E and 30F show five SLPs illustrated with approximate equal radial spacing around the visual reference 3030. FIG. 30E and FIG. 30B show the same SLP configuration, with FIG. 30E illustrated in a perspective view and FIG. 30B illustrated in a plan view. The radial distribution of the SLPs is approximately even, but the distances from each SLP to the user are not equal. The perspective FIGS. 30E and 30F show the five head icons in different sizes, and the difference in size indicates their differing distance from the user and from the user icon that is represented as the closest and largest (head) icon. FIG. 30B shows more clearly the differences in distance between the SLPs and the user. A user Alice may prefer to select a SLP on the basis of its distance from her, and another user Bob may prefer to select a SLP based on its azimuth direction relative to him.

Although FIG. 30B communicates SLP placement information with more accuracy, the perspective interface 30E and 30F may communicate the SLP locations more quickly and easily to both Alice and Bob. SLPs may be various shapes, such as a circular, spherical, polygonal, polyhedron, etc. and have various sizes and/or volumes. Further, SLP shapes can be illustrated for example as in FIG. 30B as dashed lines enclosing each SLP icon.

FIG. 30F shows the finger 3066 of the user pressing or selecting SLP 3078. In response to this action, a contextual menu 3080 was revealed that lists the names of recent or frequent parties that have been localized at the SLP 3078. The user has selected Charlie from the contextual menu and the electronic device is contacting Charlie (such as placing a telephone call to Charlie). A status message in a status area 3090 indicates that the electronic device is in the process of contacting Charlie.

Figure 31:
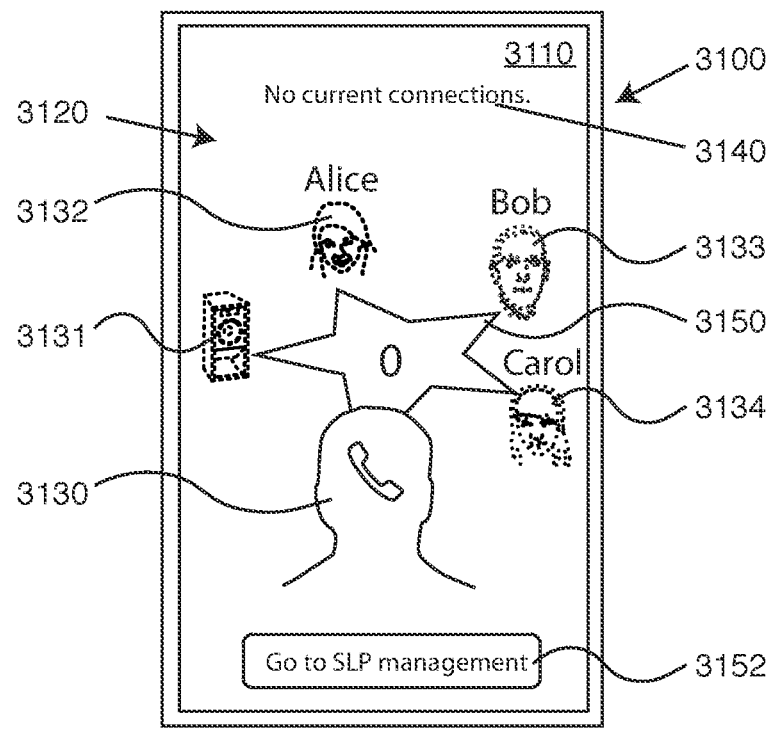
FIG. 31 is an electronic device with a UI in accordance with an example embodiment.

FIG. 31 shows an electronic device 3100 with a display 3110 that displays a user interface 3120 that shows current locations for SLPs for a user. The user interface 3120 includes an image of the user 3130 and four other SLPs 3131-3134 surrounding the user. The locations of the SLPs with respect to the image of user 3130 provide an approximate or precise location of where the SLPs actually exist relative to the user of the electronic device.

Sounds or sound sources can be assigned to one or more SLPs. For example, each different voice, sound, user, object, etc. is assigned to a different SLP. For instance, when the user listens to music through or with the electronic device, the sound of the music localizes to a pre-assigned SLP. People or contacts of a user can be assigned to SLPs. For example, and as shown in FIG. 31, music is assigned to SLP 3131; Alice is assigned to SLP 3132; Bob is assigned to SLP 3133; and Carol is assigned to SLP 3134. By way of further example, Alice assigns her friend Bob to localize at a specific SLP when Bob calls or otherwise contacts Alice. Alice further designates an auto-answer preference for Bob so that any time Bob calls Alice, Bob's call is accepted by Alice's electronic device without her intervention, and Bob can hear Alice if she speaks. If Bob speaks, Alice can immediately hear him speak in her space from the SLP she has designated to him.

In an example embodiment, when more than one user enables auto-answer, each for the others, successive calls between each other can emulate or approximate a presence or telepresence with each other. For example, Bob and Alice use their electronic devices to speak with each other often throughout the day, and they have designated SLPs for each other that are positionally congruent with each other. Bob has designated a SLP to localize Alice's voice immediately to his left and enabled the auto-answer option for Alice. Alice has designated a SLP to localize Bob's voice immediately to her right and enabled the auto-answer option for Bob. When Bob calls Alice he can speak immediately, and she perceives him as usual at the default SLP she designated for him on her right. When Alice calls Bob she can speak immediately and he perceives her as usual at the default SLP he designated for her on his left. While they are connected they enjoy the familiar configuration of being seated beside each other with Alice on Bob's left and Bob at Alice's right side.

As shown in FIG. 31, a status message at status area 3140 shows no current connections. This indicates that a SLP is not currently active or that the electronic device is not currently localizing sound to the user. A status message also indicates a number of current active SLP connections, shown in the center of the star-shaped icon 3150 (shown as "0" current connections).

By way of example, if the user were connected to two SLPs, then the center of the star would exhibit the number "2" to indicate the number of current connections being localized. Each SLP is distinguished with a picture or icon and/or label. In this example as there are no current connections, the distinguishers do not represent a sound source that is currently being rendered to the SLP, but instead the pictures and labels represent a frequent or recent sound source which has been localized at the respective SLP. Alternatively the indicia can represent a particular sound source that has been assigned or configured explicitly to the respective SLP by the user, a remote user, an IUA or a computer program. For example, music was recently convolved to SLP 3131. When the user next listens to music with or through the electronic device, the music will be designated to localize at SLP 3131 as the default SLP. A voice of a user named Alice was recently localized to SLP 3132; a user named Bob is usually localized at SLP 3133; and the user has explicitly configured the voice of his friend Carol to always render externalized at the position of SLP 3134. Button 3152 enables a user to go to SLP management functions, for example as discussed in reference to FIG. 29. Idle SLPs labeled with common, recent, or assigned sound sources can also function as one-touch "speed dial" buttons or controls, in which the label or picture indicates the party that the device will attempt to raise or the sound source that the user requests to localize at the respective SLP. For example, if the user activates the control at SLP 3133, the device will attempt to contact Bob to request his audio presence; if the user issues a voice command to call Alice then Alice's voice will be assigned to localize at SLP 3132; if the user activates the control at SLP 3131 then a default music player software application will play music and the sound will be convolved to SLP 3131.

Soundscape is sound that arises from an environment and includes natural acoustic sounds (e.g., the sounds of weather) and environmental sounds created by humans (e.g., music, voice, etc.) and other background sound. Soundscape can also include audio recordings or audio generations that create or emulate a particular acoustic environment.

In telecommunications or voice exchanges (such as telephone calls) one issue is how much soundscape should be included with the voice of the parties to the communication. In some instances, a user may want to hear only the voice of another caller. In other instances, a user may want to hear the voice of the caller along with a richer soundscape in order to experience a more natural conversation and/or situational context. As a sender of sound, a user may want to provide his soundscape to the other party, provide his soundscape without his voice, or prevent the other party from hearing the sounds in the user's physical environment.

FIGS. 32A-32D show an electronic device 3200 with a display 3210 that includes a user interface 3220 that manages sound for SLPs. The user interface includes an image of a user 3230 and one or more controls that enable a user to adjust, manage, or control the soundscape and voice that occur at SLPs.

Figure 32A:
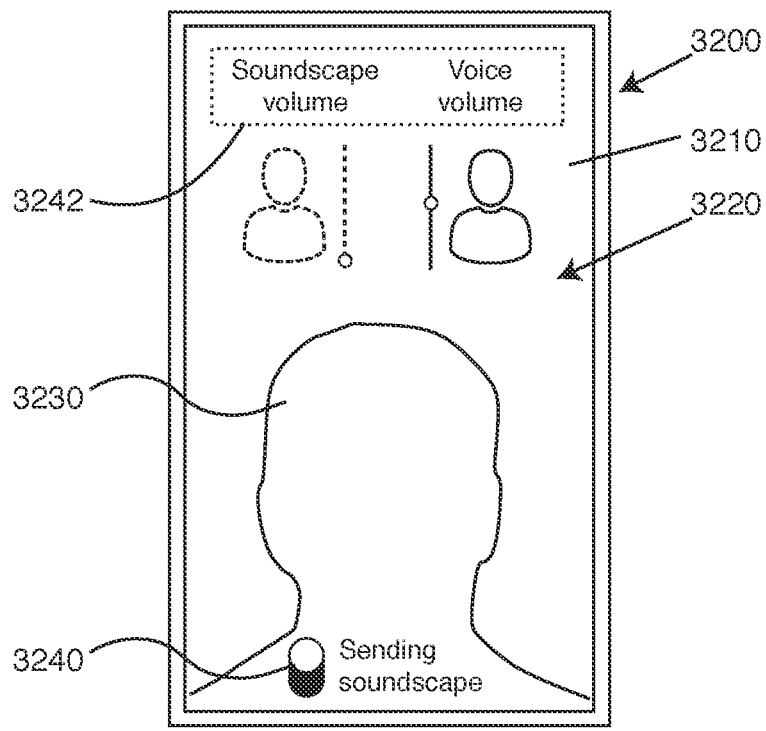
FIGS. 32A-32D are an electronic device with a UI in accordance with an example embodiment.
Figure 32B:
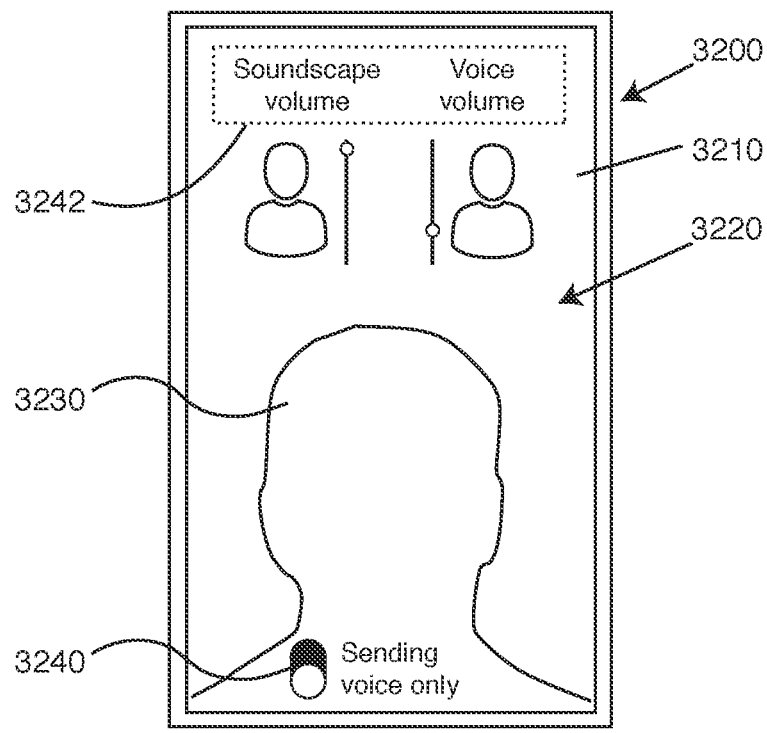

In FIGS. 32A and 32B, the user interface 3220 includes a control 3240 to toggle the transmission of the user's soundscape on and off. When the soundscape is turned off (FIG. 32B), then only the user's voice transmits to the other party. When the soundscape is turned on (FIG. 32A), both the user's soundscape sound and voice sound transmit to the other party. The user interface 3220 also includes a control 3242 to adjust a volume of the soundscape and a volume of the voice that is transmitted to the other party. The volume of the soundscape and the volume of the voice can be independently and separately controlled relative to each other or relative to set minimum and maximum volumes.

FIG. 32A shows the soundscape volume set to the minimum volume or set to zero relative to the voice sound or set to off. So although the user has enabled background sound to be sent to the other party using the background sound toggle 3240, no background sound, or minimal background sound will be sent relative to the voice volume that is set to a mid-level volume, higher than minimal.

In another example, volume controls 3242 are used to adjust the relative volumes of the background and voice signals of an incoming sound stream from another party. For example the volume controls 3242 in FIG. 32A have been set by the user to completely filter out the background sound of a remote caller while allowing the voice to be output to him from his device at a mid-level volume. Similar user interfaces allow the user to adjust a soundscape or background sound level and a voice sound level for each of multiple other parties and sound sources being localized to the user. For example, a user can use the interface to adjust the controls in order to hear a low volume of soundscape from Alice (when Alice is in a noisy place) and a high volume level of soundscape for Bob (when Bob is at a place with background sounds that the user desires to hear). Further, the sound levels of the backgrounds and voices of the various sound sources on a call can be adjusted relative to each other. For example, a user is on a call in which all other parties are in noisy places except for Carol who is snoring loudly in a quiet forest with twittering birds. So the user adjusts the background sound of all other parties on the call to a low level relative to the soundscape of Carol, and the user adjusts Carol's voice volume to a low level relative to all other parties on the call. This way, the user is not bothered by the noisy backgrounds of any caller, the user may enjoy the forest soundscape being captured and transmitted by Carol, the user is not bothered by the sound of Carol's loud snoring, and the user can hear Carol speak if she wakes up. Further still, the relative sound levels of the backgrounds and voice signals of any party or source being localized, as well as the sound levels of backgrounds and voices of each caller or signal being played by the device relative to each other source, can be adjusted by one or more of a user, remote user, IUA, IPA, or another computer program.

Figure 32C:
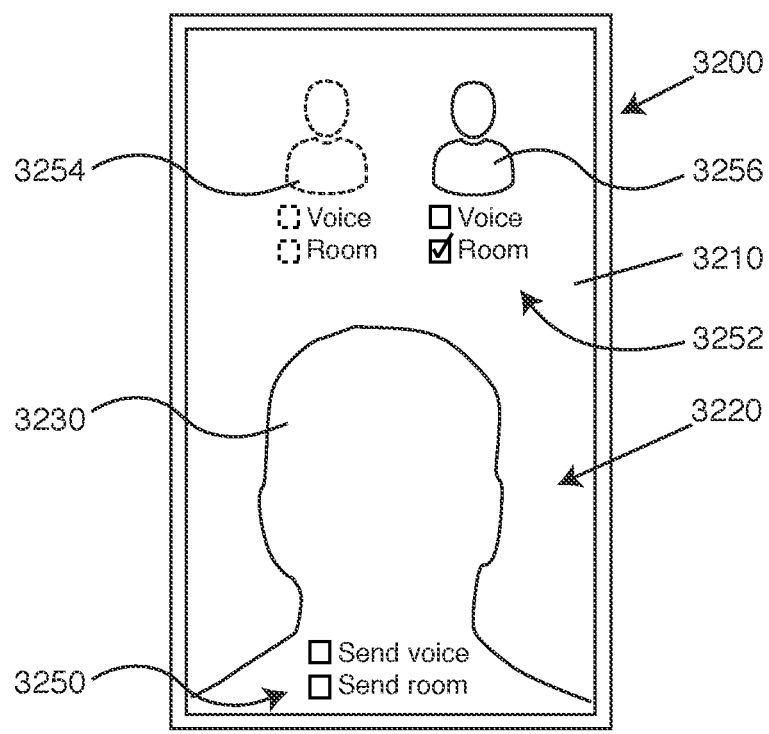

In FIG. 32C, the user interface 3220 includes a control 3250 that enables a user to select between sending only voice, sending only soundscape (labeled as "room"), sending neither, or sending both voice and soundscape. The user interface 3220 also includes a control 3252 that enables a user to control soundscape and voice received for each SLP. By way of example, two images 3254 and 3256 are shown, and each image represents a different SLP. For each SLP, a user can choose between localizing only soundscape from the transmitting user at the SLP, localizing only voice from the transmitting user at the SLP, listening to neither (e.g., mute or off), or playing both soundscape and voice from the transmitting user.

In an example embodiment, a user can replace or augment the sound he hears with binaural sound captured, manufactured, modified, or otherwise prepared by and received from another caller. The received binaural sound can be convolved to a SLP as discussed herein. The received binaural sound can also be heard by the user without convolution so that the binaural sound received is not subject to a SLP but instead is played with the audio cues intact as received and encoded into the left and right audio channels. For example, a caller captures binaural sound in his environment using left and right microphones placed at his left and right ears and streams the captured audio with or without modification to the user. As another example, a caller is a IPA that uses binaural voice synthesis to create speech to speak to the user from certain dynamic angles, orientations, and positions externalized to the user. The IPA also includes in the audio sent to the user a soundscape of an artificial seashore rendered in binaural sound with the user's HRTFs.

Consider an example in which a caller sends monophonic or stereo sound or he sends binaural sound, such as binaural sound captured by microphones at his left and right ears or binaural sound manufactured by the caller or binaural sound augmented or adjusted during or after capture. The SLS can detect if the received sound is binaural sound (for example by analyzing ITDs or ILDs of impulses in the sound as it is received). If the incoming sound is binaural sound, then the user can be informed and given the option to hear the "raw" binaural sound being received and to experience the audio cues encoded within the received binaural sound. This option can allow the user to perceive a real-time 3D audio environment, such as the environment where the caller is capturing the audio.

Figure 32D:
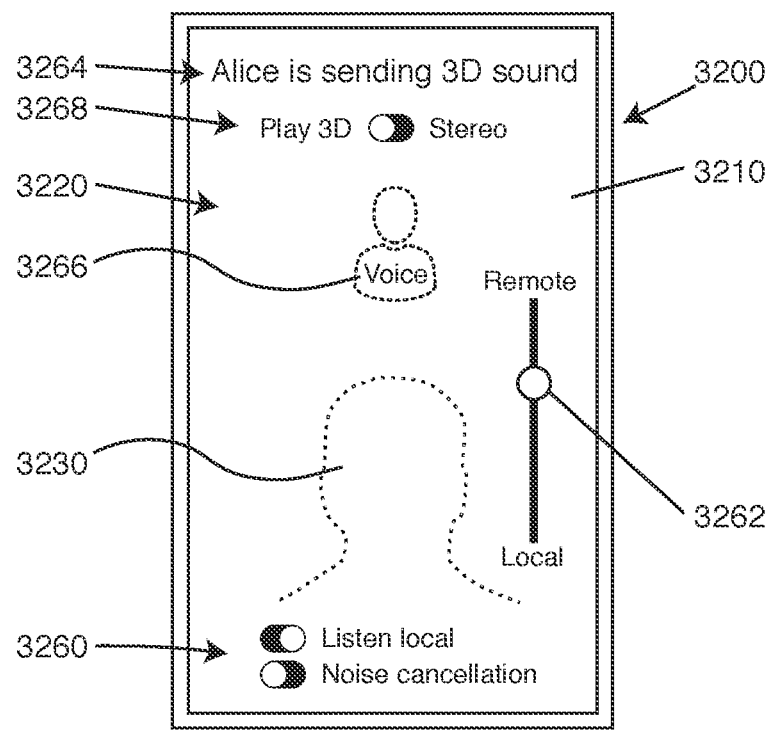

In FIG. 32D, the user interface 3220 displays an indication 3264 ("Alice is sending 3D sound") that the sound from the caller Alice is binaural sound. The UI 3220 is provided to the user so that the user can manage the listening options for the sound from Alice. The electronic device can be informed or determine that the sound-stream from Alice is binaural by analyzing the received sound after connecting with Alice, or prior to the connection by an indication in a tag or file header for the sound. By way of example, a standard or proprietary notification from data received as part of or during the connection request can also indicate to the receiver or user's device or telephony software that the connection request is one that will deliver binaural sound.

By way of example, the control 3268 is set to "Play 3D" and indicates that the sound-stream from Alice is being played "raw," or that the binaural audio cues encoded by or at the caller are not corrupted. For example, the left and right channels received from Alice are being played directly to the headphones of the user without being locally convolved. The user may use the control 3268 to turn off the 3D sound by switching to the "Stereo" position, and in that case the sound will be converted to stereo sound without externalization. The user then has the option to use the UI to designate a SLP for the sound-stream of Alice, such as by selecting a point on the display or other methods discussed herein.

While control 3268 is set to "Play 3d" and the sound of Alice is played binaurally as shown in FIG. 32D, the SLPs displayed on the UI such as SLP 3230 and 3266 are shown as dashed lines or otherwise distinguished to indicate that the user is not controlling externalization. The user is not choosing and has not chosen any SLPs, and localization perceived by the user is the result of localization already encoded in the incoming sound from Alice.

By way of example, before or during the call from Alice that the user is hearing without modification, the user can select SLP 3266 (labeled "Voice") to designate a sound localization point for the component of the incoming sound from Alice that is the speech or voice of Alice. The user can also move or adjust the SLP for the voice of Alice by dragging or using other methods discussed herein. For example, the caller Alice is a person who is capturing binaural sound using microphones at her ears while also speaking to the user. Because the mouth of Alice is located equidistant between her ears, the sound of her voice reaches the left microphone at her left ear at the same time that her voice reaches the right microphone at her right ear.

Also, though other people may be speaking at the place where Alice is, the voice of Alice is the voice that is closest to the microphones. By way of example, the SLS can determine that the voice signal that is strongest and that has a consistent ITD of near zero is the voice of Alice. A digital signal processor (DSP) as part of or in communication with the SLS can extract the signal identified as the voice of Alice and provide it as a separate sound source that can then be localized at a SLP. If the user chooses to move the voice of Alice, then the voice of Alice encoded in the incoming binaural sound from Alice can be removed, cancelled, muted, or quieted. The user can hear the voice of Alice at an externalized point, and the location of the SLP for the voice of Alice can be designated or controlled by the user, by Alice, by a IPA or IUA, etc.

Consider an example in which Alice calls Bob and sends binaural sound to Bob during the electronic call and the binaural sound she sends is captured using microphones she wears at her left and right ears that capture the sound from her environment. She also speaks to Bob and the sound of her voice is captured with the microphones at her ears and/or with other microphones such as a boom microphone, in-line cord microphone, a microphone on a HPED, or other voice reference microphone. When Bob receives the call request from Alice, he is presented with a user interface 620 (shown in FIG. 6). Bob activates control 660 in order to answer the call and hear the binaural sound being sent to his electronic device, and he listens to Alice and the sounds in Alice's environment localized around him. To manage aspects of the call he uses UI 3220. Bob has selected "Play 3D" so he can experience the audio cues in the binaural sound being captured by Alice. Alice is in a place with many different voices and other sound sources so Bob can hear multiple sounds externally localize to different locations around him. Bob hears the voice of Alice internally localized in his head but he would like to hear the voice of Alice localized proximate to and away from him, in front of him to his right. Bob selects the voice SLP 3266 for Alice and drags it across the UI 3220 to a new location slightly to the right. Bob then hears the voice of Alice at a SLP in front of him and to his right that corresponds to the new location of the voice SLP 3266. The localizations perceived by Bob of the other binaural sounds being sent by Alice remain unchanged. Only Alice's voice has moved.

By way of example, a mic-through or mic-thru circuit is included as part of the user's headphones or device and provides the soundscape of the local environment at the physical location of the user. The mic-through circuit delivers sound captured at the user's microphone(s) for the user to hear with a slight or neutral or natural amplification so that the user hears the sounds from his physical environment as though naturally, as he would hear the sound if he were not wearing headphones. The user can also control a mix between the local soundscape and the binaural soundscape received from the caller relative to each other with a sliding control or mechanism 3262. Further, the user can turn off his mic-through sound or the sound of his local environment using, for example, the control 3260 labeled "Listen local." For example, if the user is in a place where it is necessary for him to hear the sound in his physical environment he can adjust the controls to include local background sound to be played to him. The background sound can be captured by a single microphone or multiple microphones (such as binaural microphones) worn by him or on his device and then delivered to him via speakers or headphones. The user can also activate or deactivate a noise cancellation circuit such as an Active Noise Cancellation that uses an inverted or anti-phase signal to reduce unwanted lower frequency background noise for the benefit of the user and/or a caller.

Example embodiments provide user interfaces that enable a user to select a known or existing SLP (such as a SLP displayed with an electronic device) or create a new SLP. For example, a user interacts with the electronic device to generate a SLP for a location that did not previously have a corresponding SLP.

Figure 33A:
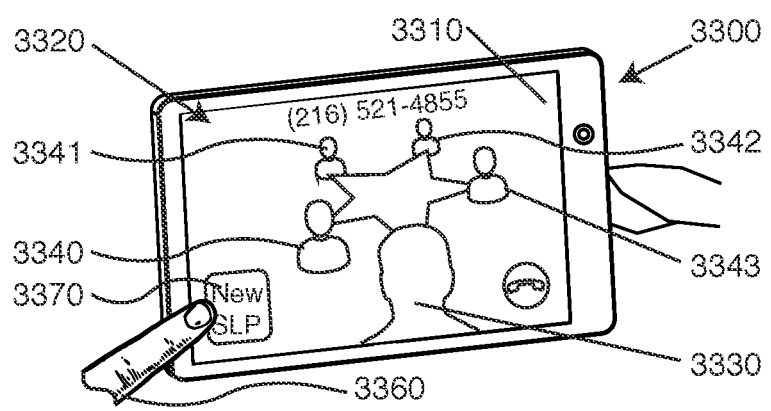
FIGS. 33A-33B show a user interacting with an electronic device to generate a new SLP in accordance with an example embodiment.

FIG. 33A shows an electronic device 3300 with a display 3310 that includes a user interface 3320 for creating a new SLP. The user interface 3320 includes an image of user 3330 surrounding by four SLPs 3340-3343 with an incoming call from telephone number (216) 521-4855. The user can answer the call and localize a voice of the caller to one of the four SLPs by selecting a SLP. Alternatively, FIG. 33A shows a finger 3360 of the user that selects button 3370 in order to create a new SLP to localize the voice of the caller at a different position than the options provided by SLPs 3340-3343.

Figure 33B:
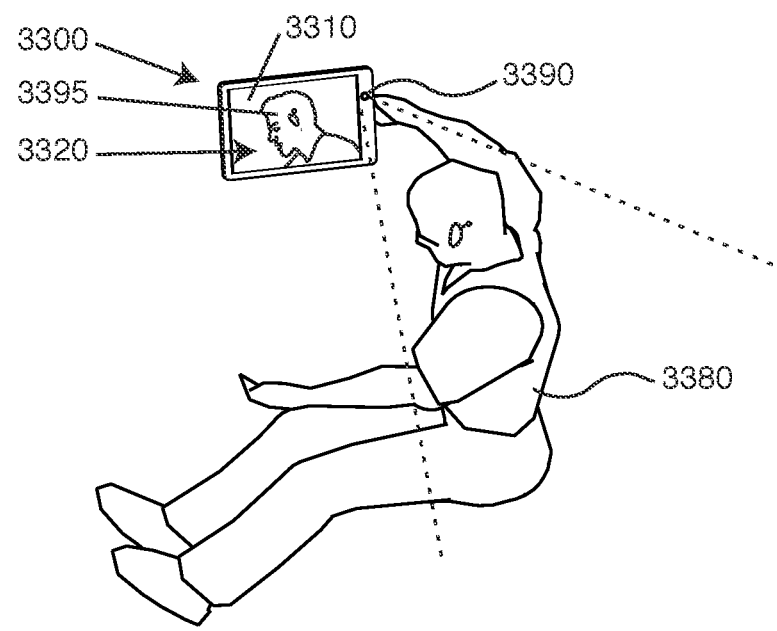

FIG. 33B shows the user 3380 holding the electronic device 3300 away from but proximate to a face of the user who is wearing binaural microphones located at his ears and in communication with the device 3300. A camera 3390 captures video of the user and displays this video or image 3395 on the display. When the electronic device is in the desired location, the user activates or commands the electronic device to capture a SLP. A new SLP is created at the location of the speaker of the electronic device with respect to the orientation of the user's head. A user may also create a new SLP using other methods.

In the example above, a user captures an image each time he creates a SLP at a coordinate. The image is a view from the coordinate and orientation of the associated SLP. The images can be stored and associated with each SLP and retrieved. An example embodiment of a UI for SLP selection can allow the user to be presented with or browse through the images and select a SLP based on the selection of the associated image. This selection enables callers in an example embodiment to select a SLP for their voice as heard by and proximate the user.

Consider an example in which Alice calls Bob, and Bob localizes Alice to his extreme left because he is working on a computer. Bob allows Alice to change the SLP where Bob hears her voice. For instance, Alice has access to the images or video captured from or rendered from the point of view of each of the SLPs that Bob uses or can create. Alice browses the images and selects the image of a full front view of Bob's face at eye-level because she wants more attention from Bob. By selecting the image, the SLP of her voice proximate to Bob moves from his far left to his zero azimuth. When Alice speaks Bob hears her voice as though coming out of the computer screen in front of him on the desk. The changes made by Alice to Bob's SLP are displayed to Bob through a UI.

Even though a user interface displays or shows location or approximate location of a SLP with respect to a user, the user may still not know the location precisely or may not know what a particular voice will sound like when the voice localizes to the SLP. For example a user may understand that an as yet unheard voice is designated to localize at a position in front of him and to the left, but he may not know the distance, or how far toward his left. Also a user may perceive the location of a SLP at a position slightly different than a position indicated by the user interface. Also a user may misunderstand the location in his physical environment to which a SLP illustrated on his user interface corresponds. Also a sound localization point can be rendered incorrectly resulting in its perception by the user at a position that does not match the position indicated on the user interface. For these reasons and others, a user will want to sample, test, or try localizing a sound to a SLP in order to confirm its position or determine if the user prefers the SLP's position or the SLP's other properties, or if the user prefers to change a property or select a different SLP. Example embodiments solve these problems and others.

Figure 34:
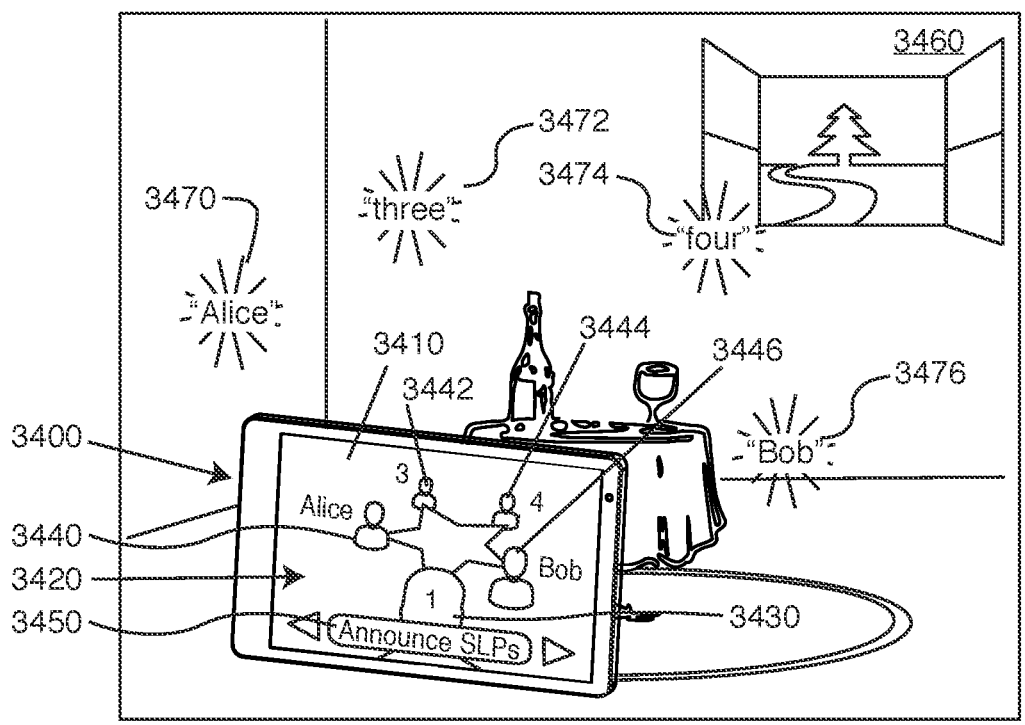
FIG. 34 is a room with an electronic device with a UI in accordance with an example embodiment.

FIG. 34 shows an electronic device 3400 with a display 3410 having a user interface 3420 that enables a user to sample SLPs so the user can experience voices or sounds when they localize to particular SLPs. This figure illustrates an example relationship or frame-of-reference between SLPs shown on the display and locations of where these SLPs will localize to a user.

The user interface 3420 includes an image of the user 3430 surrounded by four SLPs 3440 (labeled "Alice"), 3442 (labeled "3"), 3444 (labeled "4"), and 3446 (labeled "Bob"). The user interface also includes a button 3450 (Announce SLPs) that when activated prompts the electronic device to provide a sound at one or more of the SLPs so the user can sample or hear what a voice or sound sounds like when localized to this SLP. For illustration, the electronic device 3400 is situated in a room 3460 in a house.

Consider an example in which a user issues a command to cause an announcement from each SLP. The announcements are made simultaneously at each SLP, or one at a time, consecutively at each SLP.

Consider another example in which a speech synthesizer is provided the name or label of the SLP as input data, and the output, that is rendered as a human voice in a language understood by the user, is convolved to the corresponding SLP. To illustrate this method, the word "Alice" is convolved to the SLP 3440 labeled "Alice" on the user interface 3420 and the sound "Alice" externally localizes to the user at SLP 3470; then the SLP 3442 labeled "3" is used to convolve the word "three" that externally localizes to the user to SLP 3472; then the word "four" is pronounced localizing to the user to SLP 3474; and the user hears the word "Bob" announced proximate to but away from the user at SLP 3476 because the associated SLP 3446 has a label property with a value of "Bob." The user can also cause the test localizations to announce individually, for example, by selecting an individual SLP and activating the test such as mentioned in the discussion of FIG. 30D.

Some user interfaces may be unable to contain or display all members of the SLP set or all SLPs that the user wishes to test. In order to individually announce SLPs that may or may not be illustrated on a user interface, a user can iterate through a collection or selection of multiple or a plurality of SLPs one at a time. This controlled iteration can be accomplished by issuing a command to step forward to pronounce a next SLP in a set or list or step backward to announce a previous SLP in a multiple selection or list. For example, a command can be a voice command such as, "next," "previous," or "again" or a command can activate a displayed user interface control, such as activating a left or right arrow displayed adjacent to control 3450. These words emanate or originate from the respective SLPs to the user. After the announcements, the user can not only more accurately determine where sound will actually localize to him but also hear a sample of sound for each of the selected SLPs. The user can make informed decisions in selection and management of these SLPs.

In an example embodiment, each point on the user interface can be mapped to a point in the physical space of the user. Selecting and/or activating a point at, on, or in the user interface can cause a sound or a voice of a caller to externally localize for the user so the user perceives the sound as originating at the point in the physical space of the user that corresponds to the point activated at the user interface. This selection allows a user of a user interface displayed on a two-dimensional display for example to press a point on the display and immediately hear a sound convolved to be perceived as emanating from the corresponding point in his actual physical environment. This action can be used to test the sound or assumed location of a SLP or to select a SLP containing the HRTF used to convolve the sound immediately heard, or to select a rough or general SLP position prior to further specifying a more precise location.

For example, the user can activate another point at the user interface directly beside the point to immediately hear a same or different sound externalized at another point, directly beside the point. The user can continue to cause the activation of the other point resulting in a repeated or prolonged playing of a sound convolved to the other point. The user can continue to select other user interface points to immediately hear sound at other points in his space and can prolong the playing of the sound at any point in his space before selecting another point on his display. In this way, the user can cause a sound to appear and suddenly be heard at any point in his space and then move this sound relative to his forward facing position along a path in space that he decides in real-time. When the user hears a sound placement that he prefers, he can stop the movement of the sound for example by releasing his finger or control from the input device or interface control. This action specifies the last designated position as the desired location for subsequent sounds to localize for the associated sound source. For example, a user can drag his finger along a path across a UI and hear a sound follow a similar path in space. When he prefers the position of the sound he is moving, he can lift his finger off the display to select the position as a SLP.

Figure 35:
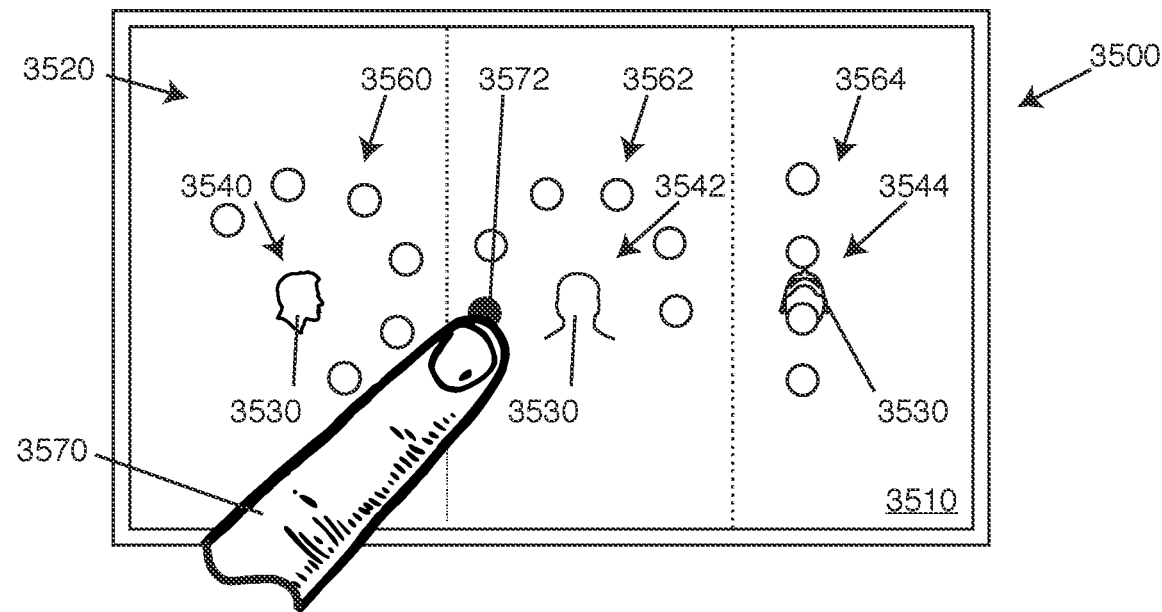
FIG. 35 is an electronic device with a UI in accordance with an example embodiment.

It is not necessary to use perspective illustration to display SLPs for a user to select. FIG. 35 shows an electronic device 3500 with a display 3510 that includes a user interface 3520 that enables a user to select SLPs without using a perspective view. The user interface 3520 simultaneously shows three different orthographic projections or viewpoints of an image of a user 3530. These projections include a side-elevation view 3540 of the user 3530 with a plurality of SLPs 3560, a front-elevation view 3542 of the user 3530 with a plurality of SLPs 3562, and a top or plan view 3544 of the user 3530 with a plurality of SLPs 3564. For illustration, a finger 3570 of a user is shown selecting one of the SLPs 3572.

Figure 36:
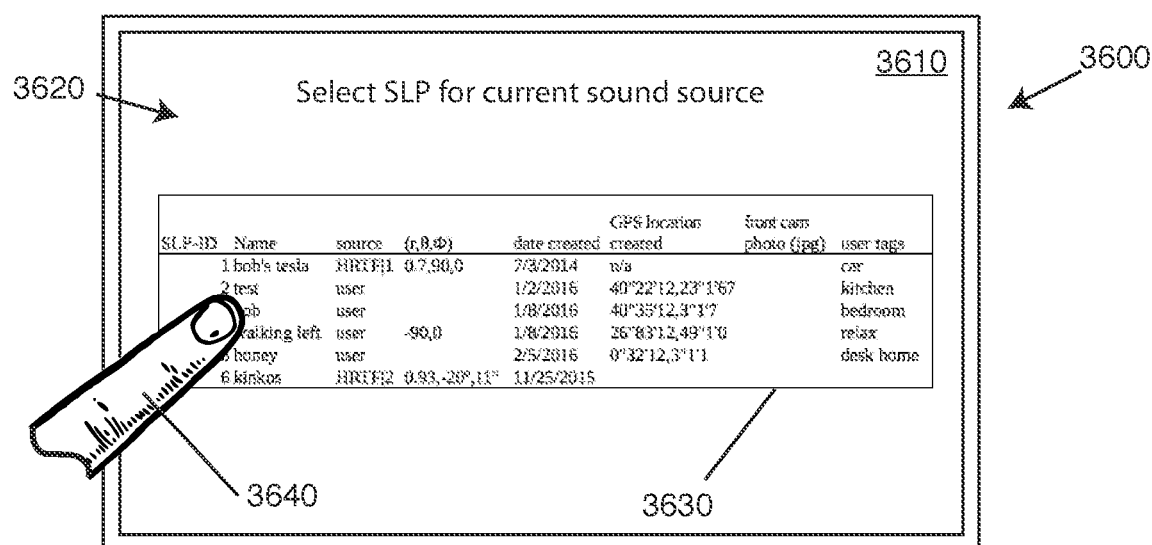
FIG. 36 is an electronic device with a UI in accordance with an example embodiment.

It is not necessary to use a graphical illustration of SLP placements or locations in order to allow a user to select or designate a SLP. It can be useful for a user to see or browse SLPs in a textual list that facilitates displaying a large amount of information or properties associated with each SLP. FIG. 36 shows an electronic device 3600 with a display 3610 that includes a user interface 3620 that enables a user to manage SLPs. The user interface 3620 includes a table 3630 with SLP information (shown by way of example as a name of the SLP, a source of origination of the SLP record or data, a coordinate position of or contained by the SLP, a date the SLP was created, a global positioning system (GPS) location associated with the SLP, a photo or icon of a subject listener associated with the SLP and taken from the point of view and orientation of the SLP, or other image of a user associated with the SLP, and zero or more tags associated with the SLP as assigned by the user or other computer programs). A finger 3640 of a user is shown selecting one of the SLPs in order to use it to convolve a current sound source. As another example, this textual interface can be used to select a SLP in order to add it to a set, configure it, or change its properties. The table 3630 can be filtered in order to list only SLPs meeting certain complex criteria with respect to the values of the SLP properties, and the user may choose to list the SLPs in any complex or hierarchical order according to values of the SLP properties such as the properties enumerated by the columns of the table 3630, combinations of the values, or further complex conditions.

One challenge of binaural sound localization and its management is how to display the SLPs on a display of an electronic device so that a user can understand where sound will seem to localize in the user's physical environment for each of the SLPs. If the user does not have an accurate frame-of-reference or cannot understand the frame-of-reference, then the user may be confused as to where sound will externally localize. Example embodiments solve this problem and example user interfaces are provided.

Figure 37A:
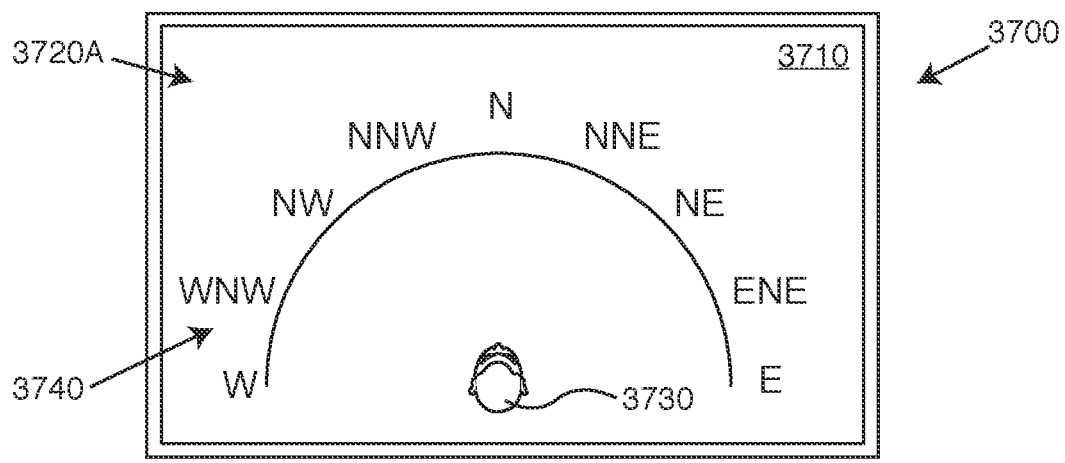
FIGS. 37A-37C are an electronic device with a UI in accordance with an example embodiment.
Figure 37B:
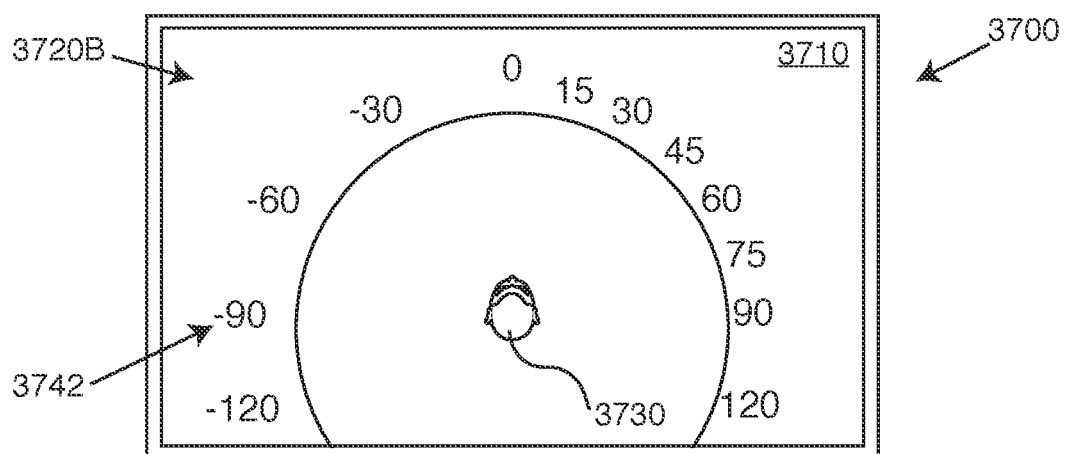
Figure 37C:
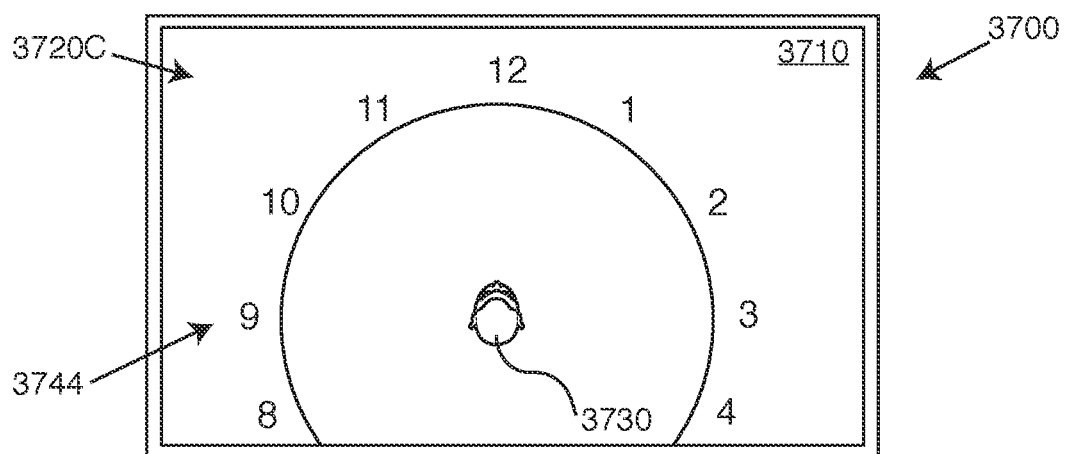

FIGS. 37A-37C show an electronic device 3700 with a display 3710 that includes different user interfaces 3720A, 3720B, and 3720C that help a user to discern where sound will externally localize by visually identifying where a SLP is located or imagining where a sound will localize with respect to the user for a SLP designation.

FIG. 37A shows an image of a user 3730 with an orientation system or coordinate system 3740 that uses compass headings or compass directions to assist a user. For illustration the user is facing the direction of north so the displayed user 3730 is also facing north. Alternatively a user can adhere to a convention that uses compass headings for reference but in which the compass headings are not fixed to or even associated with actual compass headings. For example, an indication of north may be understood to mean the direction directly ahead of a forward-facing user, without respect to the user's orientation in his physical environment or the earth's magnetic field. Using such a convention, due west always means −90° azimuth, northeast always means 45° azimuth, etc.

FIG. 37B shows an image of the user 3730 with an orientation system or coordinate system 3742 that uses angles or degrees (such as a polar coordinate system) to assist a user. For illustration the user is facing 0 degrees so the displayed user 3730 is also facing 0 degrees. Alternatively a user can adhere to a convention in which 0 degree refers to the direction dead ahead for the user.

FIG. 37C shows an image of a user 3730 with an orientation system or coordinate system 3744 that uses hour numbers on a clock face to assist a user in referring to or imagining a SLP location or relative direction. For illustration the user is facing the direction of twelve o'clock so the displayed user 3730 is using a convention in which twelve o'clock refers to a direction straight ahead from the user.

By way of example, SLPs (not shown for convenience of illustration) can be overlaid on the user interfaces 3720A, 3720B, and 3720C to assist a user in determining, imagining, and referring to their direction and location. Further, these user interfaces can be included with or in or overlaid upon the user interfaces shown in other example embodiments (such as displaying one of 3720A, 3720B, and 3720C in a corner of a user interface described herein).

Figure 38:
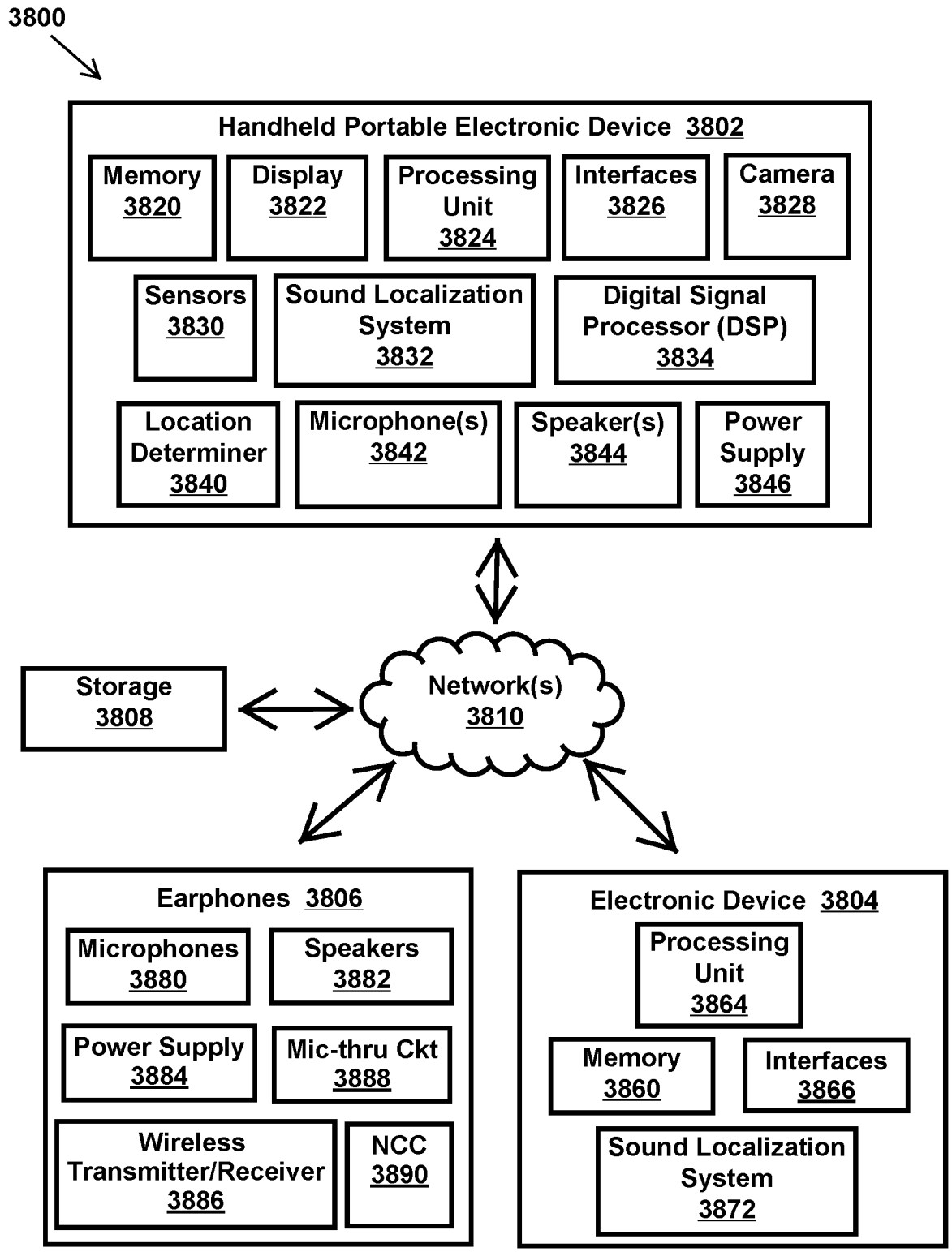
FIG. 38 is a computer system in accordance with an example embodiment.

FIG. 38 is a computer system or electronic system 3800 that includes a handheld portable electronic device or HPED 3802, a computer or electronic device (such as a server) 3804, electronic earphones 3806, and storage or memory 3808 in communication with each other over one or more networks 3810.

The handheld portable electronic device 3802 includes one or more components of computer readable medium (CRM) or memory 3820, a display 3822, a processing unit 3824 (such as one or more microprocessors and/or microcontrollers), one or more interfaces 3826 (such as a network interface, a graphical user interface, a natural language user interface, a natural user interface, a phone control interface, a reality user interface, a kinetic user interface, a touchless user interface, an augmented reality user interface, and/or an interface that combines reality and virtuality), a camera 3828, one or more sensors 3830 (such as micro-electro-mechanical systems sensor, a biometric sensor, an optical sensor, radio-frequency identification sensor, a global positioning satellite (GPS) sensor, a solid state compass, a gyroscope, a magnetometer, and/or an accelerometer), a sound localization system 3832 (such as a system that localizes sound, adjusts sound, predicts or extrapolates characteristics of sound, detects or measures specific audio impulse responses, and/or executes or includes instructions to execute one or more methods discussed herein), one or more of a digital signal processor (DSP) 3834, a location determiner 3840 (such as hardware and/or software to determine or track a location of a person and/or electronic device), microphones 3842, speakers 3844, and a battery or power supply 3846.

The storage 3808 can include memory or databases that store one or more of SLPs (including their locations and other information associated with a SLP including rich media such as sound files and images), user profiles and/or user preferences (such as user preferences for SLP locations and sound localization preferences), impulse responses and transfer functions (such as HRTFs, HRIRs, BRIRs, and RIRs), and other information discussed herein.

The network 3810 can include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices do not have to communicate with each other through a network. As one example, electronic devices can couple together via one or more wires, such as a direct wired-connection. As another example, electronic devices can communicate directly through a wireless protocol, such as Bluetooth, near field communication (NFC), or other wireless communication protocol.

The sensors 3830 can further include motion detectors (such as sensors that detect motion with one or more of infrared, optics, radio frequency energy, sound, vibration, and magnetism).

By way of example, a location determiner or location tracker includes, but is not limited to, a wireless electromagnetic motion tracker, a system using active markers or passive markers, a markerless motion capture system, video tracking (e.g. using a camera), a laser, an inertial motion capture system and/or inertial sensors, facial motion capture, a radio frequency system, an infrared motion capture system, an optical motion tracking system, an electronic tagging system, a GPS tracking system, an object recognition system (such as using edge detection), and other embodiments.

The sound localization system 3832 performs various tasks with regard to managing, generating, interpolating, extrapolating, retrieving, storing, and selecting SLPs and can function in coordination with and/or be part of the processing unit and/or DSPs or can incorporate DSPs. These tasks include generating audio impulses, generating audio impulse responses or transfer functions for a person, convolving sound per the impulse responses or transfer functions, dividing an area around a head of a person into zones or areas, determining what SLPs are in a zone or area, mapping SLP locations and information for subsequent retrieval and display, selecting SLPs when a user is at a determined location, selecting sets of SLPs according to circumstantial criteria, generating user interfaces with binaural sound information, detecting binaural sound, detecting human speech, isolating voice signals from sound such as the speech of a person who captures binaural sound by wearing microphones at the left and right ear, and/or SLP information, and executing one or more other blocks discussed herein. The sound localization system can also include a sound convolving application that convolves sound according to one or more audio impulse responses and/or transfer functions based on or in communication with head tracking.

Electronic device 3804 includes one or more components of computer readable medium (CRM) or memory 3860, a processing unit 3864 (such as one or more microprocessors and/or microcontrollers), one or more interfaces 3866, and a sound localization system 3872 (such as a system that performs one or more functions discussed herein).

The electronic earphones 3806 include one or more of microphones 3880 (such as left and right microphones that can be placed in, at, or near an ear of a person), speakers 3882 (such as a left and right speaker that are located in, at, or near an ear of a person), a battery or power supply 3884, a wireless transmitter/receiver 3886, a mic-thru circuit 3888, and a noise cancellation circuit (NCC) 3890. The wireless transmitter/receiver can support audio streams discussed herein (for example, 4 simultaneous streams, 2 channels out plus 2 channels in, at sample rates per an example embodiment) concurrently with other data.

The processor unit includes a processor (such as a central processing unit, CPU, microprocessor, application-specific integrated circuit (ASIC), microcontrollers, etc.) for controlling the overall operation of memory (such as random access memory (RAM) for temporary data storage, read only memory (ROM) for permanent data storage, and firmware). The processing unit and the DSP communicate with memory and perform operations and tasks that implement one or more blocks of the flow diagrams discussed herein. The memory, for example, stores applications, data, programs, algorithms (including software to implement or assist in implementing example embodiments) and other data.

Figure 39:
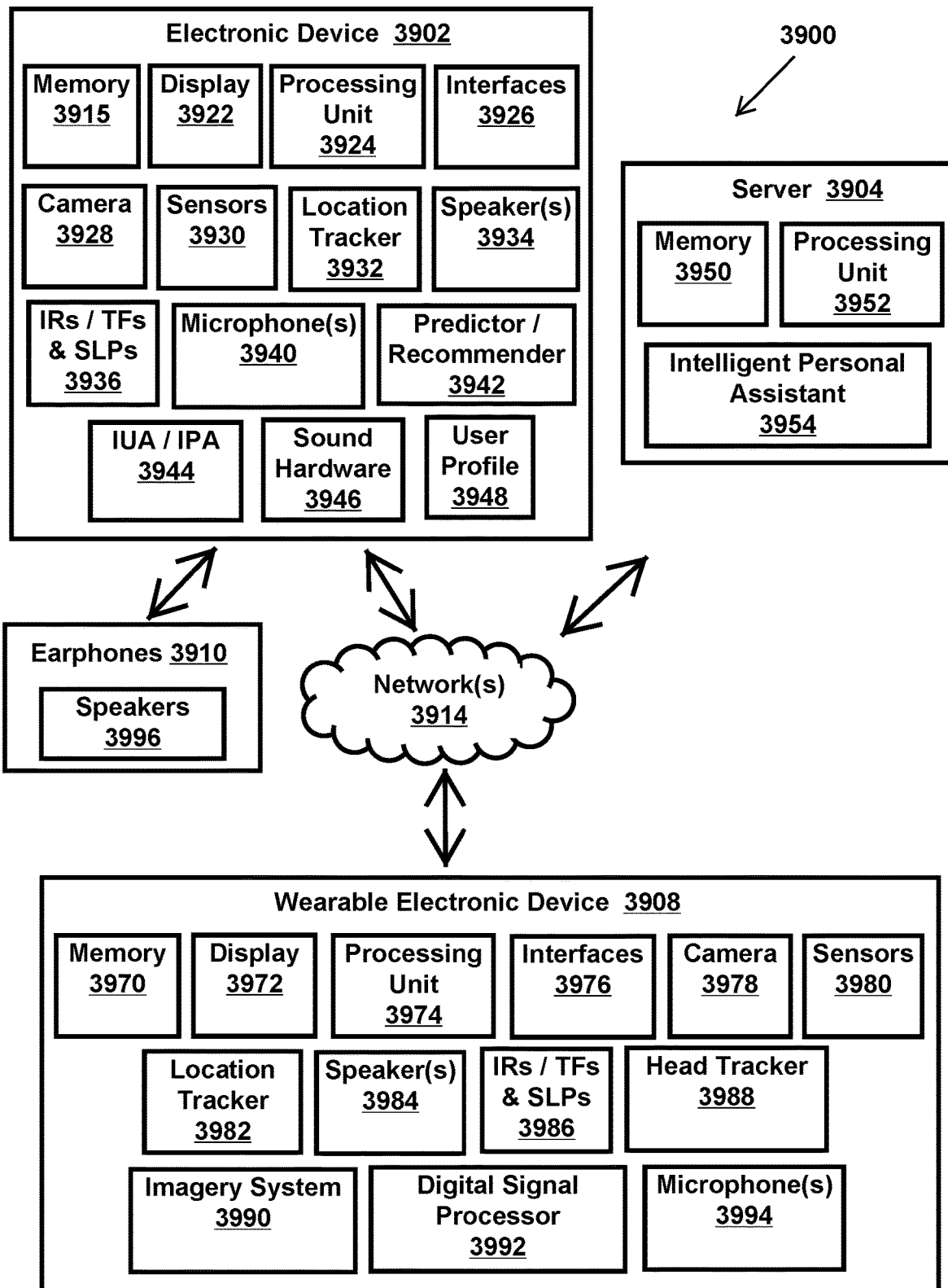
FIG. 39 is a computer system in accordance with an example embodiment.

FIG. 39 is a computer system or electronic system 3900 that includes an electronic device 3902, a server 3904, a wearable electronic device 3908, and earphones 3910 in communication with each other over one or more networks 3914.

Electronic device 3902 includes one or more components of computer readable medium (CRM) or memory 3915, one or more displays 3922, a processor or processing unit 3924 (such as one or more microprocessors and/or microcontrollers), one or more interfaces 3926 (such as a network interface, a graphical user interface, a natural language user interface, a natural user interface, a phone control interface, a reality user interface, a kinetic user interface, a touchless user interface, an augmented reality user interface, and/or an interface that combines reality and VR), a camera 3928, one or more sensors 3930 (such as micro-electro-mechanical systems sensor, an activity tracker, a pedometer, a piezoelectric sensor, a biometric sensor, an optical sensor, a radio-frequency identification sensor, a global positioning satellite (GPS) sensor, a solid state compass, gyroscope, magnetometer, and/or an accelerometer), a location or motion tracker 3932, one or more speakers 3934, impulse response data, transfer functions, and/or SLPs 3936, one or more microphones 3940, a predictor or recommender 3942, an intelligent user agent (IUA) and/or intelligent personal assistant (IPA) 3944 (also referred to as a virtual assistant), sound hardware 3946, and a user profile builder and/or user profile 3948.

Server 3904 includes computer readable medium (CRM) or memory 3950, a processor or processing unit 3952, and an intelligent personal assistant 3954.

By way of example, the intelligent personal assistant or intelligent user agent is a software agent that performs tasks or services for a person, such as organizing and maintaining information (such as emails, calendar events, files, to-do items, etc.), responding to queries, performing specific one-time tasks (such as responding to a voice instruction), performing ongoing tasks (such as schedule management and personal health management), and providing recommendations. By way of example, these tasks or services can be based on one or more of user input, prediction, activity awareness, location awareness, an ability to access information (including user profile information and online information), user profile information, and other data or information.

Wearable electronic device 3908 includes computer readable medium (CRM) or memory 3970, one or more displays 3972, a processor or processing unit 3974, one or more interfaces 3976 (such as an interface discussed herein), a camera 3978, one or more sensors 3980 (such as a sensor discussed herein), a motion or location tracker 3982, one or more speakers 3984, one or more impulse response data sets, transfer functions, and SLPs 3986, a head tracking system or head tracker 3988, an imagery system 3990, a digital signal processor or DSP 3992, and one or more microphones 3994.

The earphones 3910 include a left and a right speaker 3996 and communicate with or couple to the electronic device 3902.

By way of example, the sound hardware 3946 includes a sound card and/or a sound chip. A sound card includes one or more of a digital-to-analog (DAC) converter, an analog-to-digital (ATD) converter, a line-in connector for an input signal from a sound source, a line-out connector, a hardware audio accelerator providing hardware polyphony, and one or more digital-signal-processors (DSPs). A sound chip is an integrated circuit (also known as a "chip") that produces sound through digital, analog, or mixed-mode electronics and includes electronic devices such as one or more of an oscillator, envelope controller, sampler, filter, and amplifier.

By way of example, the imagery system 3990 includes, but is not limited to, one or more of an optical projection system, a virtual image display system, virtual augmented reality system, lenses, and/or a spatial augmented reality system. By way of example, the virtual augmented reality system uses one or more of image registration, computer vision, and/or video tracking to supplement and/or change real objects and/or a view of the physical, real world.

By way of example, a computer and an electronic device include, but are not limited to, handheld portable electronic devices (HPEDs), wearable electronic glasses, watches, wearable electronic devices, portable electronic devices, computing devices, electronic devices with cellular or mobile phone capabilities, digital cameras, desktop computers, servers, portable computers (such as tablet and notebook computers), smartphones, electronic and computer game consoles, home entertainment systems, handheld audio playing devices (example, handheld devices for downloading and playing music and videos), appliances (including home appliances), personal digital assistants (PDAs), electronics and electronic systems in automobiles (including automobile control systems), combinations of these devices, devices with a processor or processing unit and a memory, and other portable and non-portable electronic devices and systems (such as electronic devices with a DSP).

The predictor or recommender 3942 predicts, estimates, and/or recommends events including, but not limited to, switching or changing between binaural, mono, and stereo sounds at a future time, changing or altering binaural sound (such as moving a SLP, reducing a number of SLPs, eliminating a SLP, adding a SLP, starting transmission or emission of binaural sound, stopping transmission or emanation of binaural sound, etc.), predicting an action of a user, predicting a location of a user, predicting an event, predicting a desire or want of a user, predicting a query of a user (such as a query to an intelligent personal assistant), recommending a SLP to a user, etc. The predictor can also predict user actions or requests in the future (such as a likelihood that the user or electronic device requests a switch between binaural, mono, and stereo sounds or a change to binaural sound). For instance, determinations by a software application, an electronic device, and/or the user agent can be modeled as a prediction that the user will take an action and/or desire or benefit from a switch between binaural, mono, and stereo sounds or a change to binaural sound (such as pausing binaural sound, muting binaural sound, reducing or eliminating one or more cues or spatializations or localizations of binaural sound). For example, an analysis of historic events, personal information, geographic location, and/or the user profile provides a probability and/or likelihood that the user will take an action (such as whether the user prefers binaural sound or stereo, or mono sound for a particular location, a particular listening experience, or a particular communication with another person or an intelligent personal assistant). By way of example, one or more predictive models are used to predict the probability that a user would take, determine, or desire the action. The predictor can also predict future events unrelated to the actions of the user, for example, the prediction of the times, locations, SLP positions, type or quality of sound, or identities of incoming callers or requests for sound localizations to the user.

In an example embodiment, a user can select or create a SLP from an illustration displayed on a user interface of a HPED. The user can also select or create a SLP by using a HPED as a wand to point to a target location of a SLP. A user interface displayed by the HPED can guide a user through a simple process that might otherwise be confusing.

Figure 40A:
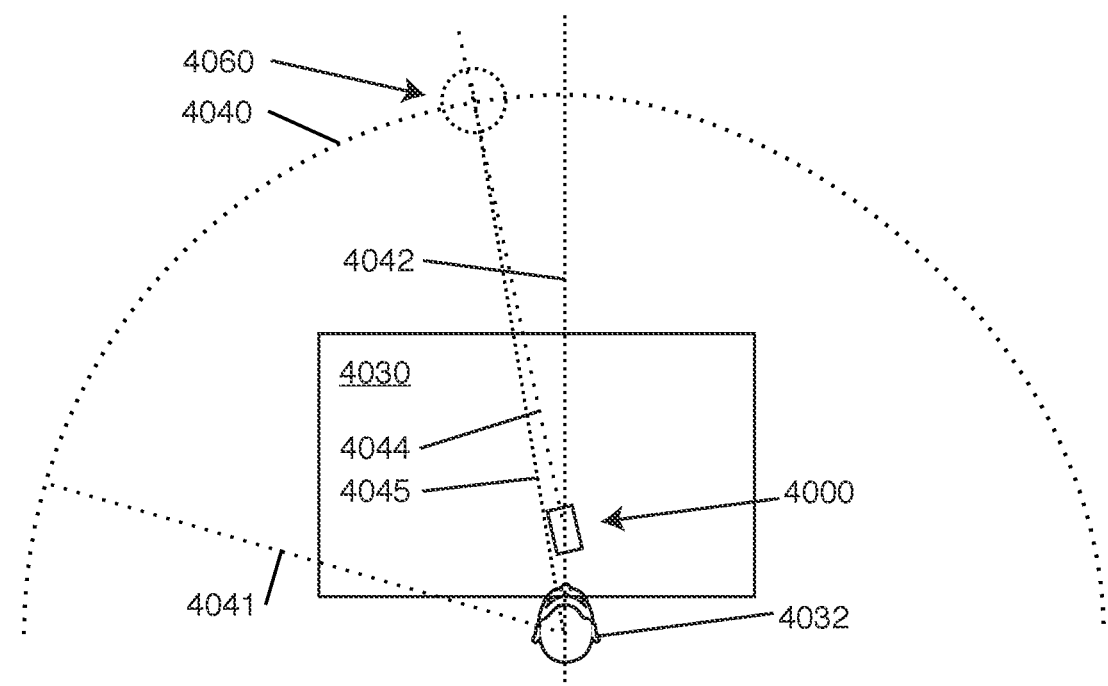
FIGS. 40A-40B show an electronic device proximate to a user seated at a desk in accordance with an example embodiment.
Figure 40B:
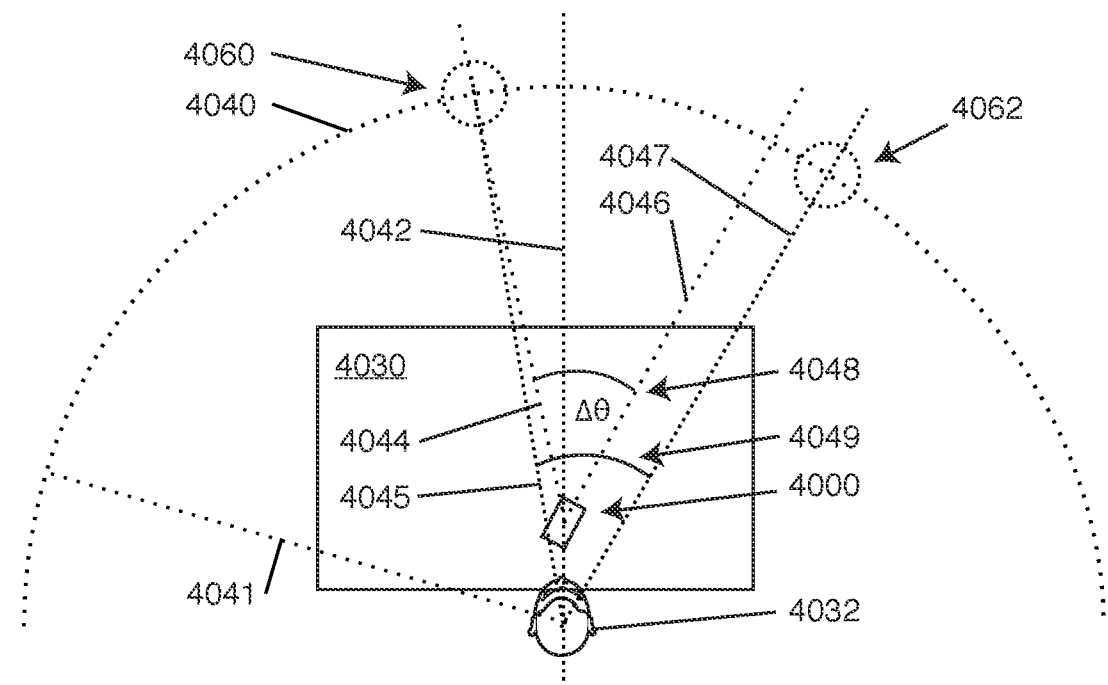

FIGS. 40A and 40B show an electronic device 4000 located proximate and in front of user 4032 seated at a desk 4030. Lines 4042, 4044-4047 indicate orientation, and SLPs 4060 and 4062 are located on semicircle 4040 at a distance (r) 4041 from user 4032.

Figure 41A:
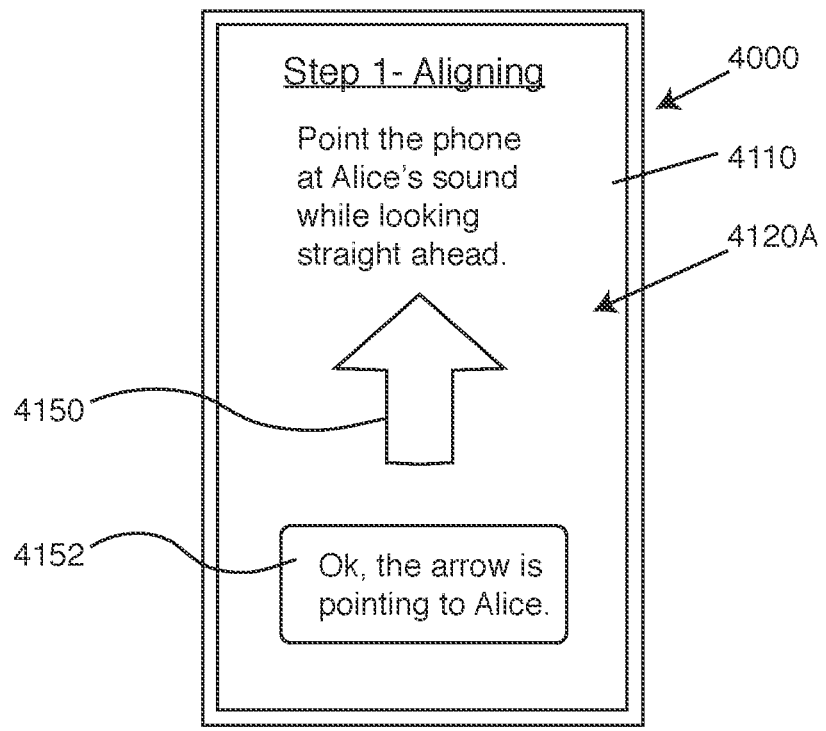
FIGS. 41A-41B show an electronic device with a UI in accordance with an example embodiment.
Figure 41B:
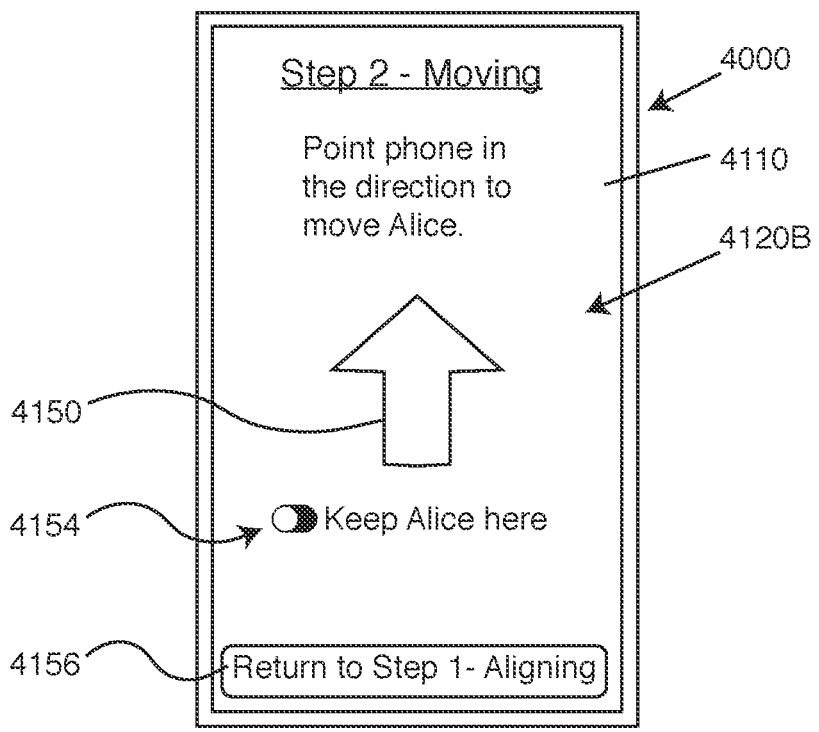

FIGS. 41A and 41B show the electronic device 4000 with a display 4110 that displays a user interface 4120A and 4120B that enables a user to make a selection for a SLP or designate a point for the creation of a SLP and/or pair of HRTFs. By way of example, the coordinates of a point for the selection or creation of a SLP or HRTF can be calculated or effectively approximated by measuring an angular difference between two orientations of a HPED and changing the angular coordinates of a known SLP or HRTF by the measured angular differences. For example, a user positions his smartphone at a first orientation and the smartphone records the measurements of its first orientation. The user then orients the smartphone in a second orientation, and the smartphone calculates the horizontal and vertical angular differences between the first and second orientation. The direction and amount that the user turns and/or tilts his smartphone corresponds to the direction and amount that he wants to change a SLP or HRTF point. The smartphone adjusts the location of a SLP or HRTF by the change in the phone's orientation, convolves sound to the adjusted SLP or HRTF coordinates, and the user immediately hears sound localized at the adjusted coordinates.

In an example embodiment, when the user matches the first orientation to a reference point of a first SLP or HRTF and aligns the smartphone to an orientation that is meaningful to him (such as straight ahead), then the smartphone will seem to operate like a wand that activates a SLP that the user deems the wand is pointing toward. The user can point his phone in a direction and hear sound from that direction. If the user keeps the phone sufficiently proximate to his head, then the direction of the second orientation of the smartphone will correspond more closely with the direction he perceives the sound to originate from (the second SLP or HRTF coordinate).

For example, a user determines that a ray passing from the bottom of his smartphone through the top of his smartphone is the direction that his smartphone "points." The user positions his smartphone such that the smartphone's pointing direction is closely aligned with or nearly parallel with the ray of his forward-facing gaze, and then selects this first orientation of the smartphone. In this case, the first orientation of the smartphone corresponds to a first SLP having as angular coordinates an azimuth of 0° and/or an elevation angle of 0°. The first orientation of the smartphone is then measured and recorded by the smartphone such as by recording a compass direction from a compass sensor and/or recording a tilt orientation from an accelerometer or tilt sensor. The user proceeds to orient his smartphone to a second orientation relative to his face without changing the location of the smartphone. Because the first orientation of the smartphone closely matched the orientation of the user's face, and the smartphone is closely coincident with the user's head, the user can perceive that the smartphone "points" in the direction of SLPs or HRTFs relative to his face, such as existing or desired sound localization points. The user is directed to point the smartphone at a desired location for a second SLP, and the smartphone retrieves from the sensors a horizontal and/or vertical orientation of the smartphone for the second orientation and calculates the angular difference in azimuth and/or elevation between the first orientation and the second orientation. The smartphone then adjusts the angular coordinates of the first SLP according to the angular differences measured between the first and second orientation of the smartphone. When sound is convolved to the adjusted coordinates of the SLP, the user perceives sound originating from the approximate direction that the smartphone is pointing.

Consider an example in which a user 4032 is using a smartphone 4000 to speak with Alice whose voice externalizes to the user at SLP 4060 with coordinates (1.5 m, −10°, 0°) and the user wants to move the voice of Alice to his right. The user is presented with a UI 4120A. The user is instructed to point his smartphone in the direction from where he hears Alice (the SLP 4060 where the voice of Alice is currently assigned). The user places his phone 4000 flat on his desk 4030 near to him and, while keeping his head 4032 facing in his forward direction 4042, rotates the phone 4000 until the fixed arrow 4150 on the UI 4120A points in the direction 4044 where he hears the voice of Alice at SLP 4060. The user then selects and activates the button or control 4152 (labeled "OK, the arrow is pointing to Alice.") The activation of the button 4152 triggers the smartphone to retrieve the current measurements of the orientation of the smartphone 4000. A lateral orientation measurement (and/or a vertical elevation measurement) is retrieved from the sensors and stored in memory. The UI is then refreshed or replaced to show the UI 4120B. The user is then instructed to point the phone in the new direction where he wants to hear the voice of Alice localized at a second SLP. The user rotates the phone 4000 to a new orientation 4046. The smartphone retrieves a new horizontal orientation measurement (and/or vertical orientation measurement) and calculates the angular difference $\Delta\theta$ 4048 between the first orientation 4044 and the second orientation 4046. The smartphone adjusts the azimuth coordinate of SLP 4060 by $\Delta\theta$ (and/or adjusts the elevation coordinate of SLP 4060 by a $\Delta\theta$ to calculate the coordinates of a new SLP 4062. The first orientation of the smartphone 4044 corresponds to the direction of SLP 4060 (indicated by dashed line 4045) relative to the user 4032, and the second orientation of the smartphone 4046 corresponds to the direction of the new SLP 4062 (indicated by dashed line 4047) relative to the user 4032.

The angle measured between the first and second orientations of the smartphone is $\Delta\theta$ 4048, and so the angle between the first SLP 4060 and the new SLP 4062, relative to the user 4032, is also $\Delta\theta$ 4049. The smartphone calculates coordinates of the new SLP as (r, $-10°+\Delta\theta$, $\Delta\phi$) and convolves the voice of Alice to the new SLP 4062. The second orientation of the smartphone 4046 points approximately to the location of the new SLP 4062.

The accuracy of the correlation between where the smartphone points and where the user hears a sound from the new SLP varies with the distance of the smartphone from the center of the head of the user 4032. The user can hear the voice of Alice immediately at the new SLP 4062 from approximately the direction the smartphone is pointing. If the user is not satisfied with the new SLP location he can adjust the rotation of the phone 4000 and hear the change in the location of the voice of Alice immediately in real-time. In this way he can find a preferred location for the voice of Alice and then cease rotating the phone. Alternatively he can continue to rotate the phone 4000 and cause the voice of Alice to continue to move as a $\Delta\theta$ (and a $\Delta\theta$) and the coordinates of the new SLP are continuously updated. If the user needs to use or move the phone without disturbing the localization of Alice he can select the interface control 4154 ("Keep Alice here") to cause the new SLP coordinate to discontinue updating. If the user made an error in alignment he can activate the button 4156 labeled "Return to Step 1—Aligning" to cause the UI 4120B to refresh as UI 4120A.

By way of example, Alice's sound can be her voice or a beeping sound or other sound in order to provide a constant sound for the user to hear during the alignment in case Alice is not speaking, or both the voice of Alice and a beeping sound played together at the same localization point.

The user interfaces 41A and 41B allow the user to specify an azimuth or an elevation or both azimuth and elevation. FIGS. 40A and 40B illustrate an azimuth change but the example embodiment is not limited to the selection of azimuth. The selection of a new elevation can also be performed by using, for example, the user interfaces 4120A and 4120B.

Figure 42A:
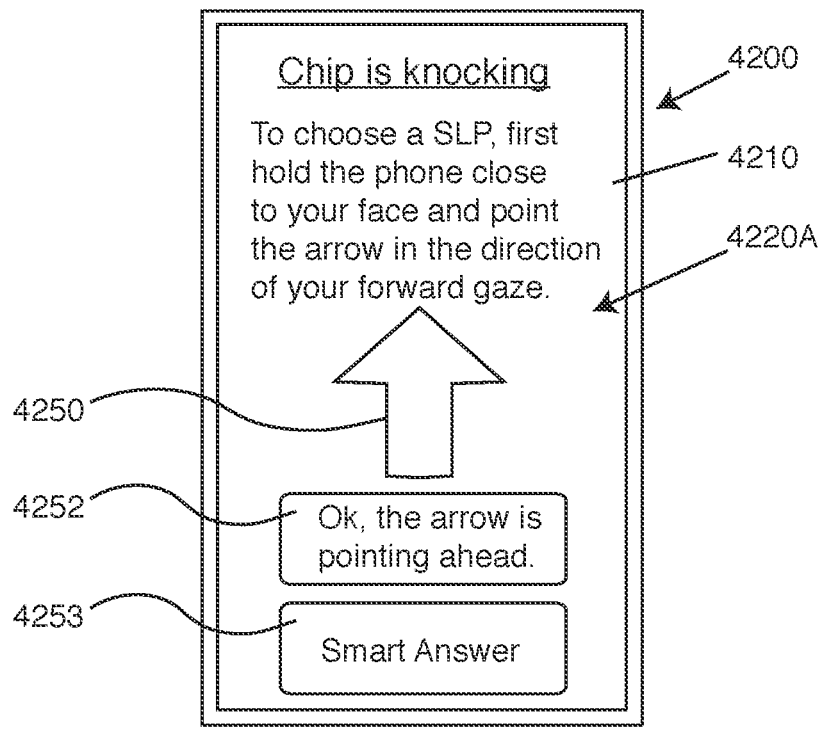
FIGS. 42A-42B show an electronic device with a UI in accordance with an example embodiment.
Figure 42B:
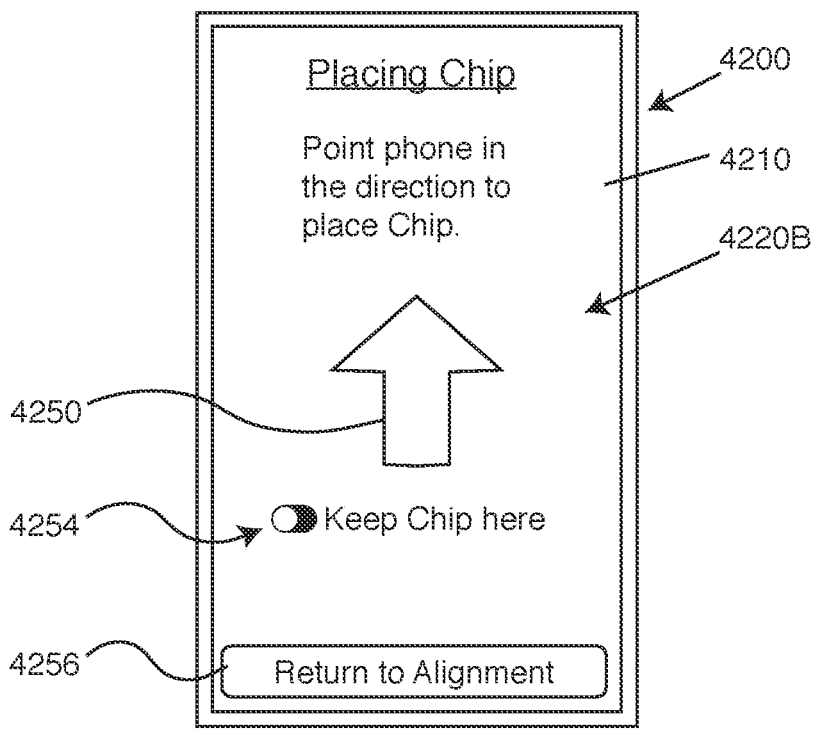

FIGS. 42A and 42B show an example embodiment that provides a user interface so a user can select a SLP at the time that an electronic call is beginning. FIGS. 42A and 42B show an electronic device 4200 with a display 4210 and user interface 4220A and 4220B, an arrow 4250 as a visual reference element, and controls or buttons 4252, 4253, 4254, and 4256.

UI 4220A shows a notification of an incoming call from Chip. If the user does not wish to select a SLP for Chip at this time the user can select the button 4253 labeled "Smart Answer" that can trigger the selection and designation of a recent, common, internal, or otherwise appropriate SLP for the voice of Chip. In this case, the user wants to select a SLP for Chip. The user is instructed to keep the phone close to his body (or close to his face to benefit the approximation of a new elevation) and to orient the phone so that the arrow 4250 points away from him in the direction of his forward gaze. When the phone is in position, the user activates the button 4252 (labeled "Ok, the arrow is pointing ahead."). The activation of the button 4252 triggers the smartphone 4200 to retrieve the current measurements of the orientation of the smartphone. A lateral orientation measurement (and/or a vertical elevation measurement) is retrieved from the sensors and stored in memory. The UI 4220A is then refreshed or replaced to show the UI 4220B. The user can then freely move the voice of Chip by pointing his smartphone to update a SLP or HRTF being used to convolve the voice of Chip. If the user needs to use or move the phone without disturbing the localization of Chip he can select the interface control 4254 ("Keep Chip here") to trigger a discontinuation of the changing of the a SLP or HRTF. If the user made an error in alignment he can activate the button 4256 labeled "Return to Alignment" to cause the UI 4220B to refresh as UI 4220A.

Example embodiments are not limited to HRTFs but also include other sound transfer functions and sound impulse responses including, but not limited to, head related impulse responses (HRIRs), room transfer functions (RTFs), room impulse responses (RIRs), binaural room impulse responses (BRIRs), headphone transfer functions (HPTFs), etc.

As used herein, an "electronic call" or a "telephone call" is a connection over a wired and/or wireless network between a calling person or user and a called person or user. Telephone calls can use landlines, mobile phones, satellite phones, HPEDs, computers, and other portable and non-portable electronic devices. Further, telephone calls can be placed through one or more of a public switched telephone network, the internet, and various types of networks (such as Wide Area Networks or WANs, Local Area Networks or LANs, Personal Area Networks or PANs, Campus Area Networks or CANs, etc.). Telephone calls include any type of telephony including Voice Over Internet Protocol (VoIP) calls, internet telephone calls, in-game calls, etc.

As used herein, a "sound localization point" or "SLP" is a location where a listener localizes sound. A SLP can be internal (such as monaural sound that localizes inside a head of a listener), or a SLP can be external (such as binaural sound that externally localizes to a point or an area that is away from but proximate to the person or away from but not near the person). A SLP can be a single point such as one defined by a single pair of HRTFs or a SLP can be a zone or shape or volume or general area and there may be many HRTFs that can be used to convolve sound to a place within the boundary of the SLP. A SLP can also have no HRTF available to serve to convolve sound within or at the SLP (such as an internalized SLP which does not need a HRTF to render a sound that is perceived within the head of a listener, or an external SLP that may require a HRTF in order to provide externalized sound for the listener but which has no HRTF yet designated or created).

As used herein, a "user" can be a person (i.e., a human being), an intelligent personal assistant (IPA), a user agent (including an intelligent user agent and a machine learning agent), a process, a computer system, a server, a software program, hardware, an avatar, or an electronic device. A user can also have a name, such as Alice, Bob, Chip, Hal, and other names as described in some example embodiments. As used herein a "caller" or "party" can be a user.

As used herein, a "user agent" is software that acts on behalf of a user. User agents include, but are not limited to, one or more of intelligent user agents and/or intelligent electronic personal assistants (IPAs, software agents, and/or assistants that use learning, reasoning and/or artificial intelligence), multi-agent systems (plural agents that communicate with each other), mobile agents (agents that move execution to different processors), autonomous agents (agents that modify processes to achieve an objective), and distributed agents (agents that execute on physically distinct electronic devices).

Examples herein can take place in physical spaces, in computer rendered spaces (such as computer games or VR), in partially computer rendered spaces (AR), and in combinations thereof.

The processor unit includes a processor (such as a central processing unit, CPU, microprocessor, microcontrollers, field programmable gate arrays (FPGA), application-specific integrated circuits (ASIC), etc.) for controlling the overall operation of memory (such as random access memory (RAM) for temporary data storage, read only memory (ROM) for permanent data storage, and firmware). The processing unit and DSP communicate with each other and memory and perform operations and tasks that implement one or more blocks of the flow diagrams discussed herein. The memory, for example, stores applications, data, programs, algorithms (including software to implement or assist in implementing example embodiments) and other data.

Consider an example embodiment in which the SLS or portions of the SLS include an integrated circuit FPGA that is specifically customized, designed, configured, or wired to execute one or more blocks discussed herein. For example, the FPGA includes one or more programmable logic blocks that are wired together or configured to execute combinational functions for the SLS.

Consider an example in which the SLS or portions of the SLS include an integrated circuit or ASIC that is specifically customized, designed, or configured to execute one or more blocks discussed herein. For example, the ASIC has customized gate arrangements for the SLS. The ASIC can also include microprocessors and memory blocks (such as being a SoC (system-on-chip) designed with special functionality to execute functions of the SLS).

Consider an example in which the SLS or portions of the SLS include one or more integrated circuits that are specifically customized, designed, or configured to execute one or more blocks discussed herein. For example, the electronic devices include a specialized or custom processor or microprocessor or semiconductor intellectual property (SIP) core or digital signal processor (DSP) with a hardware architecture optimized for convolving sound and executing one or more example embodiments.

Consider an example in which the HPED includes a customized or dedicated DSP that executes one or more blocks discussed herein. Such a DSP has a better power performance or power efficiency compared to a general-purpose microprocessor and is more suitable for a HPED, such as a smartphone, due to power consumption constraints of the HPED. The DSP can also include a specialized hardware architecture, such as a special or specialized memory architecture to simultaneously fetch or pre-fetch multiple data and/or instructions at the same time to increase execution speed and sound processing efficiency. By way of example, streaming sound data (such as sound data in a telephone call or software game application) is processed and convolved with a specialized memory architecture (such as the Harvard architecture or the Modified von Neumann architecture). The DSP can also provide a lower-cost solution compared to a general-purpose microprocessor that executes digital signal processing and convolving algorithms. The DSP can also provide functions as an application processor or microcontroller.

Consider an example in which a customized DSP includes one or more special instruction sets for multiply-accumulate operations (MAC operations), such as convolving with transfer functions and/or impulse responses (such as HRTFs, HRIRs, BRIRs, et al.), executing Fast Fourier Transforms (FFTs), executing finite impulse response (FIR) filtering, and executing instructions to increase parallelism.

Consider an example in which a smartphone or other HPED includes one or more dedicated sound DSPs (or dedicated DSPs for sound processing, image processing, and/or video processing). The DSPs execute instructions to convolve sound and provide user interfaces in accordance with one or more example embodiments. Locations of SLPs on the user interface and locations of SLPs where sound actually localizes to the user are calculated, adjusted, coordinated and synchronized so the user interface shows SLPs that correspond in real-time with the positions where the sounds are localizing. Further, the DSPs simultaneously convolve multiple SLPs to a user. These SLPs can be moving with respect to the face of the user so the DSPs convolve multiple different sound signals and sources with HRTFs that are continually, continuously, or rapidly changing.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method comprising:
    capturing, with one or more cameras of a wearable electronic device (WED) worn on a head of a first user in an environment, video of the environment;
    receiving, at the WED, a telephone call from an electronic device of a second user; and
    displaying, on a display of the WED before the first user answers the telephone call from the second user, the video of the environment that includes a virtual image of the second user at a location in the environment where a voice of the second user will externally localize outside the head of the first user in the environment in response to the first user answering the telephone call from the electronic device of the second user.

2. The method of claim 1 further comprising:
    providing, by the WED before the first user answers the telephone call from the second user, a sound localization point (SLP) for the voice of the second user at a default location in the environment at zero degrees (0°) azimuth and a distance of at least one meter that occurs in front of a face of the first user.

3. The method of claim 1 further comprising:
    displaying, on the display of the WED after the first user answers the telephone call from the second user, the video of the environment that includes a virtual image of a third user to the telephone call at a default location that is separate from the virtual image of the second user by twenty degrees (20°) azimuth.

4. The method of claim 1 further comprising:
    determining, by the WED, where to display a virtual image of a third user who is a party to the telephone call such that the WED displays the video of the environment with the virtual image of the third user with an azimuth angle of ten degrees (10°) from the virtual image of the second user.

5. The method of claim 1 further comprising:
    playing, before the first user answers the telephone call from the second user, a ringtone in binaural sound that has a sound localization point (SLP) in the video of the environment at the virtual image of the second user.

6. The method of claim 1 further comprising:
    executing, by the WED, object recognition to recognize physical objects in the environment of the first user; and
    determining, by the WED and based on locations of the physical objects, the location in the environment where the voice of the second user will externally localize outside the head of the first user in the environment when the first user answers the telephone call.

7. The method of claim 1 further comprising:
processing, with a digital signal processor (DSP) in the WED, the voice of the second user to localize at a first sound localization point (SLP) in empty space outside the head of the first user at the virtual image of the second user;
capturing, with the WED, a gesture from a finger of the first user; and
moving, in response to capturing the gesture from the finger, the voice of the second user from the first SLP in empty space to a second SLP in empty space that is closer to the head of the first user.

8. The method of claim 1 further comprising:
displaying, on the display of the WED and after the first user answers the telephone call, the video of the environment that includes a plurality of virtual images that show different locations in the environment where the voice of the second user will externally localize when selected by the first user as a sound localization point (SLP) for the voice of the second user.

9. A method comprising:
capturing, with one or more cameras of a wearable electronic device (WED) worn on a head of a first user, video of an environment of the first user;
displaying, with a display of the WED and before the first user accepts an electronic call from an electronic device of a second user, the video of the environment that includes a virtual image of the second user that appears at a default location at zero degrees (0°) azimuth and at least one meter in front of a face of the first user; and
playing, through one or more speakers in the WED after the first user answers the electronic call from the electronic device of the second user, a voice of the second user in binaural sound that externally localizes to the first user at the default location.

10. The method of claim 9 further comprises:
playing, through the one or more speakers in the WED before the first user answers the electronic call from the electronic device of the second user, a ringtone in the binaural sound that externally localizes to the first user at the virtual image of the second user.

11. The method of claim 9 further comprises:
receiving, at a microphone in the WED worn on the head of the first user, a verbal command from the first user to accept the electronic call; and
processing, with a digital signal processor (DSP) in the WED, the voice of the second user to externally localize in empty space outside the head of the first user at the default location in response to receiving the verbal command from the first user to accept the electronic call.

12. The method of claim 9 further comprises:
capturing, with a camera in the WED worn on the head of the first user, a hand gesture that commands the WED to accept the electronic call; and
processing, with a digital signal processor (DSP) in the WED, the voice of the second user to externally localize in empty space outside the head of the first user in the environment in response to capturing the hand gesture from the first user.

13. The method of claim 9 further comprises:
displaying, with the display of the WED after the first user accepts the electronic call from the electronic device of the second user, the video of the environment that includes virtual images of the second user, a third user, and a fourth user in one of an arc or a hemi-sphere with respect to the first user.

14. The method of claim 9 further comprises:
displaying, with the display of the WED after the first user accepts the electronic call from the electronic device of the second user, the video of the environment that includes virtual images of the second user, a third user, and a fourth user evenly distributed in front of and around a perimeter of the first user.

15. The method of claim 9 further comprises:
displaying, with the display of the WED and during the electronic call, the video of the environment that includes a virtual image of a third user requesting to join the electronic call; and
displaying, with the display of the WED and before the first user accepts the third user to join the electronic call, the virtual image of the third user with a different background color to visually distinguish the third user requesting to join the electronic call from the second user already in the electronic call.

16. A wearable electronic device (WED) worn on a head of a first user, the WED comprising:
a camera that captures video of an environment of the first user wearing the WED;
a display that displays, before the first user answers an electronic call from a second user, a virtual image that appears at a location in the video of the environment where a voice of the second user will externally localize in empty space outside a head of the first user when the first user answers the electronic call; and
speakers that play, after the first user answers the electronic call from the second user, the voice of the second user in binaural sound that externally localizes in empty space outside the head of the first user where the WED displays the second user.

17. The WED of claim 16, wherein the WED automatically displays virtual images of the second user, a third user, and a fourth images evenly distributed in a semicircle around the head of the first user.

18. The WED of claim 16 further comprising:
a memory that stores a default location where to place a sound localization point (SLP) for the voice of the second user during the electronic call, wherein the default location occurs in front of a face of the first user at zero degrees (0°) azimuth, zero degrees (0°) elevation, and a distance (d) at least one meter from the face of the first user.

19. The WED of claim 16, wherein the display displays an augmented reality (AR) image of a control that toggles on and off transmission of a soundscape of the first user, wherein when the soundscape is toggled off a voice of the first user with no soundscape transmits to the second user, and when the soundscape is toggled on the voice of the first user with the soundscape transmits to the second user.

20. The WED of claim 16 further comprising:
cameras that tracks eye gaze of the first user and movement of a hand of the first user, where the WED moves a sound localization point (SLP) where the voice of the second user externally localizes in empty space outside the head of the first user from a first SLP to a second SLP in response to a command based on the eye gaze of the first user and the movement of the hand of the first user.

* * * * *